US006740373B1

(12) United States Patent
Swoboda et al.

(10) Patent No.: US 6,740,373 B1
(45) Date of Patent: May 25, 2004

(54) COATED PAPERBOARDS AND PAPERBOARD CONTAINERS HAVING IMPROVED TACTILE AND BULK INSULATION PROPERTIES

(75) Inventors: Dean P. Swoboda, DePere, WI (US); Anthony J. Swiontek, Neenah, WI (US); Timothy P. Hartjes, Kimberly, WI (US); Kenneth J. Shanton, Neenah, WI (US); Erland R. Sandstrom, Menasha, WI (US)

(73) Assignee: Fort James Corporation, Atlanta, GA (US)

( * ) Notice: Subject to any disclaimer, the term of this patent is extended or adjusted under 35 U.S.C. 154(b) by 0 days.

(21) Appl. No.: 09/018,563

(22) Filed: Feb. 4, 1998

Related U.S. Application Data

(63) Continuation-in-part of application No. 08/806,947, filed on Feb. 26, 1997, now abandoned.

(51) Int. Cl.[7] .......................... B32B 31/14; B32B 31/26
(52) U.S. Cl. .................. 428/34.2; 229/5.81; 229/5.84; 428/511; 428/514
(58) Field of Search ............................. 229/5.81, 5.84; 428/34.2, 511, 514

(56) References Cited

U.S. PATENT DOCUMENTS

| | | | |
|---|---|---|---|
| 2,345,543 A | 3/1944 | Wohnsiedler et al. .......... 260/72 |
| 2,926,116 A | 2/1960 | Keim ......................... 162/164 |
| 2,926,154 A | 2/1960 | Keim ........................ 260/29.2 |
| 3,293,114 A | 12/1966 | Kenaga et al. ............... 162/168 |
| 3,390,618 A | 7/1968 | McArdle ..................... 93/36.01 |
| 3,556,932 A | 1/1971 | Coscia et al. ................ 162/166 |
| 3,556,934 A | 1/1971 | Meyer ........................ 162/169 |
| 3,615,972 A | 10/1971 | Morehouse, Jr. et al. ..... 156/79 |
| 3,864,181 A | * 2/1975 | Wolinski et al. .............. 156/79 |

(List continued on next page.)

FOREIGN PATENT DOCUMENTS

| | | | |
|---|---|---|---|
| BE | 904013 | * | 7/1986 |
| EP | 36993 | * | 10/1981 |
| EP | 0 462 953 B1 | | 10/1993 |
| JP | 06175277 | * | 6/1994 |
| WO | WO 9720009 | * | 6/1997 |

OTHER PUBLICATIONS

G. Treier, "Development of a Unique Lightweight Paper," TAPPI vol. 55, No. 5, May 1972, p. 769–71.
B.I. Dussman V. and R.I. Weiner, "Study of Burn Hazard in Human Tissue and Its Implication on Consumer Product Design," presented at the Heat Transfer Division of the American Society of Mechanical Engineers at the ASME Winter Annual Meeting, Washington, DC, Nov. 28–Dec. 2, 1971.
"Wet Strength in Paper and Paperboard," J. Weidner, ed., TAPPI Monograph Series, No. 29, (TAPPI Press, 1965). Chapters 1, 2 and 3.
"Wet Strength in Paper and Paperboard," J. Weidner, ed., TAPPI Monograph Series, No. 13, (TAPPI Press, 1954). Chapters 1, 2 and 3.

Primary Examiner—Sandra M. Nolan
(74) Attorney, Agent, or Firm—Finnegan, Henderson, Farabow, Garrett & Dunner LLP

(57) ABSTRACT

A method of making a texture-coated and/or insulation coated container from a flat paperboard blank in which a heat-hardenable liquid polymeric binder texturizing and or insulating agent coating mixture is applied to one surface of the blank in a pattern of covered and open areas. This coating mixture is subjected to heat to cure the polymeric binder and expand the texturizing and/or insulating agent, optionally treated with moisture, and optionally heated to form the blank into the shape of a container, and the container produced by this method. The containers such as cups, plates, etc., are useful in food service. These containers have a coefficient of static friction which is about 0.2 to 2.0 and over and a kinetic coefficient of friction which is about 0.22 to 1.5.

90 Claims, 43 Drawing Sheets

U.S. PATENT DOCUMENTS

| | | | |
|---|---|---|---|
| 3,941,634 A | 3/1976 | Nisser et al. | 156/79 |
| 4,006,273 A | 2/1977 | Wolinski et al. | 427/278 |
| 4,044,176 A | 8/1977 | Wolinski et al. | 427/256 |
| 4,206,249 A | 6/1980 | Suzuki et al. | 427/54.1 |
| 4,391,833 A * | 7/1983 | Self et al. | 426/523 |
| 4,435,344 A | 3/1984 | Iioka | 264/54.1 |
| 4,529,480 A | 7/1985 | Trokhan | 162/109 |
| 4,619,734 A | 10/1986 | Andersson | 162/111 |
| 4,637,859 A | 1/1987 | Trokhan | 162/109 |
| 4,721,499 A | 1/1988 | Marx et al. | 493/152 |
| 4,721,500 A | 1/1988 | Van Handel et al. | 493/152 |
| 4,722,943 A | 2/1988 | Melber et al. | 521/57 |
| 4,722,944 A | 2/1988 | Mori et al. | 521/54 |
| 4,829,094 A | 5/1989 | Melber et al. | 521/57 |
| 4,902,722 A | 2/1990 | Melber | 521/54 |
| 4,913,775 A | 4/1990 | Langley et al. | 162/164.3 |
| 5,384,011 A | 1/1995 | Hazard, Jr. | 162/9 |
| 5,384,012 A | 1/1995 | Hazard, Jr. | 162/9 |
| 5,490,631 A | 2/1996 | Iioka et al. | 229/403 |
| 5,514,429 A | 5/1996 | Kamihgaraguchi et al. | 428/34.2 |
| 5,529,664 A | 6/1996 | Trokhan et al. | 162/109 |
| 5,584,966 A * | 12/1996 | Moffett | 162/168.1 |
| 5,688,371 A * | 11/1997 | Konig et al. | 162/166 |
| 5,759,624 A | 6/1998 | Neale et al. | 427/261 |
| 5,766,709 A | 6/1998 | Geddes et al. | 428/35.7 |
| 6,379,497 B1 | 4/2002 | Sandstrom et al. | 162/123 |

* cited by examiner

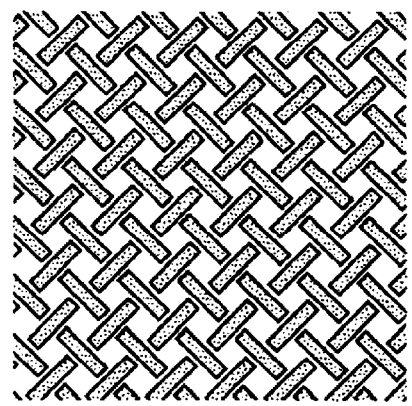
FIG. 4A
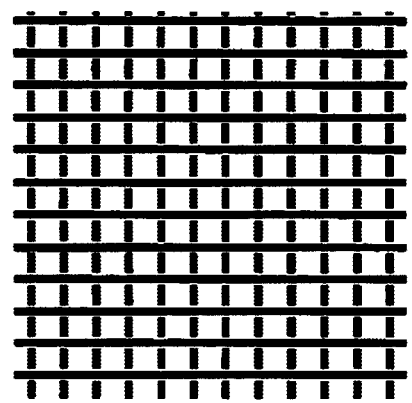
FIG. 4B
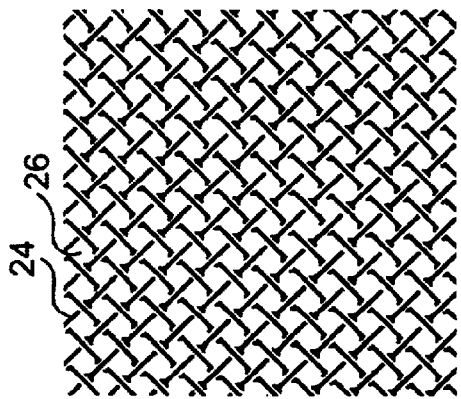
FIG. 4C
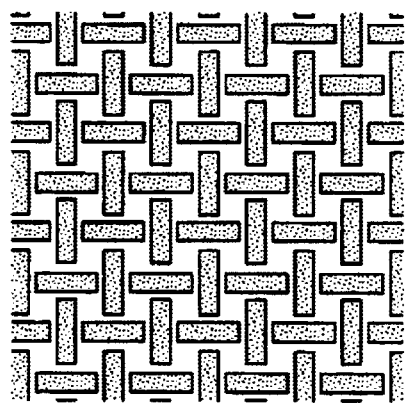
FIG. 4D
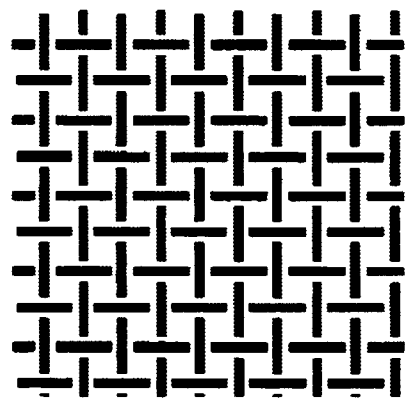
FIG. 4E
FIG. 4F

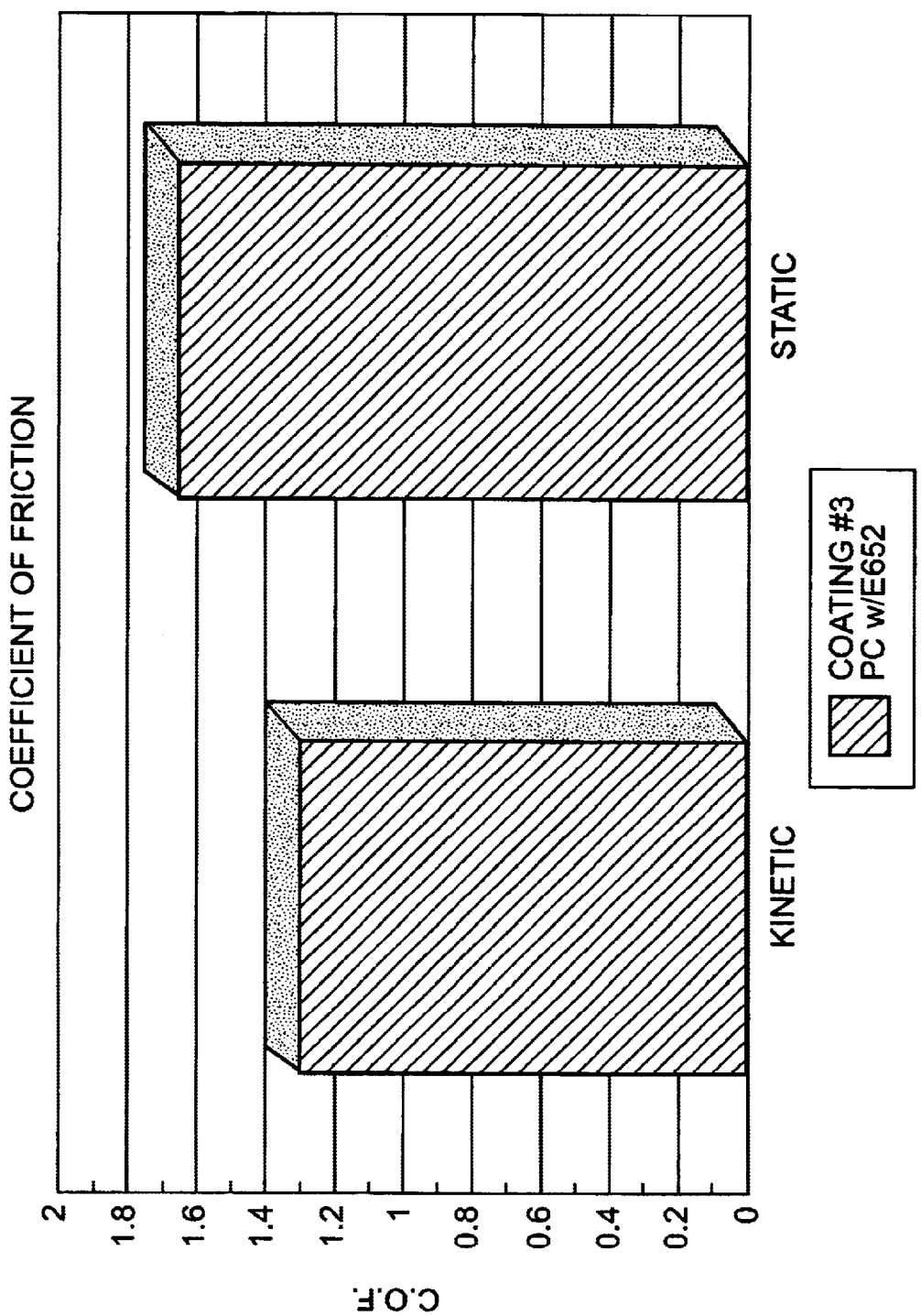

FIG. 17

WAX AND POLYETHYLENE TREATED CUPS

MICROSPHERE CONTAINING SPRAY (EXTERNAL)

A) WAX TREATED

ATOMIZED WAX SPRAY

B) POLYETHYLENE TREATED (INTERNAL)

PLATE
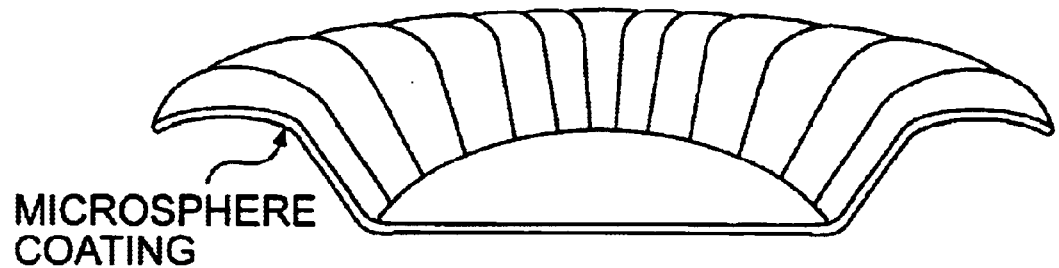
SIDE VIEW
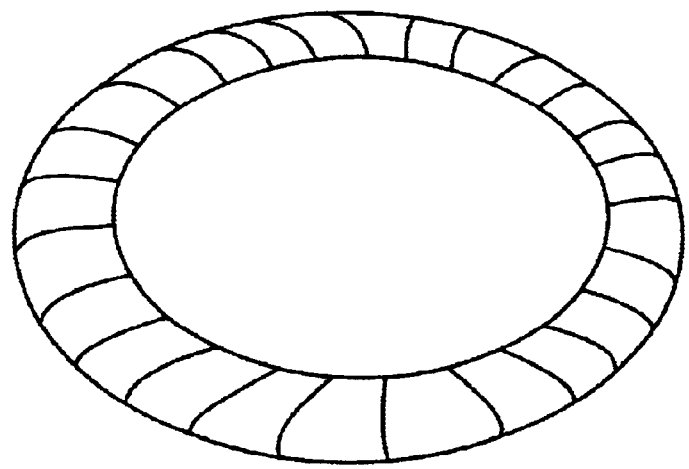
TOP VIEW
FIG. 18

BOWL
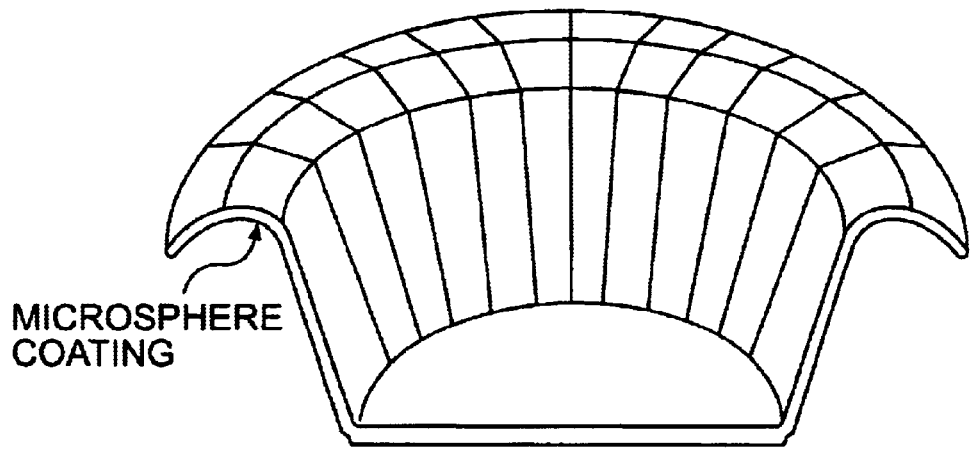
SIDE VIEW
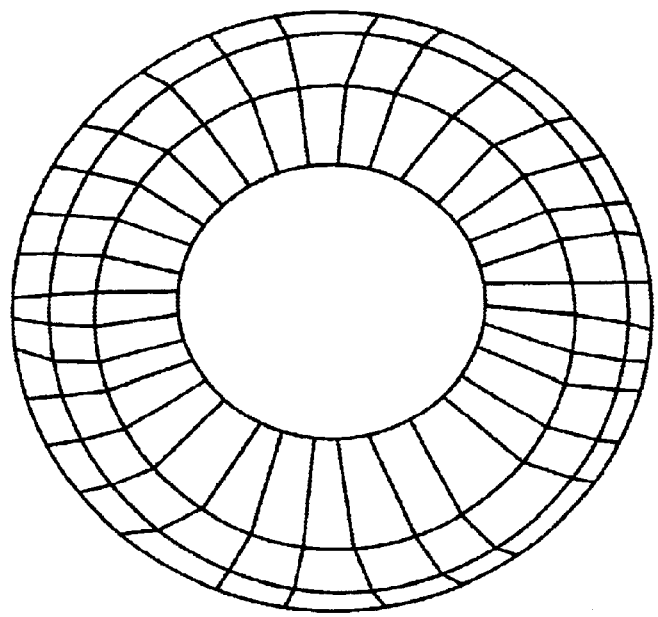
TOP VIEW
*FIG. 19*

CANISTER
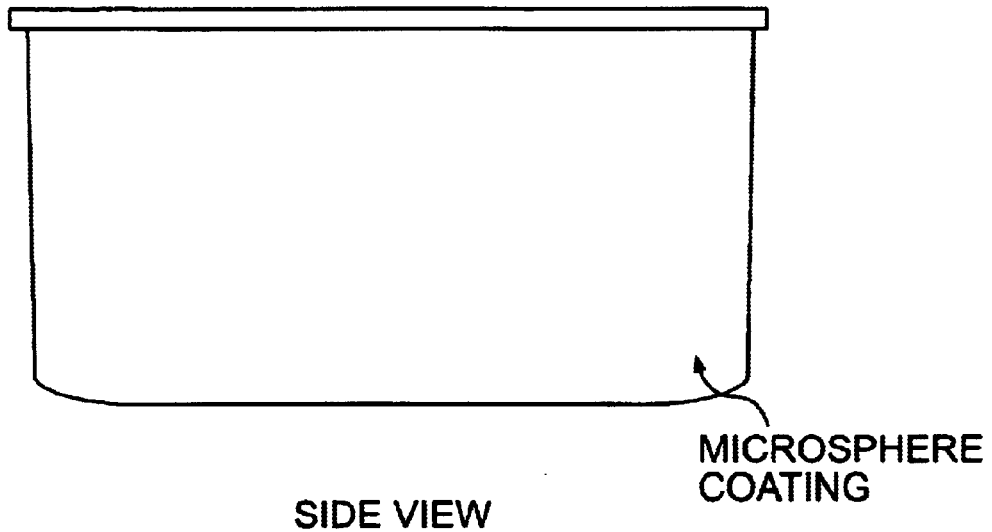
SIDE VIEW — MICROSPHERE COATING
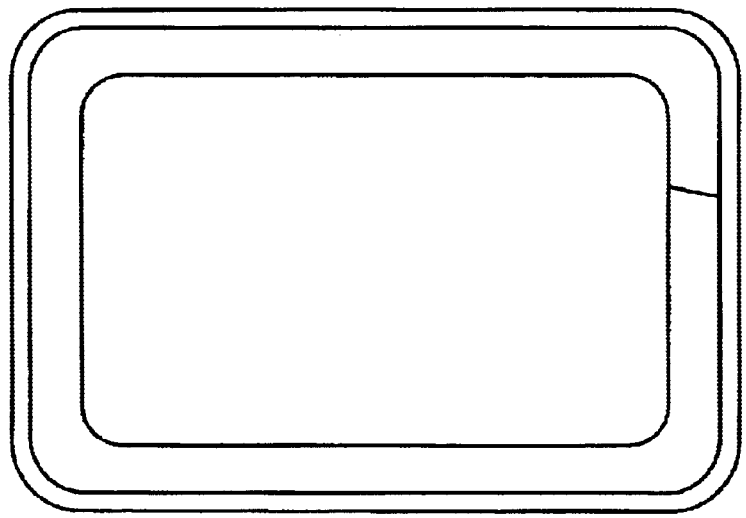
TOP VIEW
*FIG. 20*

COMPARTMENTED PLATE
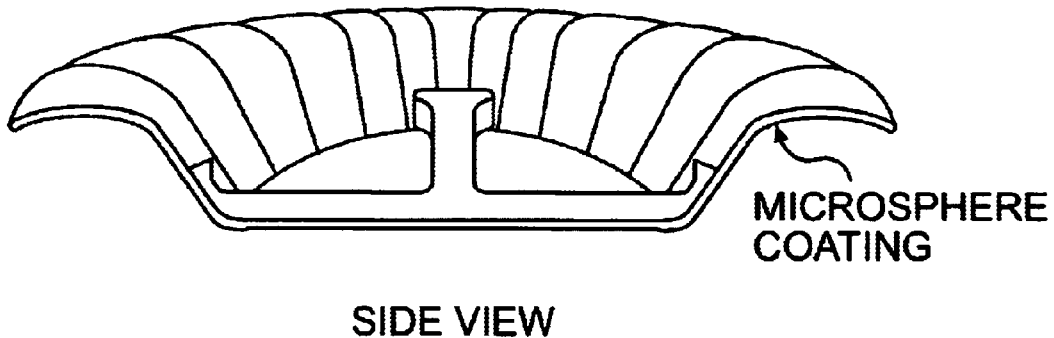
SIDE VIEW
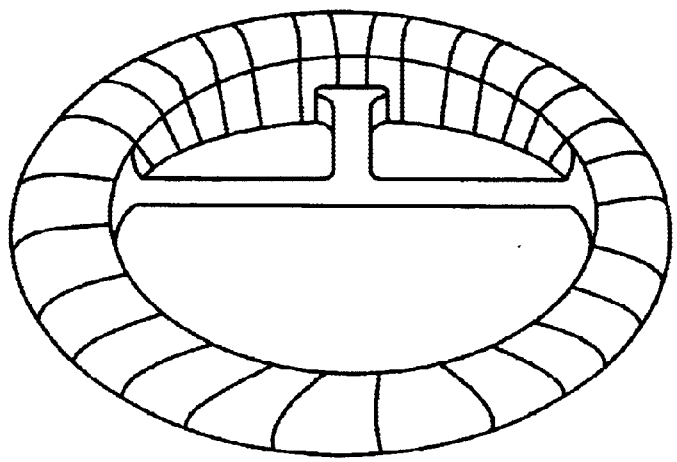
TOP VIEW
FIG. 21

RECTANGULAR TAKE-OUT CONTAINER
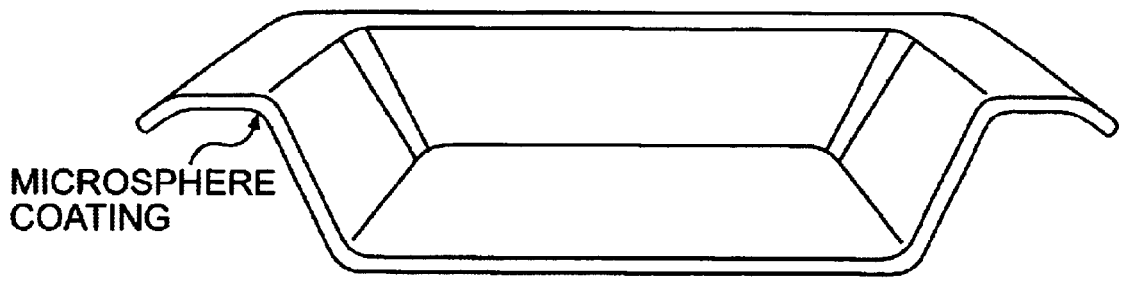
SIDE VIEW
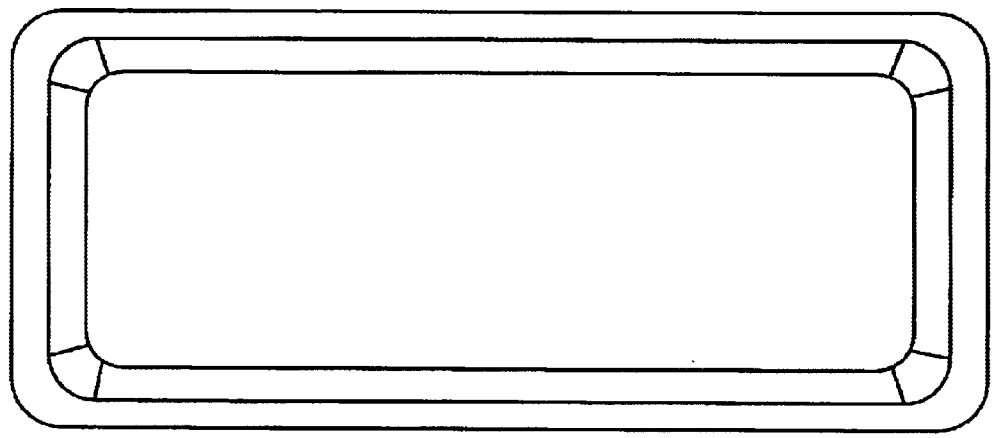
TOP VIEW
*FIG. 23*

HAMBURGER CLAMSHELL
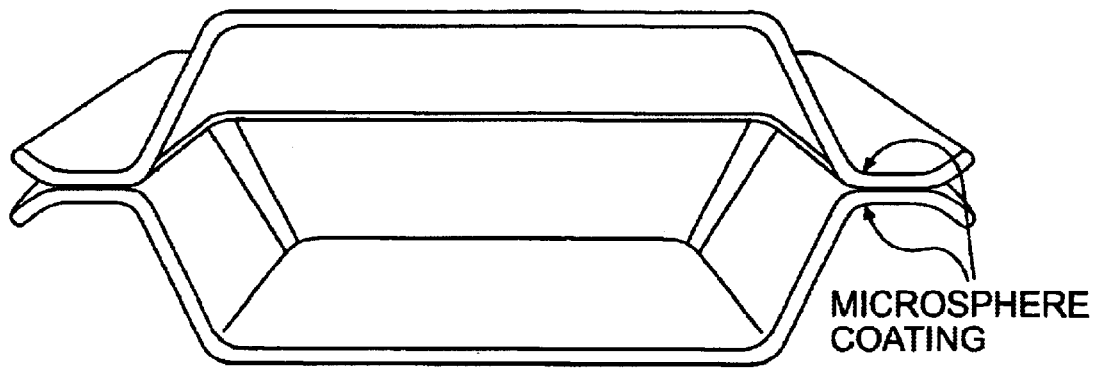
SIDE VIEW
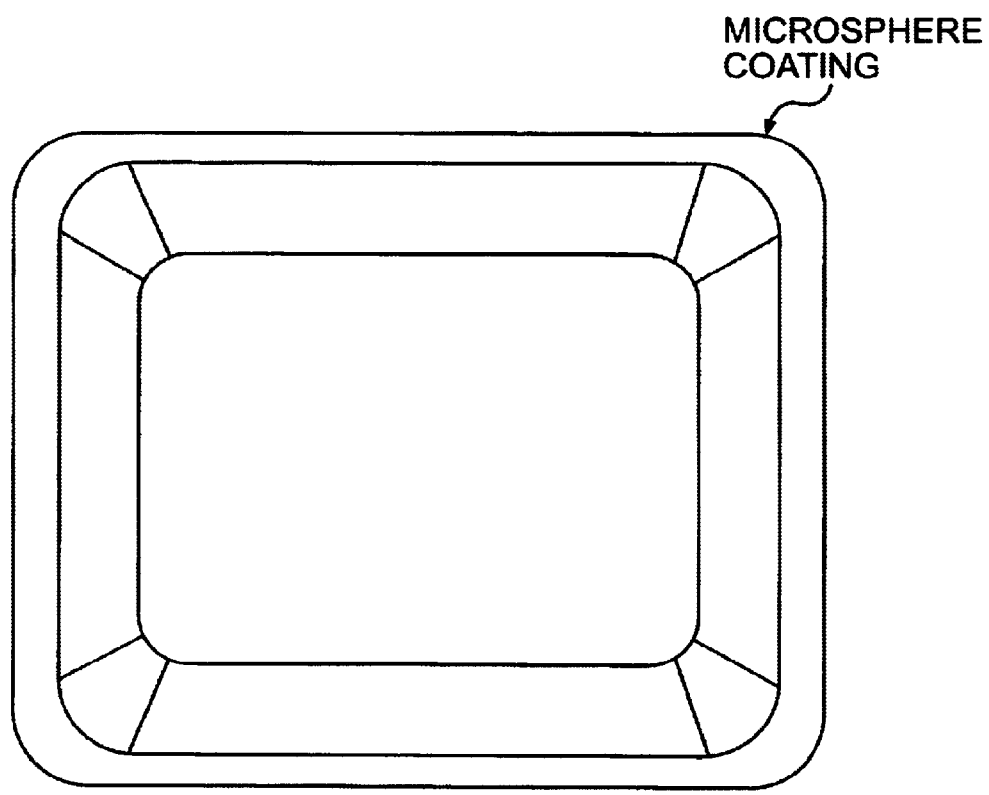
TOP VIEW
*FIG. 24*

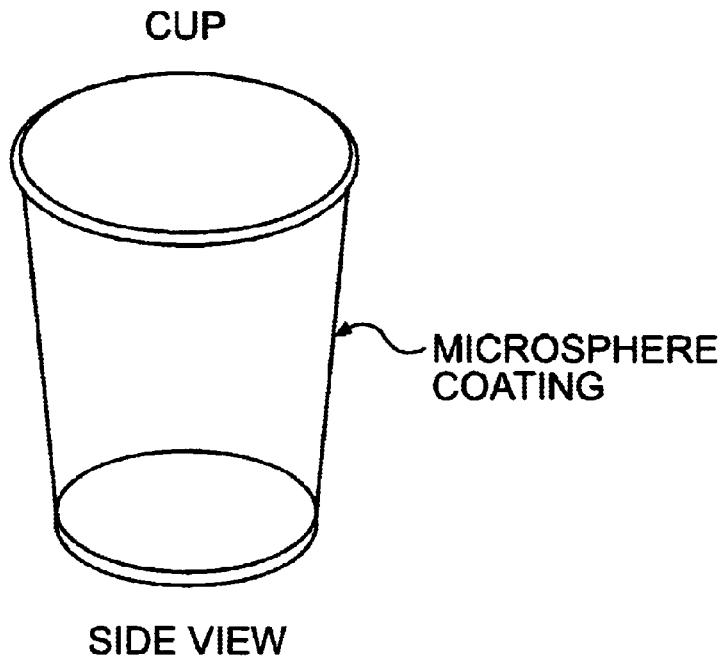
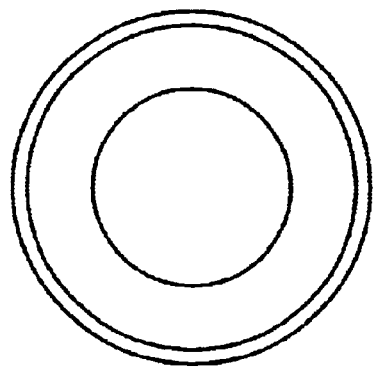
FIG. 25

CUP
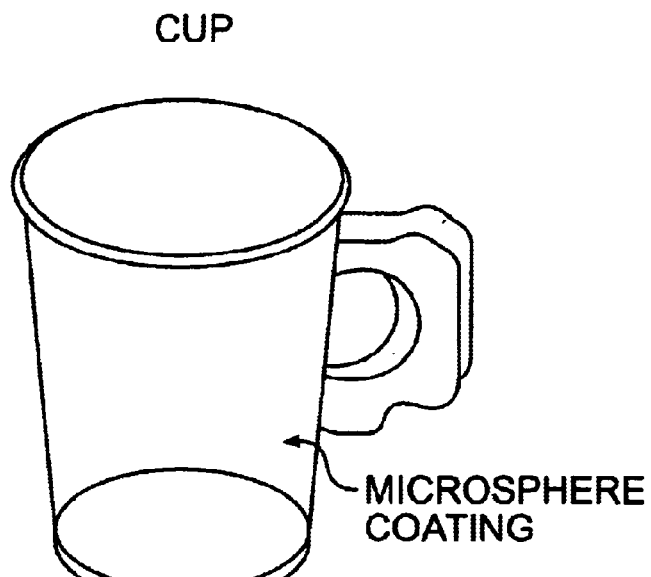
SIDE VIEW
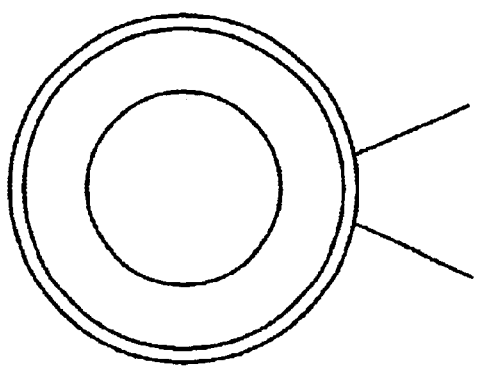
TOP VIEW
FIG. 26

FOOD BUCKET
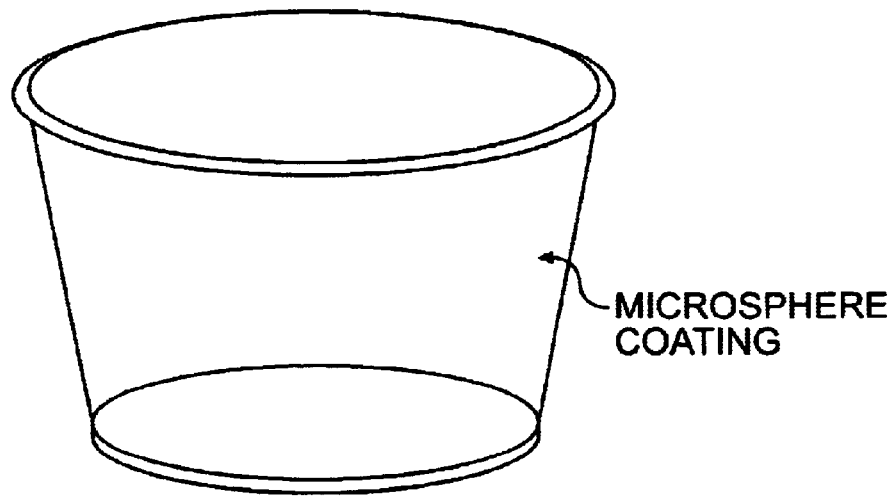
SIDE VIEW
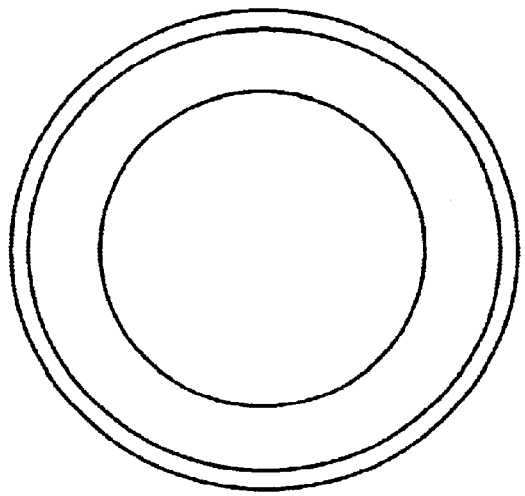
TOP VIEW
FIG. 27

BOWL WITH MICROWAVE SUSCEPTOR LAYER
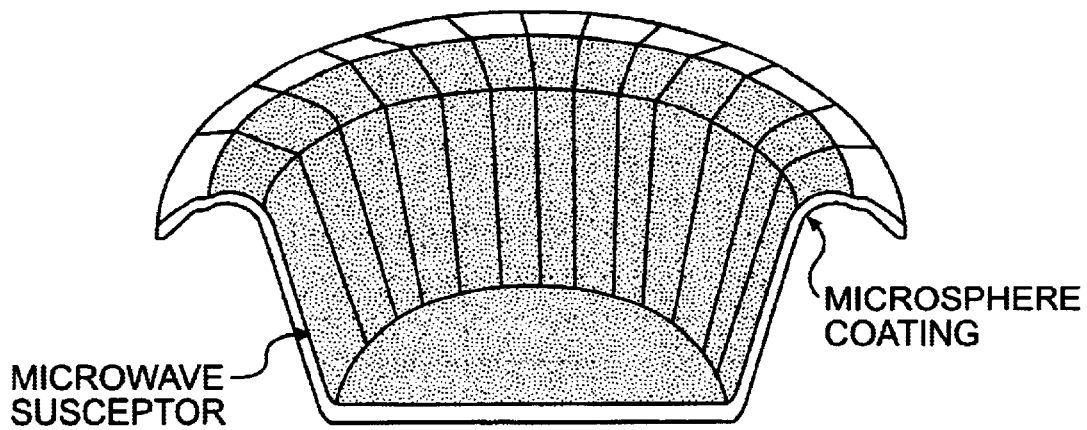
SIDE VIEW
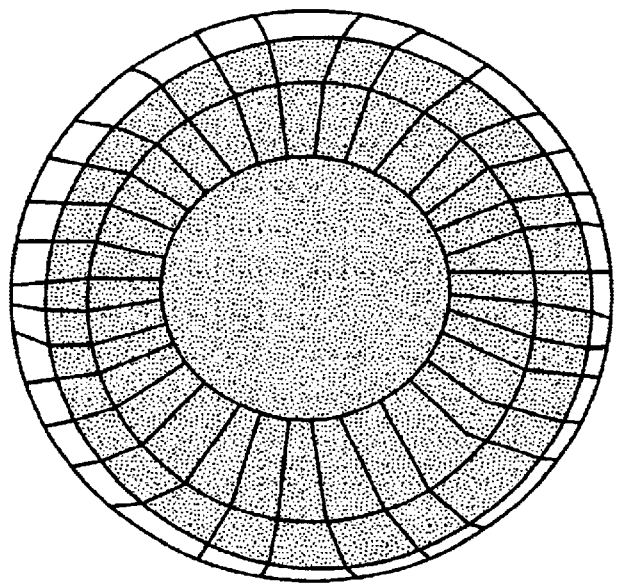
TOP VIEW
FIG. 28

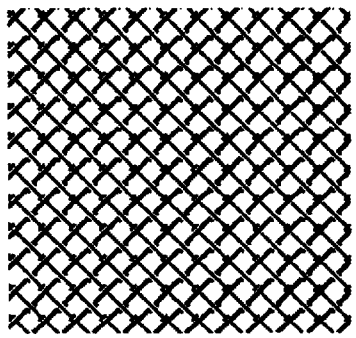
PLATE 1
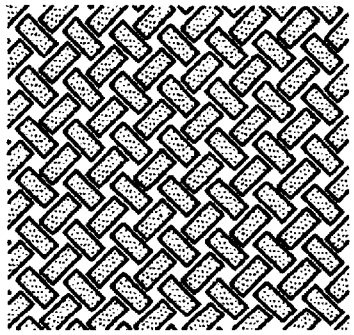
PLATE 5
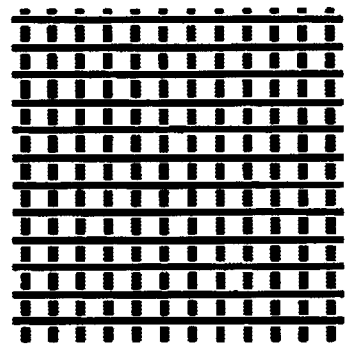
PLATE 2
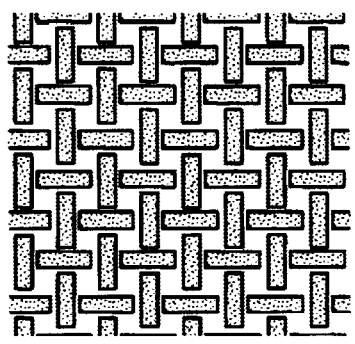
PLATE 6
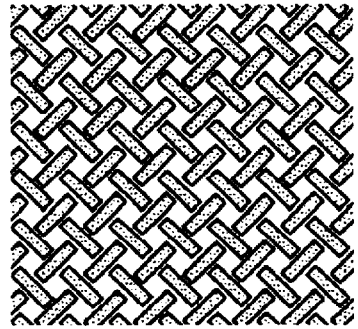
PLATE 3
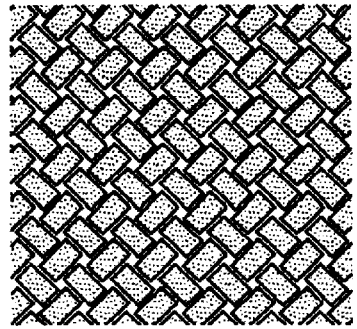
CUP 2
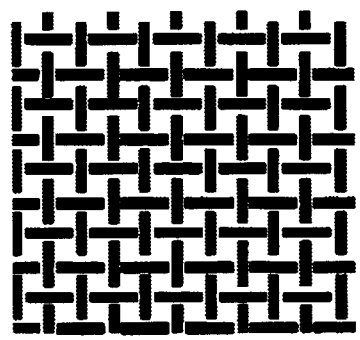
PLATE 4
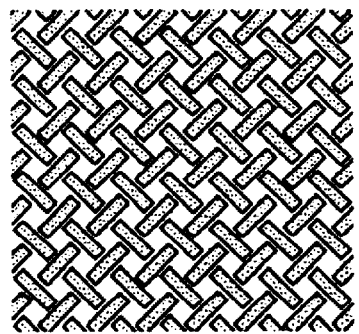
CUP 3
*FIG. 38*

COATED PAPERBOARDS AND PAPERBOARD CONTAINERS HAVING IMPROVED TACTILE AND BULK INSULATION PROPERTIES

RELATED APPLICATIONS

This is a continuation in part application of Ser. No. 08/806,947 which was filed on Feb. 26, 1997, now abandoned.

BACKGROUND OF THE INVENTION

FIELD OF THE INVENTION

This invention relates generally to processes for forming paperboard products and to the products formed by such processes. More particularly, this invention relates to a method of making disposable paperboard containers with textured coatings and to the texture-coated containers formed by that method. This invention also relates to coatings having superior bulk and insulation properties.

This invention relates to paperboards on which are printed insulating and/or textured coatings having a high coefficient of friction. The static coefficient friction of the paperbound has values of about 0.2 to 2.0 and above, preferably 0.3 to 1.0 and the kinetic coefficient of friction is about 0.22 to 2 suitably 2 to 1.5 and preferably 0.22 to 0.85. These values are shown in FIGS. 9A and 9B and are up to five times greater than the corresponding coefficient of friction values of conventional paper plates, plastic plates and foamed plates. The printing of the coating is an efficient, precise process and allows that only at least ten percent of the container surface has to be coated to achieve the beneficial insulation and handling properties. These containers are particularly suitable for use as hot drink containers since only a small portion of the outer surface of the container has to be printed. Competing foamed polyolefin insulated coating cannot be printed on the surface of the paperboard and consequently the whole side of the paperboard has to be coated. Thus, the coated containers of this invention having superior insulation and bulk properties, have greater inherent cost advantages over the prior art foamed polyolefin extrusion coated containers. Furthermore, registered texture coated containers exhibit excellent printing clarity and accuracy which cannot be obtained when coatings are prepared from foamed polyolefins.

BACKGROUND

Disposable paper containers, such as plates, trays, bowls, airline meal containers and cafeteria containers, are commonly produced by pressing flat paperboard blanks into the desired shape between appropriately shaped and heated forming dies. Various protective coatings are typically applied to the blanks before forming to make the resulting paperboard containers moisture-resistant, grease-resistant, more readily printable, etc. Often, printing is also applied to the top surface for decoration. A large number of paper products are produced by this method every year. These products come in many different shapes and sizes, including round, rectangular and polygonal. Many such containers, including for example airline meal containers, have a number of independent compartments separated by upstanding ridges formed in the inner areas of the containers.

When a container is made by pressing a flat paperboard blank, the blank must contain enough moisture to make the cellulosic fibers in the blank sufficiently plastic to permit it to be formed into the desired three-dimensional container shape. During the pressing operation, most of this moisture escapes from the uncoated bottom surface of the blank as water vapor. Suitable methods of producing paperboard containers from moistened paperboard blanks are generally described in U.S. Pat. Nos. 4,721,499 and 4,721,500, among others.

Many people prefer disposable containers which, when handled, produce a sense of bulkiness and grippability at least suggestive of the more substantial non-disposable containers which they replace. While a sense of bulkiness may be provided to some extent in styrofoam and thick pulp-molded containers, such containers suffer a number of drawbacks. For example, unlike pressed paperboard containers, styrofoam containers are often brittle and they are environmentally unfriendly because they are not biodegradable. Also, styrofoam containers are not cut-resistant and it is difficult to apply printing to the surface of styrofoam containers. Additionally, because of their bulkiness, styrofoam containers take up large amounts of shelf space and are costly to ship. Pulp-molded containers similarly are not cut-resistant and have poor printability characteristics. Additionally, pulp-molded containers typically have weak bottoms. Pressed paperboard containers, however, are cut-resistant, readily printable, strong in all areas, and are far less bulky than styrofoam or pulp-molded containers.

The present invention thus is an improvement in pressed paperboard containers. In the present invention, environmentally friendly disposable paperboard containers are formed. By printing the insulating textured coating on at least ten percent of one surface of the paperboard, the insulating and/or textured containers were formed which give users handling them a sense of bulkiness and grippability. These new containers rely on efficient processes of press-forming paperboard blanks. The resulting product, which consists primarily of cellulosic material, is nearly entirely biodegradable. Additionally, it will withstand normal microwave conditions without any significant change in caliper, it has substantially better thermal resistance when compared to prior disposable paperboard containers made without such an insulating and/or textured coating, and it tends to stay put when resting on a smooth surface due to the coefficient of friction of the textured coating. It should be noted that prior art polyolefin foamed coatings cannot be pattern applied and therefore have to cover the whole side of the board.

The data shown in FIGS. 9A and 9B deomonstrates that conventioinal paper plates have a coefficient of kinetic friction of about 0.18, plastic plates have a coefficient of kinetic friction of about 0.2 and foam plates have a kinetic coefficient of friction of slightly under 0.2. The coefficient of kinetic friction of the textured plates of this invention have values of about 0.61 to 1.4 up to 2.0 and more. Thus, the coefficient of kinetic friction of our texturized plates of this invention are about three to four times greater than for our conventional paper plates. Suitable coefficient of kinetic friction for our texturized containers is about 0.22 to about 1.5 advantageously 0.4 to 0.8 preferably 0.5 to 7.

The data shown in FIGS. 9A and 9B deomonstrate that conventional paper plates have a static coefficient of friction of 0.19, for plastic plates it is the same and for foam plates the static coefficient of friction is 0.2. The static coefficient of friction of the textured plates and containers of this invention have a static coefficient of friction of 0.22 to 2.0 and above, the preferred values are 0.8 to 1.6.

The texture coated cellulosic paperboard must reconcile several conflicting properties to be useful for the manufacture of plates, cups, bowls, canisters, French fry sleeves, hamburger clam shells, rectangular take-out containers, and related articles of manufacture. The coated paperboard has to have improved thermal resistance, improved formability, and, to be economical, the whole board should not be covered with the coating. All the conventional paperboards can be utilized; but for enhanced insulation properties, the fiber weight (hereinafter "w") of the paperboard should be at least about forty pounds for each three thousand square foot ream. Fiber weight is the weight of fiber in pounds for each three thousand square foot ream. The fiber weight is measured at standard TAPPI conditions which provide that the measurements take place at a fifty percent relative humidity at seventy degrees Fahrenheit. In general, the fiber weight of a 3000 square foot ream is equal to the basis weight of such a ream minus the weight of any coating and/or size press. The fiber mat density of the paperboard utilized in the manufacture of textured containers is in the range of about 3 to 9 pounds per 3000 square foot ream at a thickness of 0.001 inch. The preferred fiber mat density is in the range of about 4.5 to 8.3 pounds per 3000 square foot ream at a fiberboard thickness of 0.001 inch. To achieve the superior properties of textured paperboard containers, it has been discovered that the board at a fiber mat density of 3, 4.5, 6.5, 7, 8.3, and 9 pounds per 3000 square foot ream at a thickness of 0.001 inch, should have a GM Taber stiffness of at least 0.00716 $w^{2.63}$ grams-centimeter/fiber mat density$^{1.63}$, and a GM tensile stiffness of at least about 1890+24.2 w pounds per inch. The preferred GM Taber stiffness value for paperboards having the fiber mat density given above is 0.00501 $w^{2.63}$ grams-centimeter/fiber mat density$^{1.63}$, and the GM tensile stiffness is 1323+24.2 w pounds per inch. The high GM Taber stiffness values listed are desired to facilitate the bending of the paperboard into the aforementioned articles of manufacture and to provide these articles with greater rigidity. Likewise the high GM Taber and GM tensile stiffness prevents the plates, cups, and other articles of manufacture from collapsing when used by the consumer. The articles of manufacture can suitably be prepared from either one-ply or multi-ply paperboard as disclosed herein. Suitable one-ply and multi-ply paperboards comprise (a) predominantly cellulosic fibers, (b) bulk and porosity enhancing additive interspersed with the cellulosic fibers in a controlled distribution throughout the thickness of the paperboard, and (c) size press applied binder coating optionally including a pigment adjacent both surfaces of the paperboard and penetrating into the board to a controlled extent. The amount of size press applied is at least one pound for each three thousand square foot ream of paperboard having a fiber mat density of about 3 to below 9 pounds per 3000 square foot ream at a board thickness of 0.001 inches. For boards having a fiber mat density of 9 or greater per 3000 square foot ream at a board thickness of 0.001 inch, the amount of size press applied should be at least six pounds for each three thousand square foot ream. The overall fiber weight of the paperboard is at least 40 lbs. per 3000 square foot ream, suitably 60 to 320 lbs. per 3000 square foot ream, preferably 70 to 240 lbs. per 3000 square foot ream, most preferably 80 to 220 lbs. per 3000 square foot ream, and the distribution of the bulk and porosity enhancing additive is controlled so that at least twenty percent of the additive is distributed in the central layer and not more than 75 percent of the additive is distributed on the periphery of the paperboard with no periphery having more than twice the percent of the additive distributed in the central layer of the paperboard. The penetration of the size press applied binder and optionally pigment coating into board is controlled to produce a cellulosic fiber board web having at a fiber mat density of 3, 4.5, 6.5, 7, 8.3, and 9 pounds per 3000 square foot ream at a thickness of 0.001 inch, a GM Taber stiffness respectively of at least 0.00716 $w^{2.63}$ grams-centimeter/fiber mat density$^{1.63}$, and GM tensile stiffness of about 1890+24.2 w pounds per inch. The preferred GM Taber stiffness for the paperboard for the bulk enhanced fiberboard having a fiber mat density of 3, 4.5, 6.5, 7, 8.3, and 9 pounds per 3000 square foot ream at a board thickness of 0.001 inch is 0.00501 $w^{2.63}$ grams-centimeter/fiber mat density$^{1.63}$, and the preferred GM tensile stiffness is 1323+24.2 w pounds per inch. The GM tensile and GM Taber values for the web and one-ply board are the same. For multi-ply board the overall paperboard GM Taber stiffness and GM tensile stiffness are the same as for a one-ply paperboard. The aforementioned combination of GM Taber stiffness and GM tensile stiffness provides a paperboard which can readily be converted to useful high quality textured or insulation coated cups, plates, compartmented plates, bowls, canisters, French fry sleeves, hamburger clam shells, rectangular take-out containers, food buckets, and other consumer products and other useful articles of manufacture which have the outer surface partially texture coated and/or insulation coated.

SUMMARY OF THE INVENTION

The texture coated and/or insulation coated disposable paperboard containers of the present invention are formed from flat paperboard blanks having two surfaces by: 1) printing on one surface of the blank with a textured or insulating coating covering at least ten percent of the surface, suitably ten to ninety-five percent of the surface, and preferably twenty to) sixty, percent of the surface; the textured or insulating coating comprises a liquid polymeric binder mixed with either (a) microspheres, (b) gases, (c) glass beads, (d) hollow glass beads, and (e) a mixture of these wherein said binder, after being mixed with the aforementioned components, expands and cures when appropriately heated; 2) optionally coating the other surface of the blank with conventional grease-resistant, decorative and other coatings; 3) applying heat to expand and cure the surface printed with the textured and/or insulation coating; 4) optionally adding moisture to the two coated blanks; and 5) optionally applying heat and pressure to make a texture and/or insulation coated container. For superior insulation properties, solid glass beads are suitably replaced with hollow glass beads.

The data shown in FIGS. 9A and 9B demonstrate that conventional paper plates have a coefficient of kinetic friction of about 0.18, plastic plates have a coefficient of kinetic friction of about 0.2 and foam plates have a kinetic friction of slightly under 0.2. The coefficient of kinetic friction of the textured plates of this invention have values of about 0.61 to 1.4 and above. Thus, the coefficient of kinetic friction of our texturized containers including plates is about three to seven times greater than prior art paper plates. Suitable coefficient of kinetic friction for our texturized container is about 22 to about 2.0 and above 0.4 to 0.9 preferably 0.5to 0.7.

The data shown in FIGS. 9A and 9B demonstrate that conventional paper plates have a static coefficient of friction of 0.18. The static coefficient of friction of the textured plates and containers of this invention have a static coefficient of friction of 0.2 to 2.0 and above suitably 0.4 to 1.5 preferably 0.4 to 1.0. The static coefficient of friction of our plates and containers is about two to ten times greater than for conventional paper plates.

The liquid coating suitable for printing comprises a liquid polymeric binder mixed with one of the following: (a) gases, (b) microspheres, (c) glass beads, (d) hollow glass beads and (e) a mixture of these. The heat hardenable polymeric binder is liquid when applied to the paperboard blank. Any polymeric binder which is liquid at the application temperature and is compatible with the microspheres, gases, glass beads, hollow glass beads, or a mixture of these, and which cures as a result of heating can be used. Generally, in its cured state, the polymeric binder must adhere tightly to the substrate and it should not be unduly brittle, since brittle coatings tend to flake and pull away from the paperboard substrate. In a preferred embodiment, the polymeric binder will not harden until expansion of the microspheres or gases is substantially complete.

Examples of thermoplastic polymers, which may be used as binders include polymers of ethylenically unsaturated monomers, such as polyethylene, polypropylene, polybutenes, polystyrene, poly (a-methyl styrene), polyvinyl chloride, polyvinyl acetate, polymethyl methacrylate, polyethyl acrylate, polyacrylonitrile and the like; copolymers of ethylenically unsaturated monomers such as copolymers of ethylene and propylene, ethylene and styrene, and polyvinyl acetate, styrene and maleic anhydride, styrene and methyl methacrylate, styrene and ethyl acrylate, styrene and acrylonitrile, methyl methacrylate and ethyl acrylate, methyl methacrylate and acrylonitrile and the like; polymers and copolymers of conjugated dienes such as polybutadiene, polyisoprene, polychloroprene, styrene butadiene rubber, ethylene-propylene-diene rubber, acrylonitrile-styrene butadiene rubber and the like; saturated and unsaturated polyesters including alkyds and other polyesters; nylons and other polyamides; polycarbonates; polyethers; polyurethanes; epoxies; ureaformaldehydes, phenol-formaldehydes and the like.

In addition, such polymers can be formulated with curing or cross-linking agents which activate at microsphere or gas expansion temperatures to provide foamed, cured or cross-linked variations of the foregoing types of polymers. Such curing and cross-linking techniques are well-known in the art and include for example, the use of free radical generators such as peroxides and the like, compounds reactive with double bonds such as sulfur and the like, or compounds reactive with pendant groups of the polymer chain such as the reaction products of polyisocyanates with pendant hydroxyl groups, the reaction products of polyols with pendant isocyanate groups and the like.

One particularly preferred resin is Acronal S504, which is a styrene acrylic derivate (latex) manufactured by BASF Corporation of Parsippanny, N.J. having a solids level of about 50% by weight and a glass transition temperature of about 4 and containing, in mole percent:

| | |
|---|---|
| styrene | 14.8 |
| butyl acrylate | 53.6 |
| acrylonitrile | 25.7 |
| acrylic acid | 5.8 |

Airflex 456 is also suitable. It is a terpolymer emulsion of vinylchloride, ethylene and vinyl acetate having a glass transition temperature of about 0° to 3° C.

The coating formulation may also include a mineral filler to increase the solids level of the microsphere/polymericbinder or gas/polymeric binder mixture. The mineral filler should be present at a level of about 0 to 50 percent by weight and more preferably about 20 to 40 percent by weight. Suitable mineral fillers include, for example, kaolin clays, calcium carbonate, titanium dioxide, zinc oxide, chalk, barite, silica, talc, bentonite, glass powder, alumina, graphite, carbon black, zinc sulfide, alumina silica, and mixtures thereof. Hydrafine clay, which is a hydrated aluminum silicate or koalin with 0.9–2.5% titanium dioxide manufactured by J.M. Huber Corp. of Macon, Ga. is a preferred mineral filler.

Microspheres are suitable for coating our paperboard and containers; however, part or all of the microspheres can suitably be replaced with a gas, solid glass beads, or hollow glass beads. Suitable gases include: air, nitrogen, helium, isobutane, and other $C_1$ to $C_7$ hydrocarbons and etc.

The texturizing agent or insulation agent/polymeric binder mixture should be applied by printing in a generally uniform pattern covering at least about 10% and no more than about 95% of one surface area of the paperboard blank. Preferably, coverage will be about 30–50% of one surface area. The textured and/or insulating coating, after heating and curing, should exhibit a caliper ranging from about 0.001 to 0.015 inch and preferably from about 0.005 to 0.010 inch.

The features of the invention which are believed to be novel are set forth with particularity in the appended claims. The invention, together with further objects, features and advantages thereof, may best be understood by reference to the following detailed description taken in conjunction with the accompanying drawings.

BRIEF DESCRIPTION OF THE DRAWINGS

FIGS. 4a–4f are bottom views of containers made in accordance with the present invention showing alternate texture-coating arrays.

FIGS. 9A and 9B are bar graphs illustrating the kinetic and static coefficient of friction of the texture coated articles of this invention versus prior art articles.

FIG. 17 is a drawing of wax and polyethylene treated cups having an external textured microsphere coating.

FIG. 18 is a drawing of a plate having a textured microsphere outer coating.

FIG. 19 is a drawing of a bowl of this invention showing textured coating of the outer bottom of such bowl.

FIG. 20 is a drawing of a canister of this invention having its outer sides texture coated.

FIG. 21 is a drawing of a compartmented plate of this invention showing textured coating of the outer bottom of such plate.

FIG. 23 is a drawing of a rectangular take-out container of this invention with its outer surface texture coated.

FIG. 24 is a drawing of a hamburger clam shell with its outer surface texture coated.

FIGS. 25 and 26 are drawings of a cup with its outer surface texture coated.

FIG. 27 is a drawing of a food bucket with its outer surface texture coated.

FIG. 28 is a drawing of a texture coated bowl with microwave susceptors.

FIG. 38 shows side views of cups and bottom views of plates made in accordance with the present invention showing insulating and/or textured coating arrays.

DESCRIPTION OF THE PREFERRED EMBODIMENT

Figure 3:
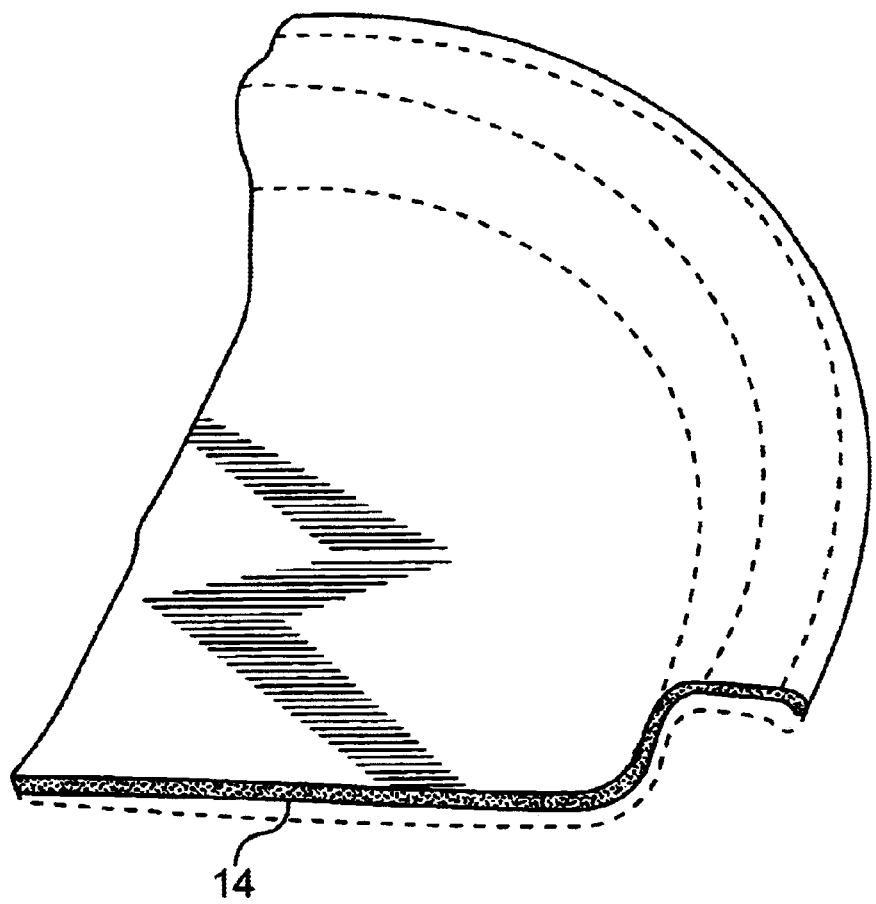
FIG. 3 is a perspective view of a section of a container in accordance with the invention.
Figure 5:
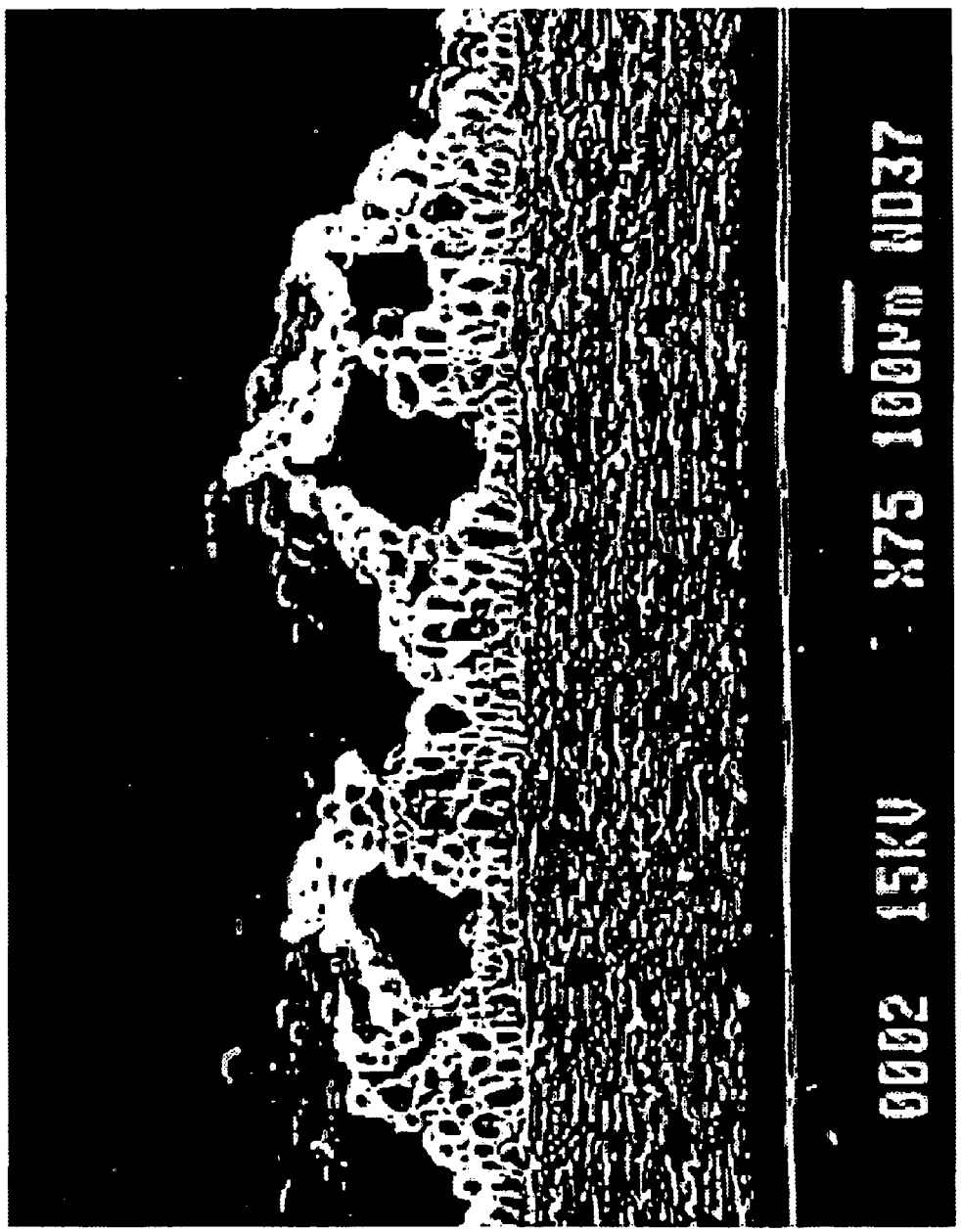
FIG. 5 is a photomicrograph of a 75× magnification of a section through a container prepared in accordance with the present invention having both gas pockets and microsphere pockets.
Figure 6:
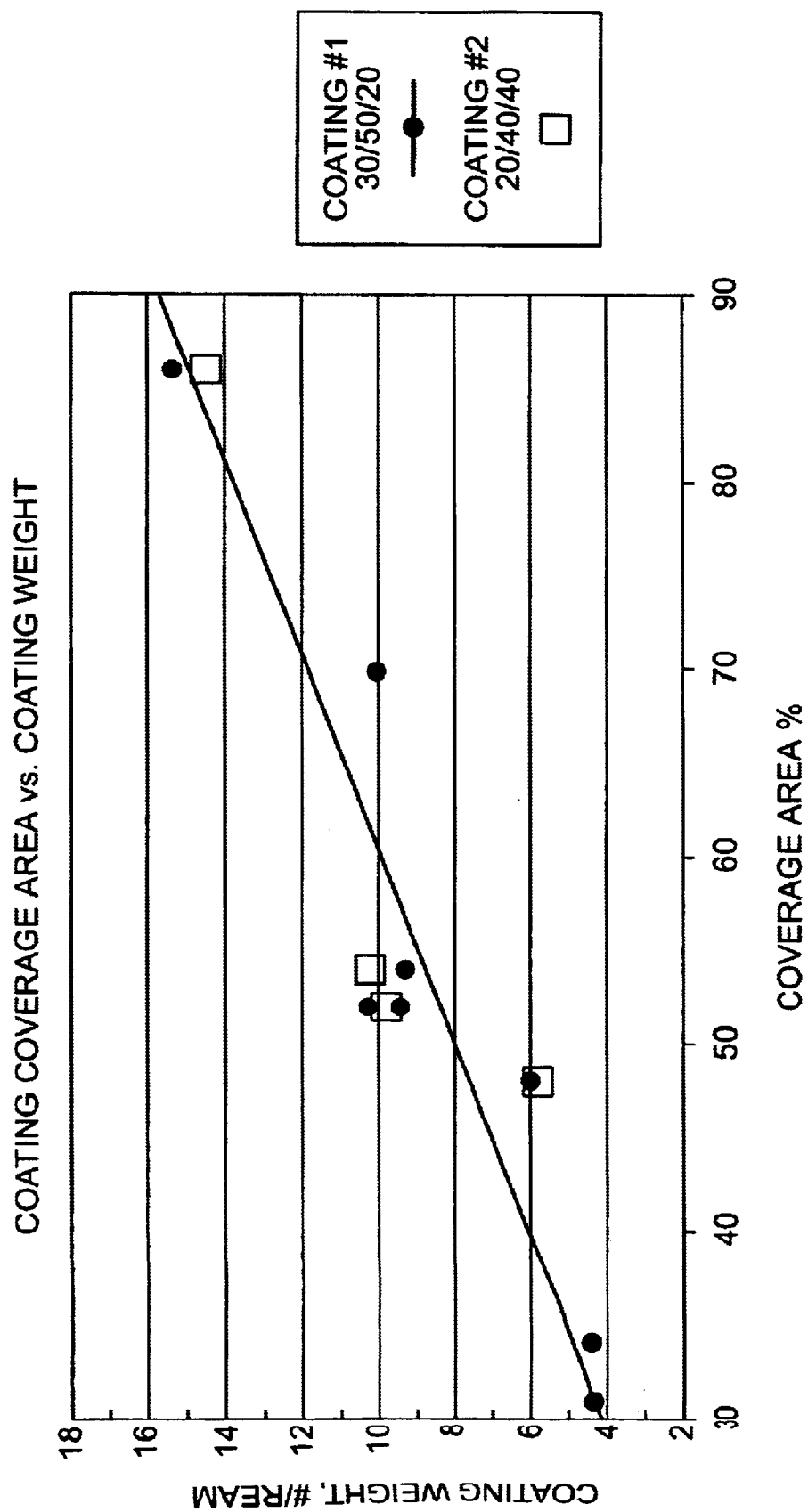
FIG. 6 is a graph illustrating the percent surface texture coated versus the weight of the coating in pounds for each 3000 square foot ream.

In accordance with the invention, a flat paperboard blank 10 is provided, having two surfaces designated top surface 12 and a bottom surface 14. In a commercial scale operation, blank stock in roll form would be used and blanks 10 would be die-cut from the roll after coating and optionally moistening and before molding, as discussed below. Top surface 12 of the blank is coated with conventional coatings represented by topcoat layer 16. Bottom surface 14 has a patterned coating 18 of a polymeric binder mixture and texturizing and/or insulation agent mixture. Suitably the texturizing and/or insulation agent is selected from microspheres, gases, glass beads, hollow glass beads, and a mixture of these. Suitable gases are air, nitrogen, helium, $C_1$–$C_7$ hydrocarbons and etc. This pattern coating is printed on surface 14 using conventional printing processes. Suitable printing processes are screen printing and rotogravure printing. After optionally moistening the coated blank, it is pressed into a desired shape, such as a plate, as shown in FIG. 3. As shown in the cross-sectional enlarged photomicrographic view of FIG. 5, coating 18 includes polymeric binder 20 and expanded microspheres 22.

Topcoat layer 16 may be formed by sizing the paperboard and then applying directly to the sized paperboard a base coat comprising a latex having a glass transition temperature of about −30° C. to about +30° C. and a pigment, and drying the applied base coat. A top coat comprising a latex and a pigment may then be applied directly to the base coat. Alternatively, nitrocellulose, lacquer, styrene acrylic polymers and terpolymer emulsions of vinyl chloride, ethylene and vinyl acetate having a glass transition temperature of about 0° to 3° C. are suitable. In general, the polymeric binder of the liquid texturizing and/or insulation agent/polymeric binder mixture is chosen from the group consisting of polymers of ethylenically unsaturated monomers, copolymers of ethylenically unsaturated monomers, polymers and copolymers of conjugated dienes, saturated and unsaturated polyesters, polycarbonates, polyethers, polyurethanes, epoxies, ureaformaldehydes, and phenol-formaldehydes. Advantageously, the polymeric binder of the liquid texturizing and/or insulating agent/polymeric binder mixture is chosen from the group consisting of copolymers of ethylenically unsaturated monomers such as copolymers of ethylene and propylene, ethylene and styrene, and polyvinyl acetate, styrene and maleic anhydride, styrene and methyl methacrylate, styrene and ethyl acrylate, styrene and acrylonitrile, methyl methacrylate and ethyl acrylate, methyl methacrylate and acrylonitrile. The coated paperboard is optionally gloss calendered to produce a grease, oil and cut resistant coated plate stock with improved varnish gloss and printing quality capable of maintaining these improved properties after being formed into substantially rigid plates, bowls, trays and similar containers.

Figure 1B:
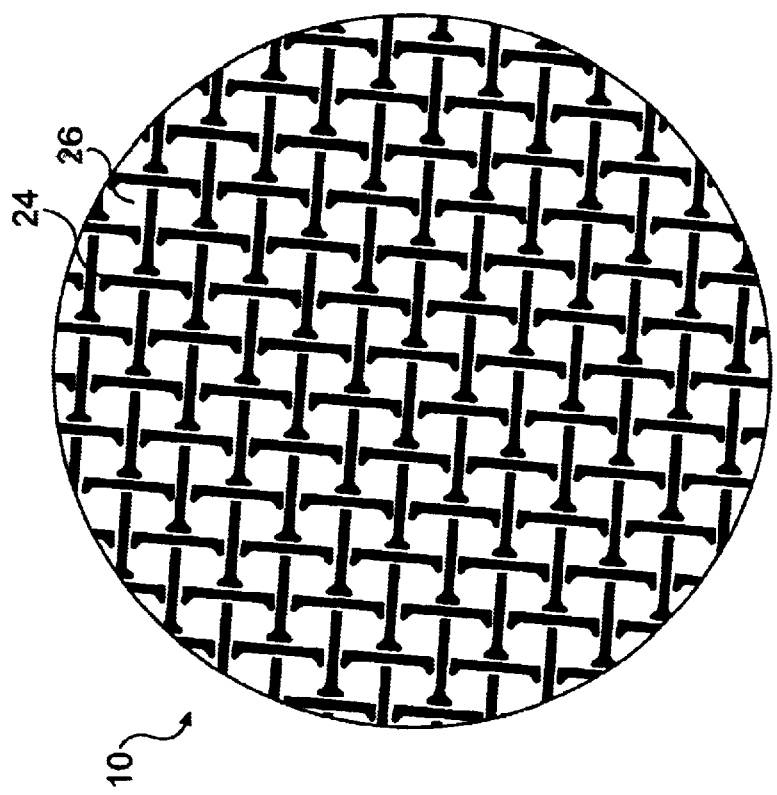
FIG. 1a is a view of a paperboard blank for forming a container in accordance with the invention prior to the application of the microsphere/polymerbinder mixture and FIG. 1b is a bottom view thereof; after application of the microsphere/polymericbinder mixture.
Figure 1A:
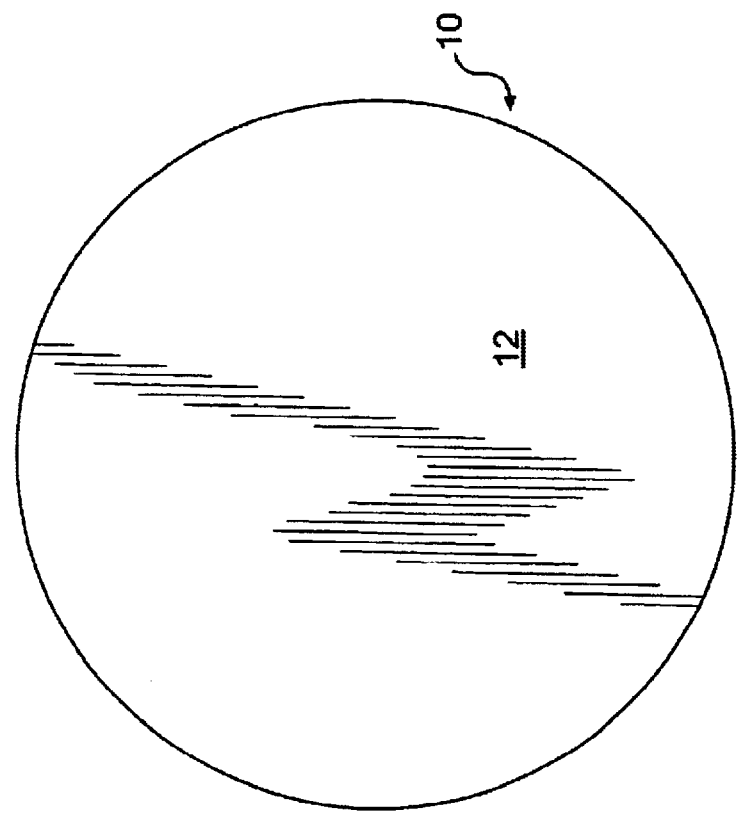
Figure 2:
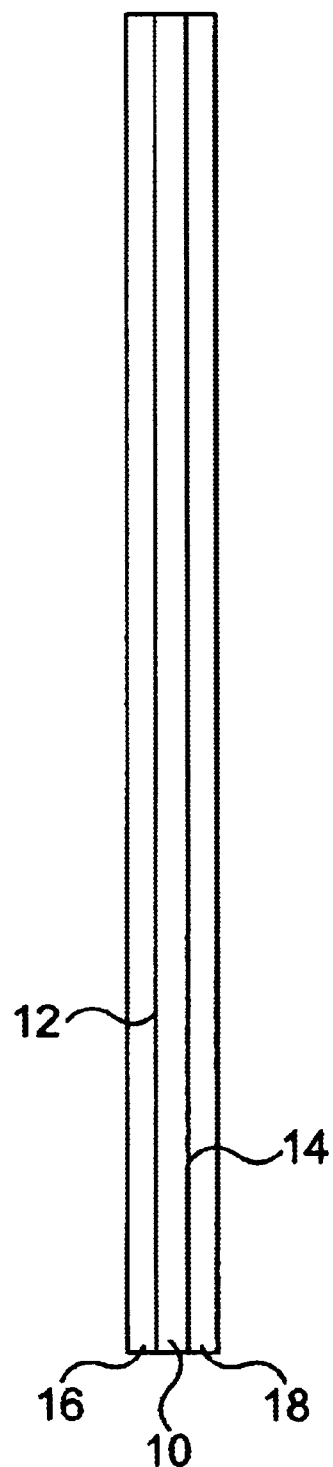
FIG. 2 is a side view of the paperboard blank of FIG. 1.

Patterned coating 18, as best seen in the bottom view of FIG. 1b, includes textured-coated and/or insulation coated areas 24 and open areas 26 which are free of coating. This permits water vapor to escape during formation of the container, primarily through open areas 26. In the absence of these open areas, the coatings on both the bottom and the top of the containers would blister and pull away.

In addition, the alternating coated and open areas on bottom surface 14 improve the ability of a user to securely grasp the container as compared to products having a smooth bottom surface. The improved grip thus improves consumer confidence in the handling of the product. Also, the textured coating of the container, which is of a low density due to the presence of the hollow expanded microspheres or gases, improves thermal resistance not only as a result of the insulating properties of the coating itself, but also because there is less hand contact with the paperboard substrate, which further minimizes heat transfer by careful printing of the coating. At least ten percent of outer surface of the container has to be coated to provide insulation to the hand holding such a container. Suitably ten to ninety-five percent of the surface can be coated, preferably 20 to 60 percent. Finally, the textured and/or insulation coating increases the coefficient of friction of the outer bottom or outer side surface of the container. As a result, the container will not easily move when one cuts food or otherwise manipulates the container as it rests on a smooth surface such as a tabletop or the laptop of the user. This property is particularly useful in such applications as airline meal containers.

The paperboard stock used for blank 10 preferably has a weight in the range of about 60 pounds to 400 pounds per 3000 square foot ream and a thickness or caliper in the range of about 0.008 inch to 0.055 inch. Paperboard having a basis weight and caliper in the lower end of this range are preferred when ease of forming and economic reasons are paramount. Also, for heat insulation and economy, bulk enhanced paperboards may be preferred to conventional paperboard. Suitable bulk enhanced paperboards are described in detail in U.S. Ser. No. 08/716,511, filed on Sep. 20, 1996, and Ser. No. 08/896,239 filed on Jul. 17, 1997, and both are incorporated herein in their entirety.

Advantageously, the bulk enhanced paperboard or conventional paperboard is conveniently pressed and textured and/or insulated into high quality articles of manufacture having excellent insulation properties and high coefficient of friction values. Useful textured articles and insulated articles made from the bulk enhanced paperboard or conventional paperboard include cups, plates, compartmented plates, bowls, canisters, French fry sleeves, hamburger clam shells, rectangular take-out containers, food buckets, hamburger wrap, textured heat insulating containers coated or laminated with a polyolefin and textured food containers with a microwave susceptor layer. The articles of manufacture are characterized by having excellent insulation properties and ease of handling. Representative containers are set forth in FIGS. 15–27. These properties are critical for textured and/or insulated hot and cold cups and textured and/or insulated plates of this invention. The bulk enhanced paperboard has at a fiber mat density of 3, 4.5, 6.5, 7, 8.3, 9 pounds per 3000 square foot ream at one thousandths of an inch board thickness (one caliper), a GM Taber stiffness of at least about 0.00716 $w_{2.63}$ grams-centimeter/fiber mat density$^{1.63}$, and a GM tensile of 1890+24.2 w pounds per inch. The preferred GM Taber stiffness at a fiber mat density of 3–9 pounds per 3000 square foot ream at one thousandth of an inch board thickness is 0.00501 $w^{2.63}$ grams-centimeter/fiber mat density$^{1.63}$, and the preferred GM tensile stiffness is 1323+24.2 w pounds per inch. The GM Taber stiffness values for a paperboard having a fiber mat density of 3, 4.5, 6.5, 7, 8.3 pounds per 3000 square foot ream at one thousandths of an inch board thickness, are 0.00120 $w^{2.63}$ grams-centimeter, 0.00062 $w^{2.63}$ grams-centimeter, 0.00034 $w^{2.63}$ grams-centimeter, 0.00030 $w^{2.63}$ grams-centimeter, and 0.00023 $w^{2.63}$ grams-centimeter, at a GM tensile stiffness of 1890+24.2 w pounds per inch. The preferred GM Taber stiffness values for a board having a fiber mat density of about 3,4.5, 6.5, 7, 8.3 pounds per 3000 square foot ream at one thousandths of an inch board thickness are 0.00084 $w^{2.63}$ grams-centimeter, 0.00043 $w^{2.63}$ grams-centimeter, 0.00024 $w^{2.63}$ grams-centimeter, 0.00021$w^{2.63}$ grams-centimeter, and 0.00016 $w^{2.63}$ grams-centimeter, at a GM tensile of 1323+24.2 w pounds per inch. At a fiber mat density of 3, 4.5, 6.5, 7 pounds per 3000 square foot ream at one thousandths of an inch board thickness, the GM Taber stiffness values are 0.00120 $w^{2.63}$ grams-centimeter, 0.00062 $w^{2.63}$ grams-centimeter, 0.00034 $w^{2.63}$ grams-centimeter, and 0.00030$w^{2.63}$ grams-centimeter, at a GM tensile stiffness of 1890+24.2 w pounds per inch. The preferred GM Taber stiffness values are 0.00084 $w^{2.63}$ grams-centimeter, 0.00043 $w^{2.63}$ grams-centimeter, 0.00024 $w^{2.63}$ grams-centimeter, and 0.00021 $w^{2.63}$ grams-centimeter, at a GM tensile of 1323+24.2 w pounds per inch.

The paperboard weight must be balanced against the lower strength and rigidity obtained with the lighter paperboard. No matter what paperboard is selected, the texturized and/or insulated containers of this invention have greater bulkiness, grippability and thermal resistance than prior containers formed of comparable paperboard. It is believed that bulk enhanced paperboards require less cellulosic fiber and therefore are less expensive than conventional paperboards. Bulk enhanced paperboards give higher insulation values, and therefore, lower amounts of the insulating agent have to be utilized.

The paperboard comprising the blank is typically bleached pulp furnish with double clay coating on one side. Preferably, the paperboard stock before forming has a moisture content varying from about 4.0% to 15.0% by weight. In forming the containers of the invention, the best results are achieved when the blank has a moisture content of about 9% to 11% by weight. In some applications the paperboard has a very low moisture content.

While various end uses for the containers of the invention are contemplated, typically they are used for holding liquids or foods which have substantial surface moisture. Accordingly, topcoat layer 16 preferably includes one or more layers of a liquid-proof coating material, such as a first layer of polyvinyl acetate emulsion and a second layer of nitrocellulose lacquer to improve gloss, smoothness, printability, moisture resistance, and grease resistance. For aesthetic purposes, top surface 12 may be printed with a design or other printing (not shown) before application of the liquid-proof coatings. It is also preferred that the materials used in the topcoat be heat resistant.

The preferred press (not shown) includes male and female die surfaces which define the shape and thickness of the container. Preferably, at least one die surface is heated so as to maintain a temperature during pressing of the blank in the range of about 200° F. to 400° F. Preferably the press imposes pressures on the blank in the range of about 300 psi to 1500 psi.

In accordance with the invention, either before or after the topcoat is applied, the polymeric binder in combination with one or more of the following selected from the group consisting of microspheres, gases, glass beads, hollow glass beads and a mixture of two or more of these is printed on the bottom surface of the blank. In a preferred embodiment, the microsphere/resin mixture is applied after the topcoat is applied and optionally the moisture is introduced after the polymeric binder containing microspheres, gas, glass beads, hollow glass beads, or a mixture of these is applied and cured. In this embodiment, the moisture will enter the paperboard blank through open areas 26 in the textured coating. In a less preferred alternative embodiment, the moisture is introduced before application of the top and bottom coatings.

The liquid microsphere/polymeric binder coating comprises a mixture of expandable microspheres or a mixture of microspheres, gases, glass beads, and hollow glass beads, in a heat-hardenable polymeric binder which is liquid when applied to the paperboard blank. Preferably from about 1 to 50 percent by weight of expandable microspheres will be used and most preferably about 10–30 percent by weight of microspheres will be used. Up to 100 percent of the microspheres can be replaced with glass beads, hollow glass beads, or a gas such as air, nitrogen, helium, oxygen, and aliphatic hydrocarbons such as ethane, propane, isobutane, pentane, and heptane, preferably about 20 to 60 percent of the microspheres are replaced with glass beads, hollow glass beads, or gases. Any polymeric binder which is liquid at the application temperature and compatible with the microspheres, and which cures as a result of heating can be used. Generally, in its cured state, the polymeric binder must adhere tightly to the substrate and it should not be unduly brittle, since brittle coatings tend to flake and pull away from the paperboard substrate. In a preferred embodiment, the polymeric binder will not harden until expansion of the microspheres and/or gases is substantially complete.

The expandable microspheres comprise thermoplastic, resinous, generally spherical shells containing a liquid blowing agent. The shells of the particles include a thermoplastic resin derived from the polymerization of, for example, an alkenyl aromatic monomer, an acrylate monomer, a vinyl ester or a mixture thereof. The blowing agent for these particles includes a volatile fluid-forming agent having a boiling point below the softening point of the resinous shell, for example, aliphatic hydrocarbons including ethane, propane, isobutane, pentane, heptane. The particles expand upon heating to a temperature sufficient to permit plastic flow of the wall and to volatilize at least a portion of the blowing agent sufficiently to provide adequate pressure to form the shell of the particle.

Suitable expandable microspheres are commercially available. Expancel microspheres, which are manufactured by Expancel Inc. of Sundsvall, Sweden, are presently preferred. These white, spherical particles have a thermoplastic shell encapsulating isobutane gas. The thermoplastic shell consists of a copolymer of vinylidene chloride and acrylonitrile that softens and expands as the encapsulated gas increases in pressure upon heating.

In the unexpanded form, the microspheres can be made in a variety of sizes; those readily available in commerce being most often on the order of 2 to 20 microns, particularly 3 to 10 microns. It is possible to make microspheres in a wider range of sizes, and the present invention is applicable to them as well. Microspheres can vary in size from 0.1 microns to 1 millimeter in diameter before expansion. While variations in shape are possible, the available microspheres are characteristically spherical, with the central cavity containing the blowing agent being generally centrally located. Dry, unexpanded microspheres typically have a displacement density of just greater than 1, typically about 1.1. When such microspheres are expanded, they are typically enlarged in diameter by a factor of 5 to 10 times the diameter of the unexpanded beads, giving rise to a displacement density, when dry, of 0.1 or less often about 0.03 to 0.06.

Suitably commercially available microspheres include the following supplied by Expancel Inc.: Expancel® 051, Expancel® 053, Expancel® 053-80, Expancel® 091-80, Expancel® 461, Expancel® 461-20, Expancel 642, Expancel® 551, Expancel® 551-20, Expancel® 551-80, Expancel 820 WU, and Expancel® KK; and Micropearl Microspheres F-30, F-50, and F-80 supplied by Matsumoto Yushi-Seivaku Co. These microspheres are also utilized in preparing the bulk-expanded paperboard as shown in Ser. No. 08/716,511 filed on Sep. 20, 1996, and Ser. No. 08/896,239 filed on Jul. 17, 1997, and both incorporated herein by reference.

The microspheres are optionally coated. The coating must be finely divided enough to be able to effectively blend with and adhere to the surfaces of the microspheres. The maximum major dimension of the particle size should be no larger than about the diameter of the expanded microspheres, and preferably less. The minor dimensions will generally be as small as possible, which imposes a de facto lower limit of effectively about 2 microns.

While the coating may be either organic or inorganic, there are ordinarily considerable advantages to the employment of inorganic materials as at least a substantial component of the coating. Such materials are commonly available in the dimensions of interest, they are common inclusions along with the microspheres in a wide diversity of foam formulations, they pose few problems in compounding and formulating end uses of the microspheres, and they are generally less expensive. It is also generally easier to assure that the coating does not itself develop undesirable characteristics in the processing, i.e., by becoming tacky itself or the like.

The coating materials are desirably materials which are pigments, reinforcing fillers, or reinforcing fibers in polymer formulations and thus are commonly used in the formulations where the microspheres are to be used. For example, talc, barium sulfate, alumina, such as particularly alumina tri-hydrate, silica, titanium dioxide, zinc oxide, and the like and mixtures of these may be employed. Other materials of interest include spherical beads, or hollow beads, of ceramics, quartz, or glass. Among the fibrous materials of interest are glass fibers, cotton flock, carbon and graphite fibers, and the like.

The retention aids used to expand the paperboard can also be coated continuously or discontinuously on the microspheres. The retention aids which function through coagulation, flocculation, or entrapment of the bulk additive can suitably be coated continuously or discontinuously on the microspheres. Mixtures of the coagulation, flocculation, and entrapment agents may advantageously be employed. Suitable coagulants coated on the microspheres include inorganic salts such as alum or aluminum chloride and their polymerization products (e.g. PAC or poly aluminum chloride or synthetic polymers); poly (diallyldimethyl ammonium chloride) (i.e., DADMAC); poly (dimethylamine)-co-epichlorohydrin; polyethylenimine; poly (3-butenyltrimethyl ammoniumchloride); poly (4-ethenylbenzyltrimethylammonium chloride); poly (2,3-epoxypropyltrimethylammonium chloride); poly (5-isoprenyltrimethylammonium chloride); and poly (acryloyloxyethyltrimethylammonium chloride). Other suitable cationic compounds having a high charge to mass ratio which can be coated on microspheres include all polysulfonium compounds, such as, for example the polymer made from the adduct of 2-chloromethyl; 1,3-butadiene and a dialkylsulfide, all polyamines made by the reaction of amines such as, for example, ethylenediamine, diethylenetriamine, triethylenetetraamine or various dialkylamines, with bis-halo, bis-epoxy, or chlorohydrin compounds such as, for example, 1–2 dichloroethane, 1,5-diepoxyhexane, or epichlorohydrin, all polymers of guanidine such as, for example, the product of guanidine and formaldehyde with or without polyamines.

Macromolecules useful for coating the microspheres include cationic starches (both amylose and amylopectin), cationic polyacrylamide such as for example, poly (acrylamide)-co-diallyldimethyl ammonium chloride; poly (acrylamide)-co-acryloyloxyethyl trimethylammonium chloride, cationic gums, chitosan, and cationic polyacrylates. Natural macromolecules such as, for example, starches and gums, are rendered cationic usually by treating them with 2,3-epoxypropyltrimethylammonium chloride, but other compounds can be used such as, for example, 2-chloroethyl-dialkylamine, acryloyloxyethyidialkyl ammonium chloride, acrylamidoethyltrialkylammonium chloride, etc. Dual additives useful for the dual polymer approach coated on the microspheres are any of those compounds which function as coagulants plus a high molecular weight anionic macromolecule such as, for example, anionic starches, CMC (carboxymethylcellulose), anionic gums, anionic polyacrylamides (e.g., poly(acrylamide)-co-acrylic acid), or a finely dispersed colloidal particle (e.g., colloidal silica, colloidal alumina, bentonite clay, or polymer micro particles marketed by Cite Industries as Polyflex). Natural macromolecules such as, for example, cellulose, starch and gums may be used as coatings for microspheres. These coatings are typically rendered anionic by treating them with chloroacetic acid, but other methods such as phosphorylation can be employed.

Retention agents used in entrapment are suitably coated continuously or discontinuously on the microspheres. Suitable coatings include high molecular weight anionic polyacrylamides or high molecular weight polyethyleneoxides (PEO) and a phenolic resin.

Any natural or synthetic thermoplastic polymer can be employed as the resin in the polymeric binder microsphere, glass bead, gas, or a mixture of these compositions, so long as it is liquid at the application temperature and it adheres well to the paperboard substrate after curing. Thermally cross-linkable or thermosettable polymers which react at microsphere expansion temperatures to a cross-linked or thermostat condition may be used. Of course, in all cases where the container are intended for use with food, the polymeric binder will have to be FDA approved.

Moisture may be introduced into the paperboard blank in the form of water or preferably as a moistening/lubricating solution which should be allowed to stand and distribute itself throughout the blank before the molding step. When blank stock in roll form is used, as in commercial scale operations, the blank stock is unrolled, coated as described above, wetted, rerolled and allowed to stand for up to 24 hours or more before die-cutting and molding is undertaken. One preferred moistening/lubricating solution comprises a polyolefin wax solution which acts both as a lubricant in the making operation and to introduce moisture in the paperboard blank to give the paperboard blank the required plasticity. The polyolefin wax solution may be obtained in the form of a concentrate container up to 39% by weight polyolefin wax, as well as an ethoxylated surfactant, with the balance water. Preferably, this solution will be diluted with about 50–100 parts water to 1 part of the concentrate. The polyolefin wax solution may be applied, for example, by rolling, spraying or brushing.

The polymeric binder mixture containing microspheres, glass beads, hollow glass beads, gases, or a mixture of these, or just gas may also include from about 0 to 0.5 percent by weight on a solids basis and preferably about 0.05 to 0.2 percent by weight on a solids basis of a rheology modifier for adjusting the viscosity of the composition as it is applied to the paperboard substrate. Suitable rheology modifiers include polymeric thickeners such as, for example, cellulosic thickeners including hydroxyethyl cellulose, carboxymethyl cellulose, associative thickeners such as nonionic hydrophobically modified ethylene oxide/urethane block copolymers, for example, Acrysol RM. 825 (Rohm and Haas Co.), anionic hydrophobically modified alkali soluble acrylic copolymers, for example, Alcogum L-29 (Alco Chemicals) and alginate thickeners such as, for example, Kelgin MV (Kelco Division of Merck and Company, Inc.) Alcogum L-29, which is an acrylic emulsion copolymer, is a particularly preferred rheology modifier. Finally, the microsphere/resin mixture may contain a colorant. A suitable colorant is Notox Ink, which is manufactured by Colorcon, Inc. of West Point, Pa.

The microsphere/polymericbinder mixture, the gas/polymeric binder mixture, the microsphere/gas polymeric mixture or the glass bead, hollow glass bead binder mixture may be printed on one surface of the paperboard using an offset rotogravure machine. Alternatively, any comparable system which is capable of applying the required high solids and high coat rates may be used. Screen printing is the preferred method for applying the texturized or insulating coating on the paperboard surface. Following application, the paperboard is passed through a dryer such as an infrared dryer heated to from about 200 to 500° F. and preferably about 225–300° F. for a period sufficient to cure the polymeric binder and expand the microspheres. This is followed by application of water or a moistening/lubricating solution as described above, which may be accomplished by conventional means such as by flexographic application, gravure application, spray application or mask application.

All conventional paperboards can be texture printed. To obtain special features, suitably bulk enhanced paperboards may be utilized. For paperboards having a fiber mat density of greater than 8.3 pounds for each 3000 square foot ream at a board thickness of 0.001 inch, advantageously 6 to 30 pounds of surface sizing agent is added for each three thousand square foot ream. Advantageously, 15 to 30 pounds of surface sizing agents are added for each 3000 square foot ream and preferably 16 to 19 pounds of the surface sizing agent is added for each 3000 square foot ream. The sizing agent functions to keep the GM tensile stiffness of the paperboard within the required parameters. By way of example, suitable surface sizing agents include starch, starch latex copolymers, animal glue, methyl cellulose, carboxymethyl cellulose, polyvinyl alcohol, and wax emulsions. Preferably, starch or a starch latex copolymer is employed as a sizing agent. By way of example, suitable commercially available sizing agents containing starch include "PENFORD® GUMS 200," "PENFORD® GUMS 220," "PENFORD® GUMS 230," "PENFORD® GUMS 240," "PENFORD® GUMS 250," "PENFORD® GUMS 260," "PENFORD® GUMS 270," "PENFORD® GUMS 280," "PENFORD® GUMS 290," "PENFORD® GUMS 295," "PENFORD® GUMS 300," "PENFORD® GUMS 330," "PENFORD® GUMS 360," "PENFORD® GUMS 380," "PENFORD® GUMS PENCOTE®," "PENFORD® GUMS PENSPRAE® 3800," "PENFORD® GUMS PENSURF," "PENGLOSS®," "APOLLO® 500," "APOLLO®600," "APOLLO® 600-A," "APOLLO® 700" "APOLLO® 4250," "APOLLO® 4260," "APOLLO® 4280," "ASTRO® GUMS 3010," "ASTRO® GUMS 3020," "ASTROCOTE® 75," "POLARIS® GUMS LV," "ASTRO®x50," "ASTRO®x100, " "ASTRO®x101," "ASTRO®x200," "ASTRO® GUM 21," "CALENDER SIZE 2283," "DOUGLAS®-COOKER 3006," "DOUGLAS®-COOKER 3007," "DOUGLAS®-COOKER 3012-T," "DOUGLAS®-COOKER 3018," "DOUGLAS®COOKER 3019," "DOUGLAS®-COOKER 3040," "CLEARSOL® GUMS 7," "CLEARSOL® GUMS 8," "CLEARSOL® GUMS 9," CLEARSOL® GUMS 10," "DOUGLAS®-ENZYME 3622," "DOUGLAS®-ENZYME E-3610," "DOUGLAS®-ENZYME E-3615," "DOUGLAS®-ENZYME 3022," "DOUGLAS®-ENZYME 3023," "DOUGLAS®-ENZYME 3024," "DOUGLAS®-ENZYME E," "DOUGLAS®-ENZYME EC," "CROWN THIN BOILING X-10," "CROWN THIN BOILING X-18," "CROWN THIN BOILING XD "CROWN THIN BOILING XF," "CROWN THIN BOILING XH," "CROWN THIN BOILING XJ," "CROWN THIN BOILING XL," "CROWN THIN BOILING XN," "CROWN THIN BOILING XP," "CROWN THIN BOILING XR," "DOUGLAS®-UNMODIFIED PEARL," and "DOUGLAS®-UNMODIFIED 1200." These sizing agents are all commercially available from Penford Products Co. "PENFORD®," "PENCOTE®," "PENSPRAE®," "PENGLOSS®," "APOLLO®," "ASTRO®," "ASTROCOTE®," "POLARIS®," "DOUGLAS®," and "CLEARSOL®" are all registered trademarks of Penford Products Co. Other suitable starches, including "SILVER MEDAL PEARL ," "PEARL B," "ENZO 32 D," ENZO 36W," ENZO 37D," SUPERFILM 245D," "SUPERFILM 270W," "SUPERFILM 240DW," "SUPERFILM 245D," SUPERFILM 270W," "SUPERFILM 280DW," "PERFORMER 1," "PERFORMER 2," "PERFORMER 3," "CALIBER 100," "CALIBER 110," "CALIBER 124," "CALIBER 130," "CALIBER 140," "CALIBER 150," "CALIBER 160," "CALIBER 170," "CHARGE+2," "CHARGE+4," "CHARGE+7," "CHARGE+9," "CHARGE+88," "CHARGE+99," "CHARGE+110," "FILMFLEX 40," "FILMFLEX 50," "FILMFLEX+60," and "FILMFLEX 70" are all commercially available from Cargill, Inc.

In our process for the manufacture of paperboard suitable for use in the texture coated paperboard containers of this invention, the usual conventional papermaking fibers are suitable and the bulk enhanced paperboards are preferred. We utilize softwood, hardwood, chemical pulp obtained from softwood and/or hardwood chips liberated into fiber by sulfate, sulfite, sulfide or other chemical pulping processes. Mechanical pulp was obtained by mechanical treatment of softwood and/or hardwood. Recycled fiber and other refined fiber may suitably be utilized in our paperboard manufacturing process.

Papermaking fibers used to form the high bulk paperboard useful for the manufacture of texture coated paperboard containers of the present invention include cellulosic fibers commonly referred to as wood pulp fibers, liberated in the pulping process from softwood (gymnosperms or coniferous trees) and hardwoods (angiosperms or deciduous trees). The particular tree and pulping process used to liberate the tracheid are not critical. Cellulosic fibers from diverse material origins may be used to form the web including cottonwood and non-woody fibers liberated from sabai grass, rice straw, banana leaves, paper mulberry (i.e., bast fiber), abaca leaves, pineapple leaves, esparto grass leaves, and fibers from the genus Hesperaloe in the family Agavaceae. Also recycled fibers which may contain any of the above fiber sources in different percentages can be used in the manufacture of the paperboard.

Papermaking fibers can be liberated from their source material by any one of the number of chemical pulping processes familiar to one experienced in the art including sulfate, sulfite, polysulfite, soda pulping, etc. The pulp can be bleached if desired by chemical means including the use of chlorine, chlorine dioxide, oxygen, hydrogen peroxide, etc. Furthermore, papermaking fibers can be liberated from source material by any one of a number of mechanical/chemical pulping processes familiar to anyone experienced in the art including mechanical pulping, thermomechanical pulping, and chemi-thermomechanical pulping. These mechanical pulps can be bleached, if one wishes, by a number of familiar bleaching schemes including alkaline peroxide and ozone bleaching.

Generally in our process the range of hardwood to softwood varies from 0–100% to 100 to 0%. The preferred range for hardwood to softwood is about 20 to 80 to about 80 to 20; the most preferred range of hardwood comprises about 40 to about 80 percent of the furnish and the softwood comprises about 60 to about 20 percent of the furnish.

Figure 35:
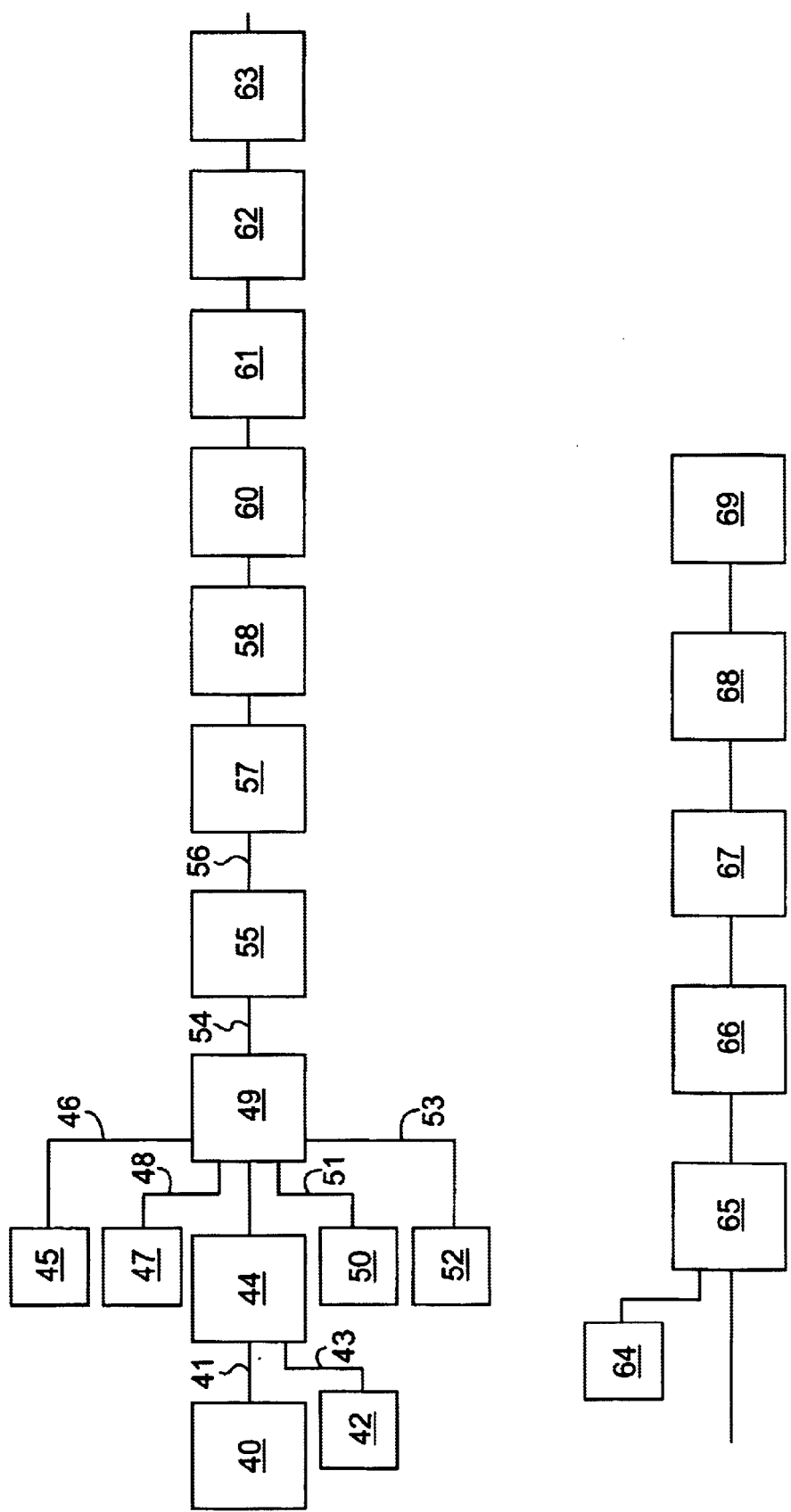
FIGS. 35 and 36 are drawings illustrating an optimum manufacturing process for the containers of this invention.
Figure 36:
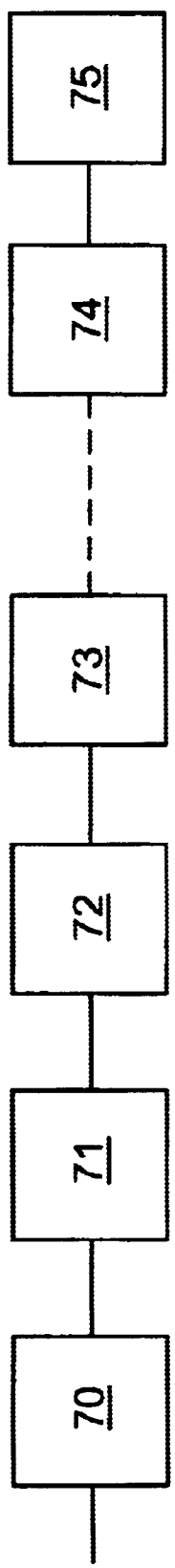

In FIG. 35 it is shown how a representative paperboard is manufactured and a textured and/or insulated paperboard prepared therefrom. In FIG. 35 it is shown that feedstock is pumped into the mix box 40. Alum and other internal sizing agents are added to the feedstock along line 41 prior to it being pumped into the machine chest (44). Optionally a wet strength agent such a Parez or Kymene is added to the feedstock through line (43) at the machine chest (44). Suitable wet strength agents are nitrogen containing polyamides. For food service products, if the food comes in contact with the wet strength agent, it has to be approved by the FDA. Representative polyamides are listed in European Patent Application 91850148.7 relating to polyamide epichlorohydrin (PAE) wet strength resins and that patent application is incorporated herein by reference. Parez 631NC which is a glyoxylated polyacrylamide is a suitable wet strength agent. In the stuff box (49) starch is charged through line (46), and optionally blue dye is charged through line (48); for pH control, a base such as caustic is charged through line (51) for bulk enhanced paperboard a retention aid is charged through line (53). For regular paperboards, no retention aid or bulk additive is utilized. The cationic starch is added through line (54) and prior to the cleaners (55). The bulk enhancing additive is optionally added after the mixture has been cleaned at the cleaners (55) and prior to the time it has reached the screens (57). The embryonic paperboard web is formed on the fourdrinier wire (58). The water is removed through a water removal apparatus (60). Initially the water is removed from the bottom side of the sheet through the fourdrinier table and from the top side of the web through the BelBond vacuum system. The web is heated with steam through steam showers (61), and the paperboard web is pressed in the press section (62) and dried in the dryer sections (63). Starch is supplied through line 64 to the size press (65). The web is passed through calender stacks (66) to smooth the web. Coating section (67) represents one to six coaters. The binder and optionally pigment is coated on both sides of the paperboard. Usually about three to six coatings are provided. For paper cup and related applications, usually the paperboard is not coated. The coated or uncoated paperboard is calendered in the gloss calender (68) and rolled on the reel (69). The paperboard is placed in a printing press (70) to print the textured coating on one side. Suitably a rotogravure press, flexopress, lithopress or screen printing is utilized. Advantageously two to eight colors are printed on the reel. The printed reel is placed in a coater (71) where optionally two plate coatings are applied. Optionally, the reeled web is suitably moistened in a wetting applicator (72) (Dahlgren Press). The moistened web is wound onto a reel (73). A moistened web is utilized in the manufacture of articles which require significant deformation of the board. Representative articles requiring significant deformation of the board are plates and bowls shown in FIGS. 15, 18, and 19.

Moisture may be introduced into the paperboard blank in the form of water or preferably as a moistening/lubricating solution. When blank stock in roll form is used, as in commercial scale operations, the blank stock is unrolled, coated as described above, wetted, rerolled, and allowed to stand for up to 24 hours or more before die-cutting is undertaken. One preferred moistening/lubricating solution comprises a polyethylene wax solution which acts both as a lubricant in the pressing operation and to introduce moisture in the paperboard blank to give the paperboard blank the required plasticity. In many applications water is the preferred moistening solution.

The paperboard material is texture and/or insulation coated on one side and suitably on the other side insulated with a useful coating polymer prior to formation of the paperboard shells used in forming the containers in accordance with the present invention. Polymers suitable for this purpose are polymers having a melting point below 270° C. and having a glass transition temperature ($T_g$) in the range of −150° to +120° C. Suitable polymers are polyolefins such as polyethylene and polypropylene, nitrocellulose, polyethylene terephthalate, Saran and styrene acrylic acid copolymers. Representative coating polymers include methyl cellulose, carboxymethyl cellulose acetate copolymer, vinyl acetate copolymer, styrene butadiene copolymer, and styrene-acrylic copolymer. The preferred polymer is a high density polyethylene for cups and other articles of manufacture.

As noted hereinabove, an additional means in aiding in the passing of the paperboard material into the forming die is the addition of a lubricant to the polyolefin or polyethylene coating which is applied to the paperboard material. By adding such lubricant, the leading edge of the paperboard material will not be prematurely caught in the forming die and thus permitted to pass completely into the forming die before the initial buckling takes place. It should also be noted that a lubricant may also be applied to the forming die itself.

In conventional containers, polyolefin coating, suitably polyethylene coating is applied to the paperboard material by way of an extruder and it is imperative that the polyolefin or polyethylene coating adhere to the paperboard material. In our novel process, the polyolefin coating is never the outer coating. Polyolefins are used as inner coatings or in the middle of the board coated further with another coating. In the novel paperboard and containers of this invention, the outer coating is a printed, textured, or insulation coating including one or more of the following: microspheres, gases, glass beads, hollow glass beads, and mixtures of one or more of these. To make the polyolefin adhere to the paperboard, one of three methods are generally used. These being one of a corona treatment, flame treatment, or polyethylene imine treatment better known in the art as a PEI treatment. Optionally the paperboard material is subjected both to a PEI treatment and a flame treatment in accordance with the present invention. This allows the lubricant containing polyolefin or polyethylene coating to adhere to the paperboard material resulting in a paperboard shell which passes further into the forming die when urged thus aiding in the control of the initial buckling point during formation of the brim curl in cups and other articles of manufacture having brims. All the containers of this invention have a printed, registered, textured or insulated, outer coating comprising a binder and texturizing or insulation agents selected from microspheres, gases, glass beads, hollow glass beads, or a mixture of these. In the texture printed containers of this invention, the polyolefin is coated on the inside surface of the container and the textured coating is printed on the outside surface of the container.

The paperboard used in the manufacture of the texture or insulation coated paperboard containers of this invention is suitably coated with a binder and an inorganic or organic pigment. The binder is selected from the group consisting of aliphatic acrylate acrylonitrile styrene copolymers, n-butyl acrylate acrylonitrile styrene copolymer, n-amyl acrylate acrylonitrile styrene copolymer, n-propyl acrylate acrylonitrile styrene copolymer, n-ethyl acrylate acrylonitrile styrene copolymer, aliphatic acrylate styrene copolymers, n-butyl acrylate styrene copolymers, n-amyl acrylate styrene copolymer, n-propyl acrylate styrene copolymer, n-ethyl acrylate styrene copolymer, cationic starch, anionic starch, amphoteric starch, starch latex copolymers, animal glue, gelatin, methyl cellulose, carboxymethylcellulose, polyvinyl alcohol, ethylene-vinyl acetate copolymer, vinyl acetate-acrylic copolymer, styrene-butadiene copolymer, ethylene-vinyl chloride copolymer, vinyl acetate polymer, vinyl acetate-ethylene copolymer, acrylic copolymer, styrene-acrylic copolymer, stearylated melamine, hydrophilic epoxy esters and mixtures of these. The pigment is selected from the group consisting of a clay, chalk, barite, silica, talc, bentonite, glass powder, alumina, titanium dioxide, graphite, carbon black, zinc sulfide, alumina silica, calcium carbonate and mixtures of these.

The bulk enhanced cellulosic board and the regular board have been subjected to sizing and contains a sizing agent. Any suitable sizing technique known in the art may be used. By way of example, suitable sizing techniques include surface sizing and internal sizing. In some special applications, 0–6 pounds of sizing agent is used for each three thousand square foot ream. For hamburger wrap applications, the paperboard can have a basis weight of about 10–60 pounds. For other applications, the basis weight of the paperboard is from about 60 to 400 pounds for each 3000 square foot ream. For paperboards having a fiber mat density of about 3 to 8.3 pounds per 3000 square foot ream at 0.001 inch board thickness, suitably 1 to 30 pounds of surface sizing is added to a three thousand square foot ream. For paperboards having a fiber mat density of greater than 8.3 pounds per 3000 square foot ream at 0.001 inch board thickness, advantageously 6 to 30 pounds of surface sizing agent is added for each three thousand square foot ream. Advantageously, 15 to 30 pounds of surface agents are added for each 3000 square foot ream and preferably 16 to 19 pounds of the surface sizing agent is added for each 3000 square foot ream. The sizing agent functions to keep the GM tensile stiffness of the paperboard within the required parameters. By way of example, suitable surface sizing agents include starch, starch latex copolymers, animal glue, methyl cellulose, carboxymethyl cellulose, polyvinyl alcohol, and wax emulsions. Preferably, starch or a starch latex copolymer is employed as a sizing agent. By way of example, suitable commercially available sizing agents were listed previously in this specification.

The cationic wet strength agent used in the manufacture of the paperboard can be selected from among those cationic wet strength agents known in the art such as dialdehyde starch, polyethylenimine, mannogalactan gum, glyoxal, and dialdehyde mannogalactan. A particularly useful class of wet strength agent is cationic glyoxylated vinylamide wet strength resins.

Glyoxylated vinylamide wet strength resins useful herein are described in U.S. Pat. No. 3,556,932 to Coscia. These resins are typically reaction products of glyoxal and preformed water soluble vinylamide polymers. Suitable polyvinylamides include those produced by copolymerizing a vinylamide and a cationic monomer such as 2-vinylpyridine, 2-vinyl-N-methylpyridinium chloride, diallyldimethyl ammonium chloride, etc. Reaction products of acrylamide diallyldimethyl ammonium chloride in a molar ratio of 99:1 to 75:25 glyoxal, and polymers of methacrylamide and 2-methyl-5-vinylpyridine in a molar ratio of 99:1 to 50:50, and reaction products of glyoxal and polymers of vinyl acetate, acrylamide and diallyidimethyl ammonium chloride in a molar ratio of 8:40:2 are more specific examples provided by Coscia. These vinylamide polymers may have a molecular weight up to 1,000,000, but polymers having molecular weights less than 25,000 are preferred. The vinylamide polymers are reacted with sufficient glyoxal to provide a water soluble thermoset resin. In most cases the molar ratio of glyoxal derived substituents to amide substitutes in the resin is at least 0.06:1 and most typically 0.1:1 to 0.2:1. A commercially available resin useful herein is Parez 631NC sold by Cite. Industries.

The cationic wet strength agent is generally added to the paperboard web in an amount up to about 8 pounds per ton or 0.4 wt %. Generally, the cationic wet strength agent is provided by the manufacturer as an aqueous solution and is added to the pulp in an amount of about 0.05 to 0.4 wt % and more typically in an amount of about 0.1 to 0.2 wt %. Unless otherwise indicated, all weights and weight percentages are indicated herein on a dry basis. Depending on the nature of the resin, the pH of the pulp is adjusted prior to adding the resin. The manufacturer of the resin will usually recommend a pH range for use with the resin. The Parez 631NC resin can be used at a pH of about 4 to 8.

Other wet strength agents used in preparing the textured paperboards of this invention can be selected from among those aminoplast resins. (e.g., urea-formaldehyde and melamine-formaldehyde) resins and those polyamine-epichlorohydrin, polyamine epichlorohydrin or polyamide-amine epichlorohydrin or polyamide-amine epichlorohydrin resins (collectively "PAE resins") conventionally used in the papermaking art. Representative examples of these resins are described throughout the literature. See, for example, *Wet Strength in Paper and Paperboard*, TAPPI Monograph Series No. 29, TAPPI Press (1952) John P. Weidner, Editor, Chapters 1, 2 and 3 and U.S. Pat. Nos. 2,345,543 (1944); 2,926,116 (1965); and 2,926,154 (1960). Typical examples of some commercially available resins include the PAE resins sold by Hercules under the name Kymene, e.g., Kymene 557H and by Georgia Pacific under the name Amres, e.g., Amres 8855.

Kymene type wet strength agent is added to the paper fiber in an amount up to about 8 pounds per ton or 0.4 wt % and typically about 0.01 to 0.2 wt % and still more typically about 1 to 2 pounds per ton or 0.5 to 0.1 wt %. The exact amount will depend on the nature of the fibers and the amount of wet strength required in the product. These resins are generally recommended for use within a predetermined pH range which will vary depending upon the nature of the resin. For example, the Amres resins are typically used at a pH of about 4.5 to 9. It should be understood that since the use of the bulk enhanced paperboard of the invention will be used to make articles used in connection with food service, all the wet strength additives used to make articles for food service products should have FDA approval if the wet strength agents come into direct contact with the food products.

Suitable binders include cationic starches, anionic starches, amphoteric starches, starch latex copolymers, animal glue, gelatin, methyl cellulose, carboxymethylcellulose, polyvinyl alcohol, ethylene-vinyl acetate copolymer, vinyl-acetate-acrylic copolymer, styrene butadiene copolymer, vinyl acetate-ethylene copolymer, acrylic copolymer, styrene acrylic copolymer, stearylated melamine, hydrophilic epoxy esters. Preferred binders include aliphatic-acrylate-acrylonitrile styrene copolymers such as the n-butyl-acrylate-acrylonitrile styrene copolymer, the n-amyl-acrylate-acrylonitrile styrene copolymer, the n-propyl-acrylate-acrylonitrile styrene copolymer, the n-ethyl-acrylate acrylonitrile styrene copolymer, and aliphatic acrylate styrene copolymers such as n-butyl acrylate styrene copolymer, n-amyl acrylate styrene copolymer, n-propyl acrylate styrene copolymer, or n-ethyl acrylate styrene copolymers. The preferred styrene-acrylic-acrylonitrile binder is BASF Acronal S 504. Suitable styrene-acrylic-acrylonitrile binders manufactured by BASF include Acronal S 888 S, and Acronal DSA 2285 X. Suitable styrene acrylonitrile binders manufactured by Dow Chemical Company include Latex XU 30879.50, Latex XU 30978.51, and Latex XU 30955.50. Suitable styrene acrylic polymers manufactured by BASF include Acronal S 304, Acronal S 760, Acronal 296 D, Acronal S 400, Acronal NS 567, Acronal S 702, Acronal S 728, and Acronal NX 4786. Styrene acrylic polymers manufactured by B. F. Goodrich include Carboset® GA-1086, Carboset® GA-2137, Carboset® GA-1161, and Carboset® XPD-2299. Styrene acrylic polymers manufactured by Morton International include Morton 4350, Morez® 101LS, Morez® 200, Morcryl® 132, Morcryl® 134, Morcryl® 350, Lucidene® 202, Lucidene® 361, and Lucidene® 371. Styrene acrylic polymers manufactured by Reichhold International include Reichhold Pa. 7002.

The binder used in the manufacture of the paperboard, optionally in conjunction with the pigment, is applied in the coating section. Advantageously the clay pigment may be any suitable clay known to the art. For example, suitable pigments include kaolin clay, engineered clays, delaminated clays, structured clays, calcined clays, alumina, silica, aluminosilicates, talc, zinc sulfide, bentonite, glass powder, calcium sulfate, ground calcium carbonates, precipitated calcium carbonates, barite, titanium dioxide, and hollow glass or organic spheres. These pigments may be used individually or in combination with other pigments. Preferably the clay is selected from the group consisting of kaolin clay and conventional delaminated pigment clay. A commercially available delaminated pigment clay is "HYDRA-PRINT" slurry, supplied as a dispersion with a slurry solids content of about 68%. "HYDRAPRINT" is a trademark of Huber.

The pigment composition may also comprise other additives that are well known in the art to enhance the properties of coating compositions or are well known in the art to aid in the manufacturing process. For example, suitable additives include defoamers, antifoamers, dispersants, lubricants, film-formers, crosslinkers, thickeners and insolubilizers.

A suitable defoamer includes "Foamaster DF122NS" and "Foamaster VF." "Foamaster DF122NS" is a trademark of Henkel.

A suitable organic dispersant includes "DISPEX N-40" comprising a 40% solids dispersion of sodium polycarboxylate, "DISPEX N40" is a trademark of Allied Colloids and Berchem® 4290; a complex organic dispersant; and Berchem® 4809, a polyacrylate dispersant supplied by Berchem Inc. Other suitable dispersants are Accumer® 9000 and Accumer® 9500, polyacrylate dispersants; Tamol® 731; Tamol® 850, a sodium salt of polymeric carboxylic acid; Tamol® 960, a sodium salt of a carboxylated acrylic polyelectrolyte; and Tamol® 983, an organic polyacid dispersant. The Tamol dispersants are supplied by the Rohm & Haas Company. Polyphosphates and hexametaphosphates are also suitable dispersants.

A suitable coating lubricant includes "BERCHEM 4095" which is a 100% active coating lubricant based on modified glycerides. "BERCHEM 4095" is a trademark of Berchem. Other suitable lubricants are Berchem® 4000, a polyethylene emulsion; Berchem® 4060, a polyethylene emulsion; Berchem® 4110; Berchem® 4113, a modified diglyceride; Berchem® 4300, a fatty acid dispersion; Berchem ® 4320, a fatty acid dispersion; and Berchem® 4569, a diglyceride emulsion, all supplied by Bercen Inc. In addition, the following lubricants are utilized: HTI Lubricant 1000, calcium stearate; HTI Lubricant 1100, a calcium stearate/polyethylene co-emulsion; and HTI Lubricant 1050, a polyethylene/carnauba wax co-emulsion supplied by Hopton Technologies, Inc.; and Sunkote® 455, calcium stearate supplied by Sequa Chemicals, Inc.

Suitable thickeners including the sodium alginate moiety are: Kelgin® LV, Kelgin® XL, Kelgin® RL, and Kelgin® QL; SCOGIN™ QH, SCOGIN™ LV, and SCOGIN™ QL. Other suitable thickeners are propylene glycol alginates such as Kelcolloid® LVF; treated sodium alginates such as Kelgin™ QM and Kelgin® QL. The Kelgin products are supplied by Merck & Co., Inc., and the Scogin products are supplied by Pronova Biopolymer, Inc.

The deposition of the mixture onto the wire may be referred to as web laydown and an embryonic paper web is formed thereby. The embryonic web comes off the screen and is carried on various fabrics or felts where it undergoes wet pressing by suitable papermaking apparatus known in the art. After wet pressing, the embryonic web is about 60% water and about 40% papermaking fiber and other solid material discussed previously.

The embryonic web then undergoes further drying processes, such as by means of vacuum boxes, through-air dryers, steam heated dryers, gas-fired dryers, or other suitable methods. When the bulk-enhancing agent comprises expandable microspheres, the drying of the embryonic web is done for a sufficient time and at a sufficient temperature to cause the microspheres to expand by the amount desired for the textured container application. In one preferred laboratory process, after wet-pressing, the paperboard web is further dried using a suitable drying apparatus, such as that of M/K Systems, Inc., Series 8000, advancing the web at 3' per minute and exposing it to a temperature of 125° C., one pass per web side.

The higher moduli and thicker size-press layers, in turn, improve bending and GM tensile stiffness of the bulk enhanced paperboard. Improved bending and GM tensile and GM stiffness mean a desired rigidity or stiffness of paperboard may be obtained with a reduced fiber weight of papermaking fibers and other materials. This use of the notably less expensive paperboard enhances the competitiveness of the textured and/or insulated container of this invention. Thus the ability to reduce fiber weight while maintaining a desired rigidity, in turn, reduces raw material costs for the textured containers of this invention. Suitable bulk enhanced paperboards utilized in the manufacture of the textured and/or insulated containers of this invention have at a fiber mat density of 3, 4.5, 6.5, 7, 8.3, 9 pounds per 3000 square foot ream at a fiberboard thickness of 0.001 inch, a GM Taber stiffness of at least about 0.00716 $w^{2.63}$ grams-centimeter/fiber mat density$^{1.63}$, and a GM tensile of 1890+24.2 w pounds per inch.

The preferred GM Taber stiffness is 0.00501 $w^{2.63}$ grams-centimeter/fiber mat density$^{1.63}$, and the preferred GM tensile stiffness is 1323+24.2 w pounds per inch. The GM Taber stiffness values for a paperboard having a fiber mat density of 3, 4.5, 6.5, 7, 8.3 pounds per 3000 square foot ream at a fiberboard thickness of 0.001 inch are 0.00120 $w^{2.63}$ grams-centimeter, 0.00062 $w^{2.63}$ grams-centimeter, 0.00034 $w^{2.63}$ grams-centimeter, 0.00030 $w^{2.63}$ grams-centimeter, and 0.00023 $w^{2.63}$ grams-centimeter, at a GM tensile stiffness of 1890+24.2 w pounds per inch. The preferred GM Taber stiffness values for a board having a fiber mat density of about 3, 4.5, 6.5, 7, 8.3 pounds per 3000 square foot ream at a fiberboard thickness of 0.001 inch, are 0.00084 $w^{2.63}$ grams-centimeter, 0.00043 $w^{2.63}$ grams-centimeter, 0.00024 $w^{2.63}$ grams-centimeter, 0.00021 $w^{2.63}$ grams-centimeter, and 0.00016 $w^{2.63}$ grams-centimeter, at a GM tensile stiffness of 1323+24.2 w pounds per inch. At a fiber mat density of 3, 4.5, 6.5, 7 pounds per 3000 square foot ream at a fiberboard thickness of 0.001 inch, the GM Taber stiffness values are 0.00120 $w^{2.63}$ grams-centimeter, 0.00062 $w^{2.63}$ grams-centimeter, 0.00034 $w^{2.63}$ grams-centimeter, and 0.00030$w^{2.63}$ grams-centimeter, at a GM tensile stiffness of 1890+24.2 w pounds per inch. The preferred GM Taber stiffness values are 0.00084 $w^{2.63}$ grams-centimeter, 0.00043 $w^{2.63}$ grams-centimeter, 0.00024 $w^{2.63}$ grams-centimeter, and 0.00021 $w^{2.63}$ grams-centimeter, at a GM tensile stiffness of 1323+24.2 w pounds per inch. These values are achieved in the paperboard manufacturing process by controlling the dispersion of bulk and porosity additives throughout the thickness of the paperboard and controlling the extent of penetration of the size press applied binder and optionally pigment. Advantageously, the overall fiber weight of the paperboard is controlled to be at least 40 lbs. per 3000 square foot ream. This value is usually in the range of 60 to 320 lbs. per 3000 square foot ream, preferably 80 to 220 lbs. per 3000 square foot ream. However, paperboard having an overall fiber weight of 3 to 40 pounds per 3000 square foot ream are useful for the manufacture of textured containers of this invention.

For certain applications, the textured paperboard has one side (to be used as the outside wall of the container) printed with the microsphere polymeric binder, glass bead or hollow glass bead polymeric binder, the gas polymeric binder coating, or a mixture of these; and on the other side, the resulting paperboard web may be coated with a polyolefin layer, preferably a polyethylene layer. Such a layer is particularly useful inside a paper cup. This cup has an inner and an outer surface which when filled with a liquid at 190° F. exhibits thermal insulation properties such that the outer surface where the hand touches the textured insulation coating does not reach a temperature of more than 145° F. in less than forty seconds. To apply the polyethylene layer, the paper web or paper blank is sprayed with a suitable fast-drying adhesive, as is the polyethylene sheet material, after which the polyethylene sheet material and the paper web or blank are laminated together by any suitable means, such as by a press nip.

The paperboard containing bulk enhancing additives have improved formability which is useful in all shaping applications that require deformation of the paperboard. This property of the paperboard is particularly useful in the top curl forming for rolled brim containers such as textured cups. The improved formability of the paperboard also facilitates the drawing of textured plates.

Improving the distribution and retention rate of the microspheres and gases in the paperboard improves its thermal resistance, smoothness, strength, and rigidity. The preferred die or press, includes male and female die surfaces which define the shape and thickness of the article of manufacture. Preferably, at least one die surface is heated so as to maintain a temperature during pressing of the blank in the range of about 200° F. to 400° F. Preferably the press imposes pressures on the blank in the range of about 300 psi to 1500 psi.

In many food applications it is desirable to coat the textured paperboard or the textured article of manufacture with a wax having a melting point of about 130° F. to 150° F. The wax is applied on the surface opposite the one on which the textured coating has been printed. The following examples are intended to be illustrative of the present invention and to teach one of ordinary skill how to make use of the invention. These examples are not intended to limit the invention or its protection in any way.

EXAMPLE 1

A. A coating formulation was optimized for initial silk-screen application on platestock. Tables 1 and 2 below contain pertinent coating information.

TABLE 1

COATING FORMULATIONS

| Component | Coating #1 Component % of Total Solids | Coating #2 Component % of Total Solids | Component % Solids | Component pH | Order of Addition to Mixture |
|---|---|---|---|---|---|
| Expancel 820 | 30 | 20 | 42 | 7.0 | 2 |
| Acronal S504 | 50 | 40 | 50 | 7.4 | 1 |
| Hydrafine Clay | 20 | 40 | 70 | 6.8 | 3 |
| Alcogum L-29 | <1% | <1% | 30 | — | 4 |
| Notox Brown | As desired | — | — | — | 5 |
| Monolith Blue | — | As desired | — | — | 5 |

TABLE 2

COATING CHARACTERISTICS

| | Solids % | Viscosity CPAs | pH |
|---|---|---|---|
| Coating #1 | 52.4 | >10,000 | 7.0 |
| Coating #2 | 54.5 | >13,000 | 7.1 |

Plate samples were screen printed using the following methods and equipment: The screens used were stretched with Saatilene gold monofilament polyester mesh from Majestech Corporation. The mesh count used was 110 threads per inch at a tension level of 17 Newtons/cm, giving a theoretical deposit level of 3.47 cu. in./sq. yd. The screens were coated with Ulano 925WR, a direct water-resistant photo emulsion. They were scoop-coated with 2 coats on each side (wet on wet). After the screens were dried they were exposed with a Nuarac 2000 watt Metal Halide exposing unit. The samples were screen printed using a Saturn 25"×38" model 'clam shell' printer manufactured by M & R Printing Equipment, Inc., the squeegee & flood speeds were set at 6. Other settings were: Off-contact at ⅛th", peel adjustment @ ½" and the print/flood option on. The squeegee used had a sharp edge with a shore hardness of 70 durometers. The stock was then run through a Tex-Air 410-48 forced air electric dryer manufactured by American Screen Printing Company. The forced air temp. was approx. 265 degrees Fahrenheit and the infra red panels have a temperature of about 800 degrees Fahrenheit. The belt speed was set at 3.

B. FIGS. 4a–4f and FIG. 38 are representative texture coating patterns. Table 3 and FIGS. 4 and 38 below indicate the approximate coverage area of each pattern and the actual coat weight applied for each coating.

TABLE 3

COVERAGE AREA AND COAT WEIGHT

| Pattern in FIG. 38 | Coverage Area % | Coating #1 Coat Weight Ream Pounds Per 3000 sq. ft. ream | Coating #2 Coat Weight Ream Pounds Per 3000 sq. ft. ream |
|---|---|---|---|
| Plate 1 | 34 | 4.8 | — |
| Plate 2 | 48 | 6.0 | 5.8 |
| Plate 3 | 52 | 9.4 | — |
| Plate 4 | 31 | 4.5 | — |
| Plate 5 | 70 | 9.9 | — |
| Plate 6 | 54 | 9.2 | 10.3 |
| Cup 2 | 86 | 15.4 | 14.6 |
| Cup 3 | 52 | 10.7 | 9.7 |

Figure 7:
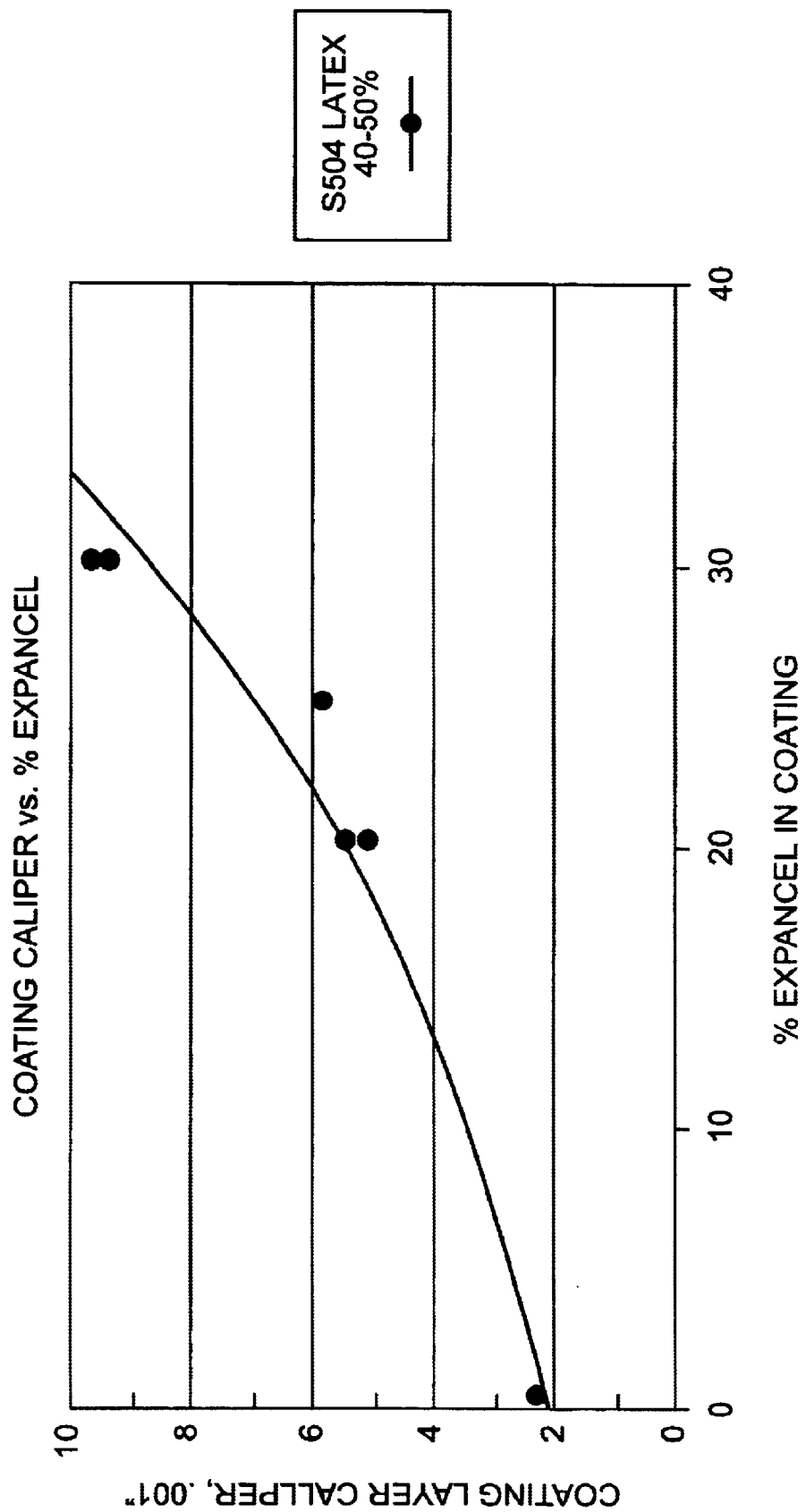
FIG. 7 is a graph illustrating the coating layer caliper versus the percent of the microspheres in the textured coating.
Figure 8:
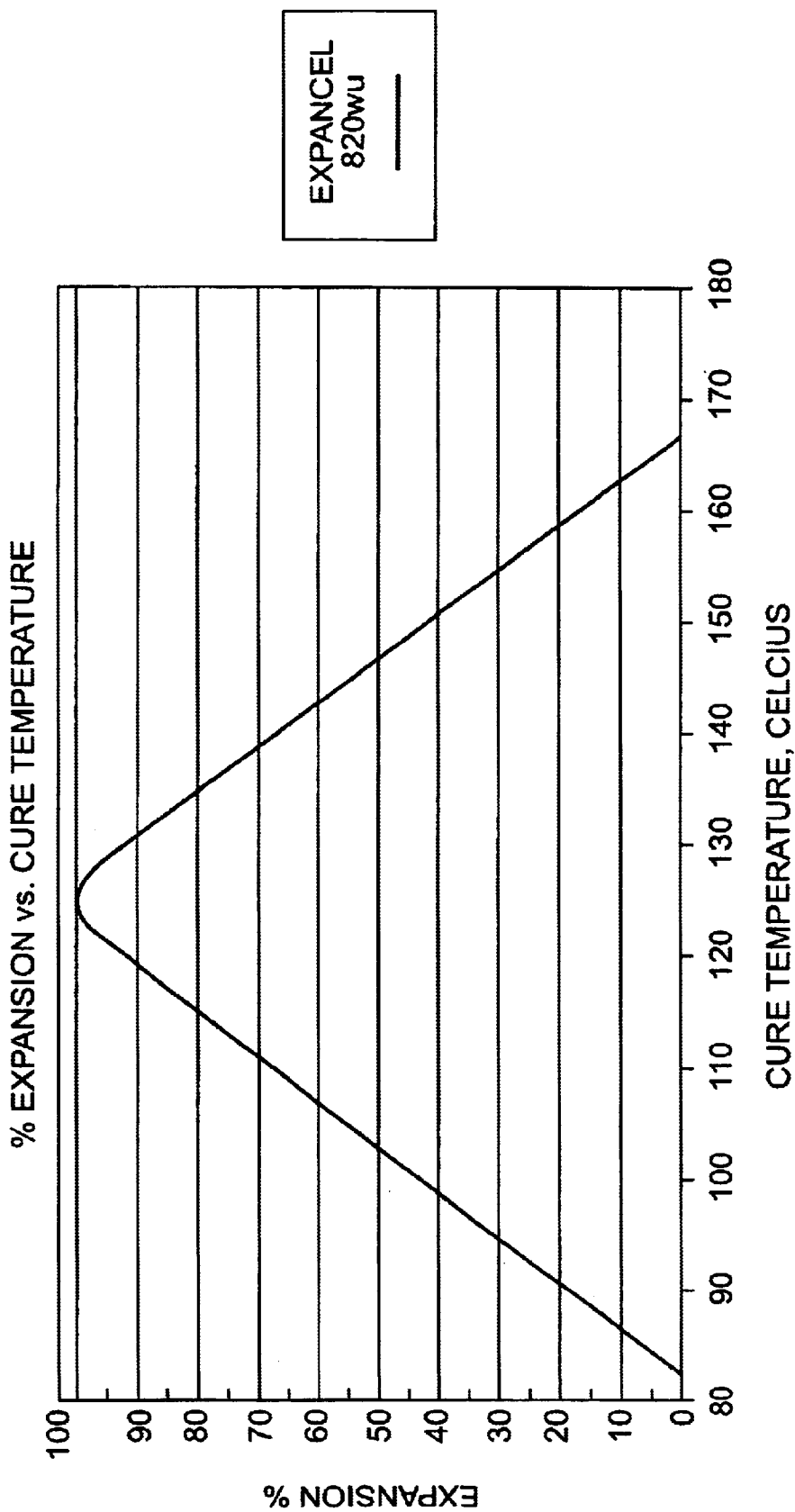
FIG. 8 is a graph illustrating the microsphere composition in the textured coating in percent versus the cure temperature.

C. Perceptual bulk enhancement is a function of coating thickness and pattern. Actual bulk enhancement is primarily a function of microsphere percentage in the coating formulation, curing temperature of the coating, and the thickness of "wet" coating applied. Another factor that may control expansion of the microspheres is cure time of the polymeric binder. FIG. 7 reveals the change in dry coating caliper that results with microsphere addition. Data include variables where cure temperatures were close to the optimum 125 degrees Celsius and polymeric binder comprising 40–50% of total coating solids. FIG. 8 illustrates the approximate effects of cure temperature on coating expansion from manufacturer literature.

Figure 9A:
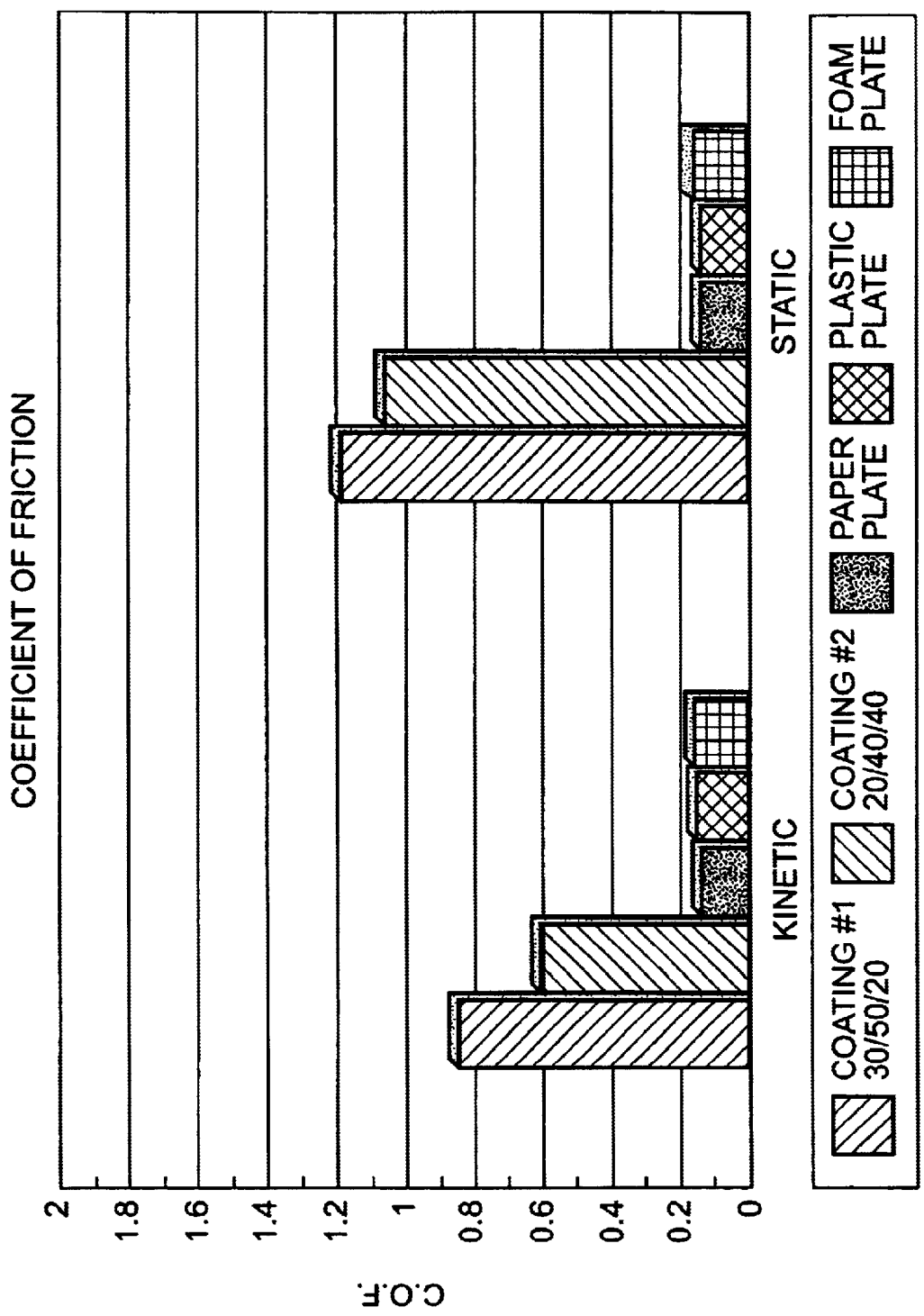
Figure 10:
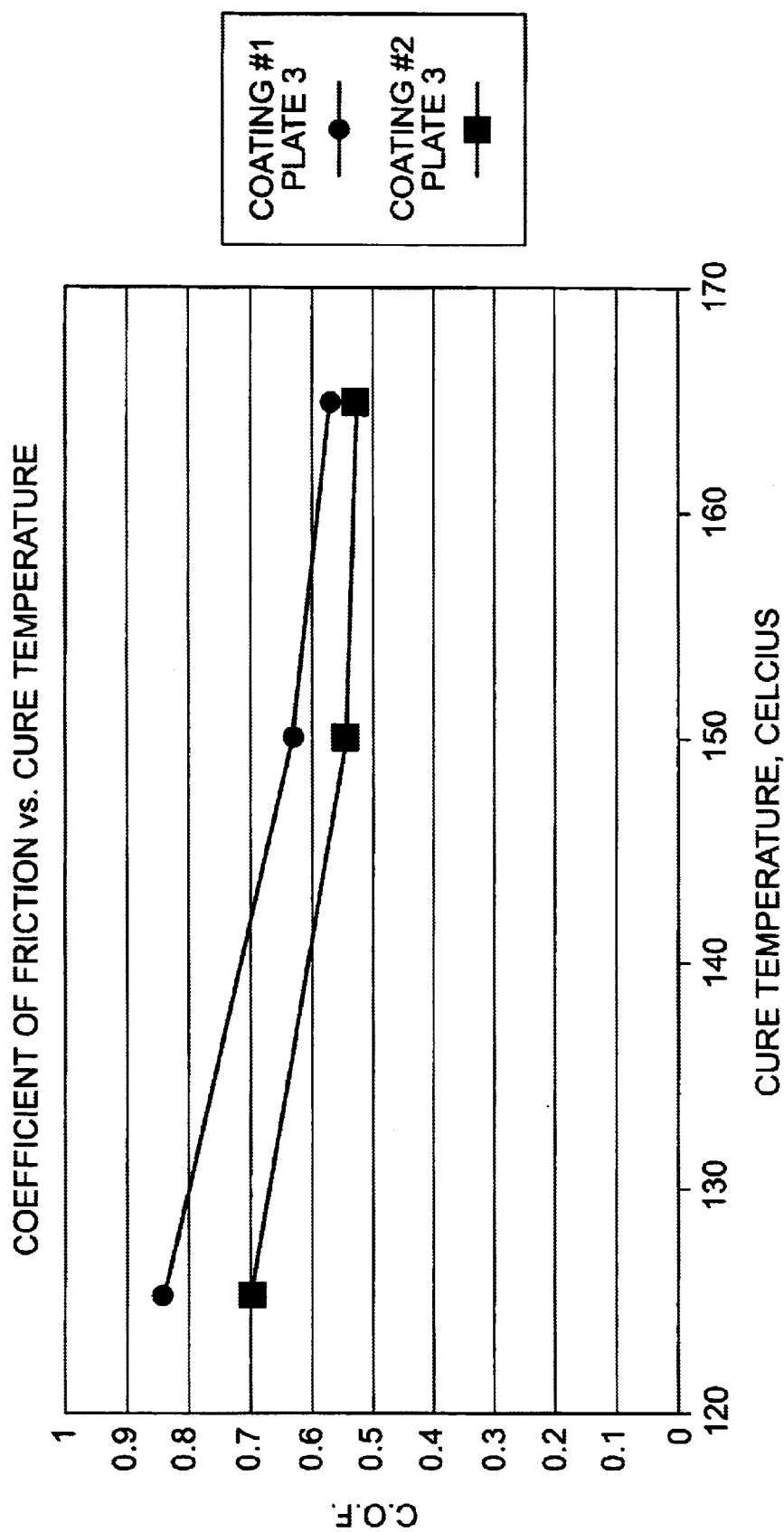
FIG. 10 is a graph illustrating the coefficient of friction of the texture coated surface versus cure temperature.
Figure 11:
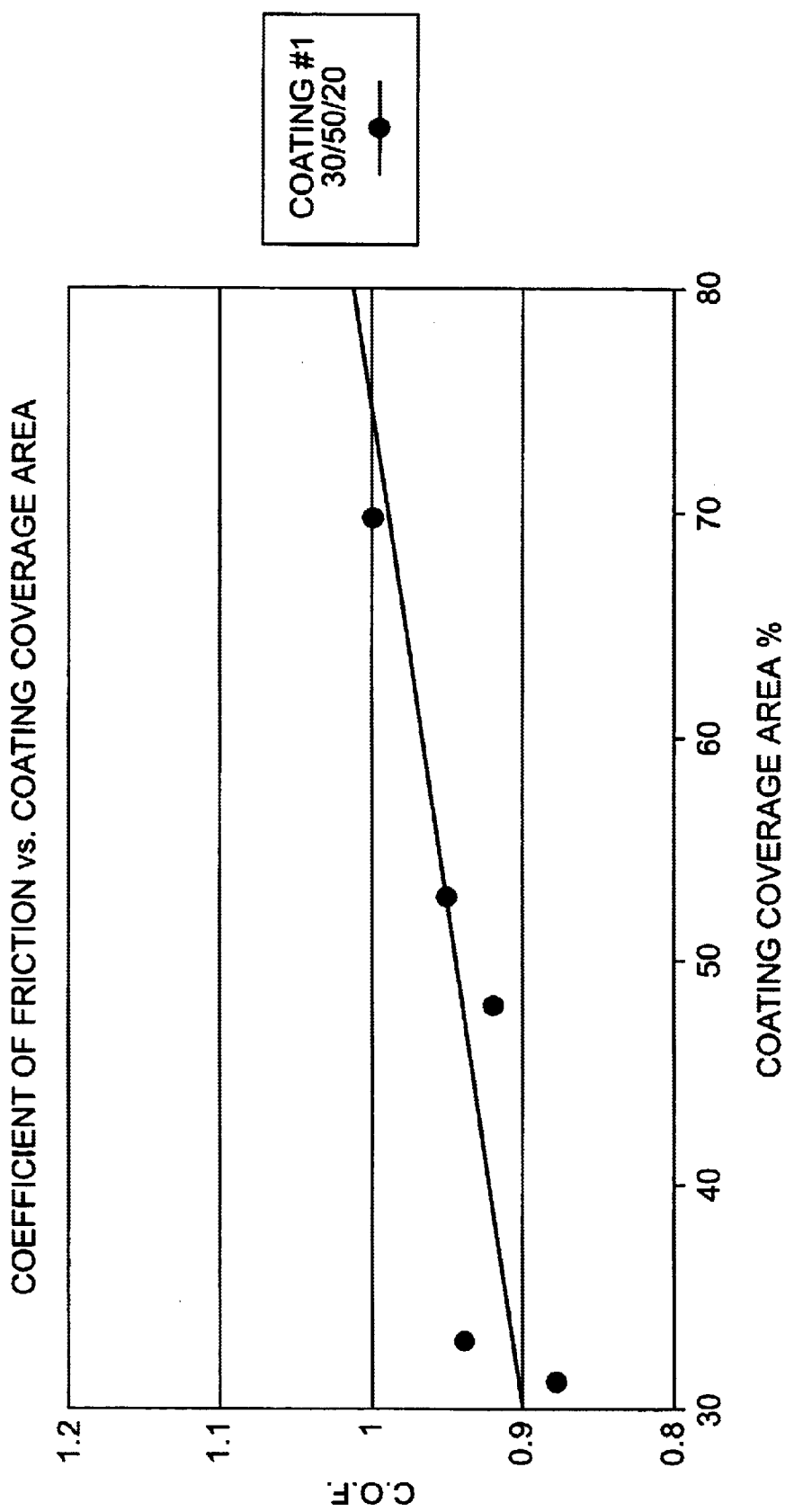
FIG. 11 is a graph illustrating the coefficient of friction versus percent of the surface covered with the textured coating.

D. FIGS. 9A and 9B illustrate the significant increase in kinetic and static coefficient of friction (C.O.F.) the coating offers versus present platestock. A modified TAPPI test method M-549 was used to measure friction. The modification included using a metal plate over which we slide the paper and measure the kinetic coefficient of friction. C.O.F. is a ratio defined as the force (in grams) required to initiate movement of a 500 gram loaded sample divided by 500. The design of FIG. 4c was used for Coating #1 and #2. Coating #3 in FIG. 9B is manufactured by Press Color of Milwaukee, Wis. under the name HiVis#D. The coating is a blend of binding agents; expandable microspheres, and conventional other coating components. FIGS. 9A and 9B through 11 show the effect of cure temperature and percentage coating coverage area on C.O.F.

Figure 12:
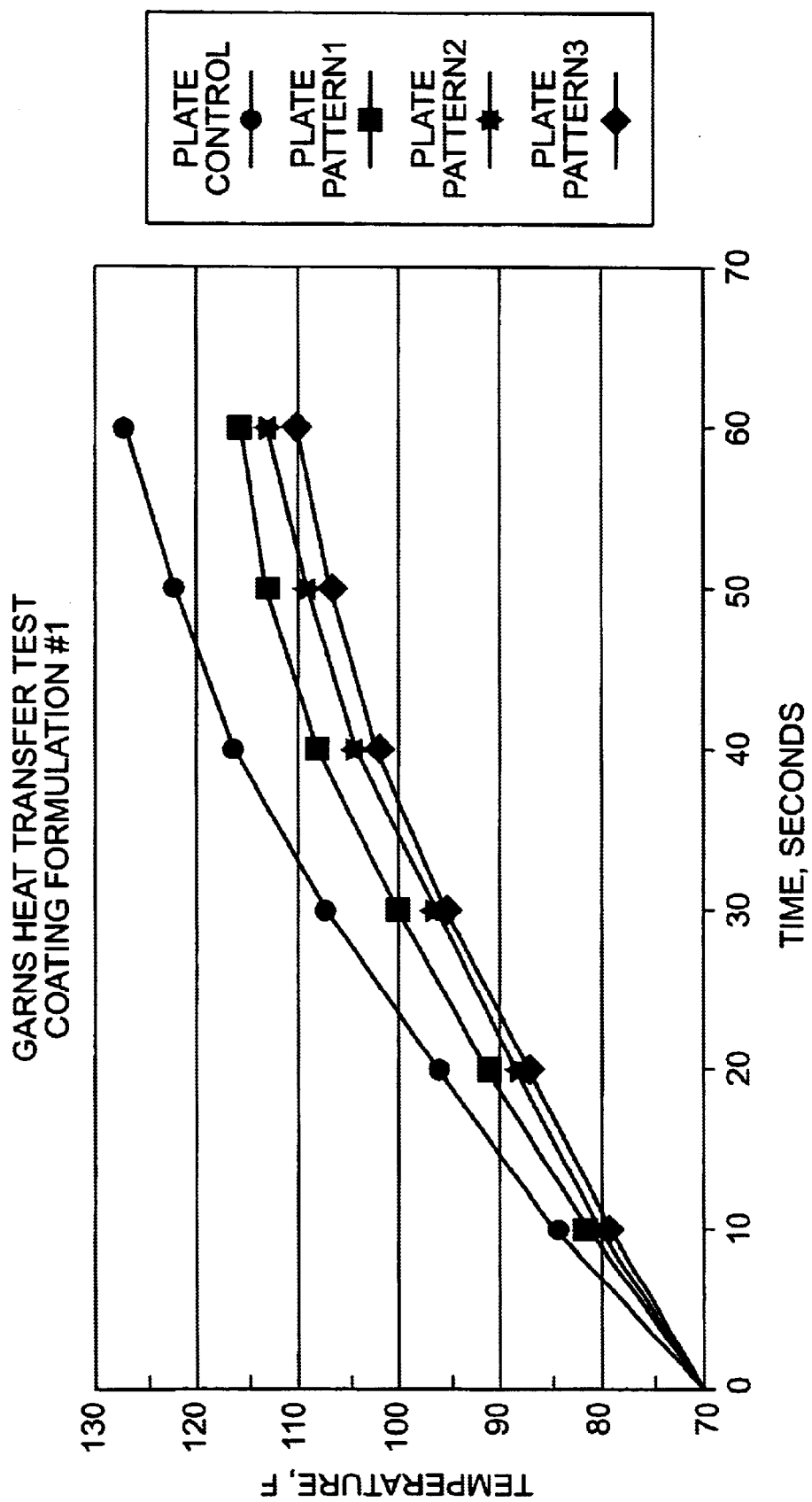
FIGS. 12, 13, and 14 are graphs of the Garns Heat Transfer Test plotting temperature versus time.
Figure 13:
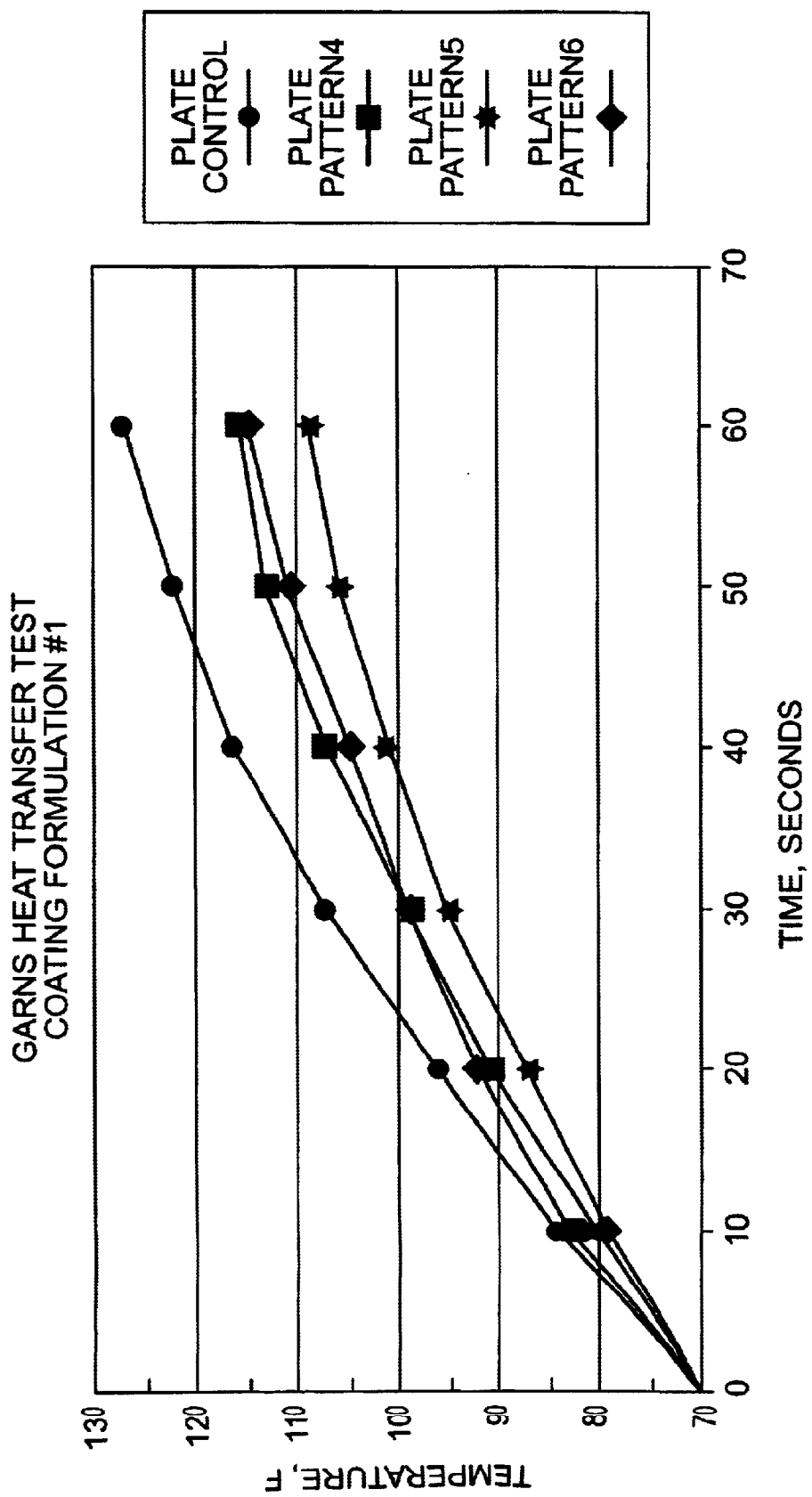
Figure 14:
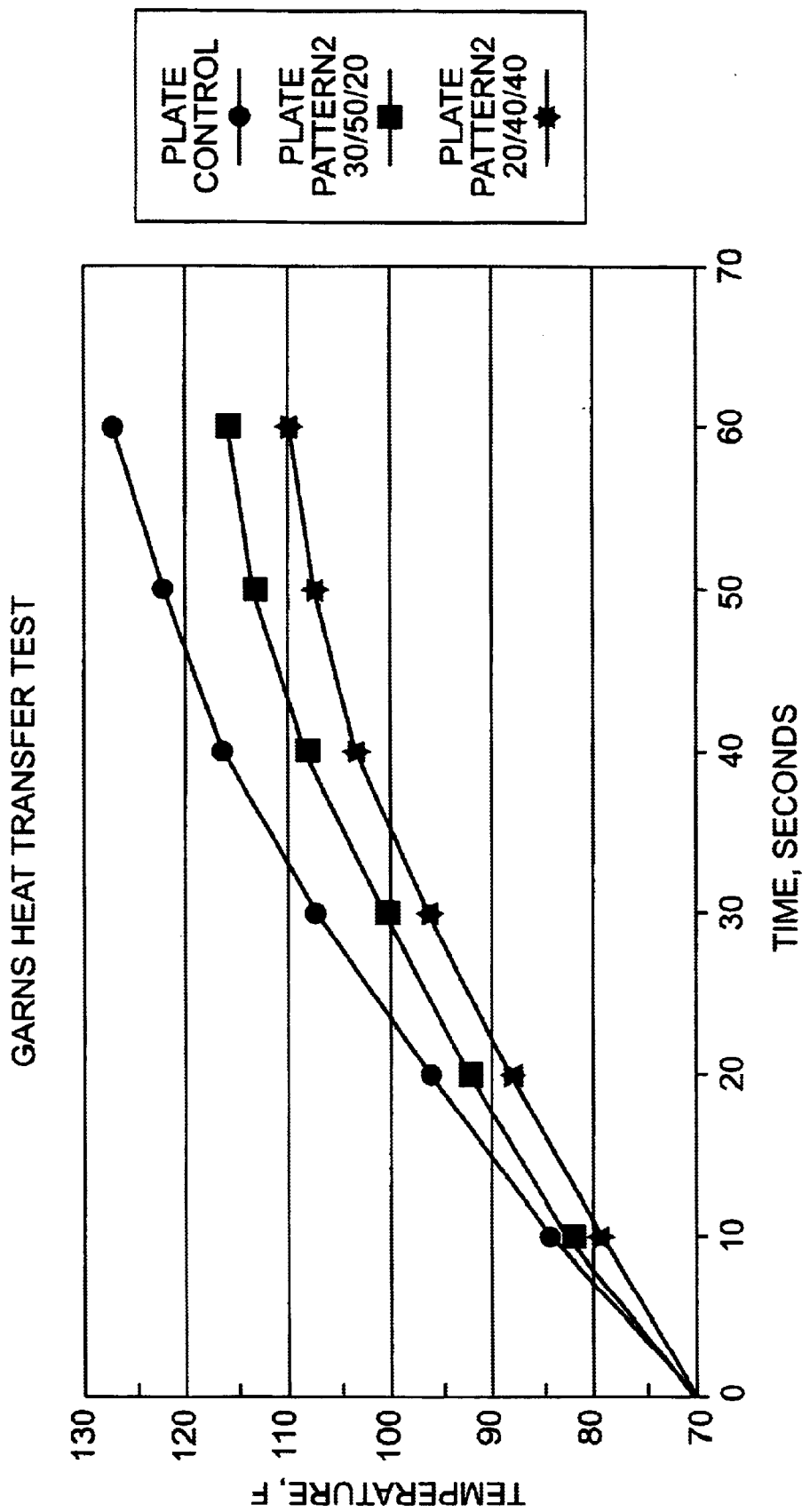
Figure 15:
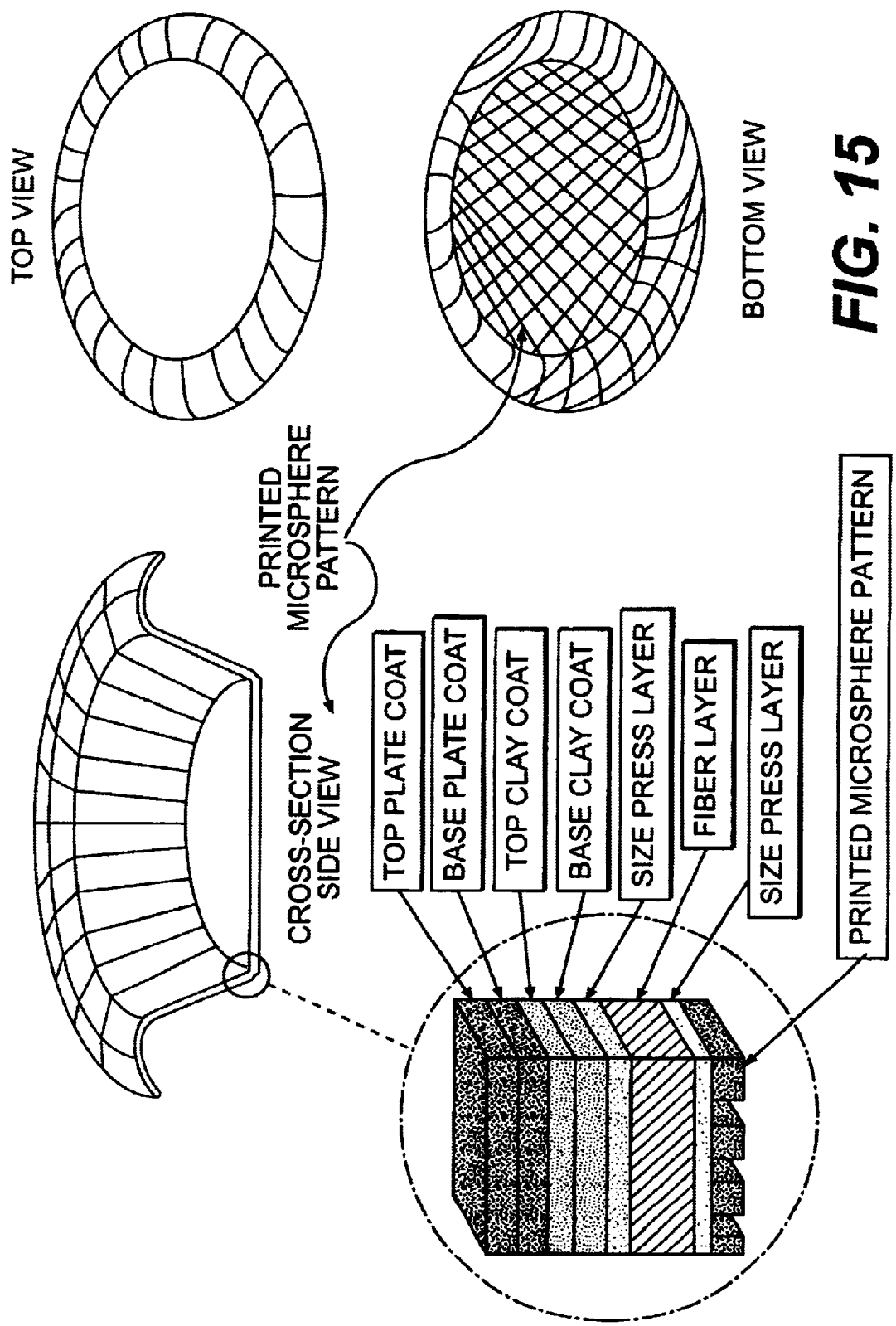
FIG. 15 is a drawing of the plate of this invention illustrating the textured bottom coating and the cross sectional composition of the plate.
Figure 16:
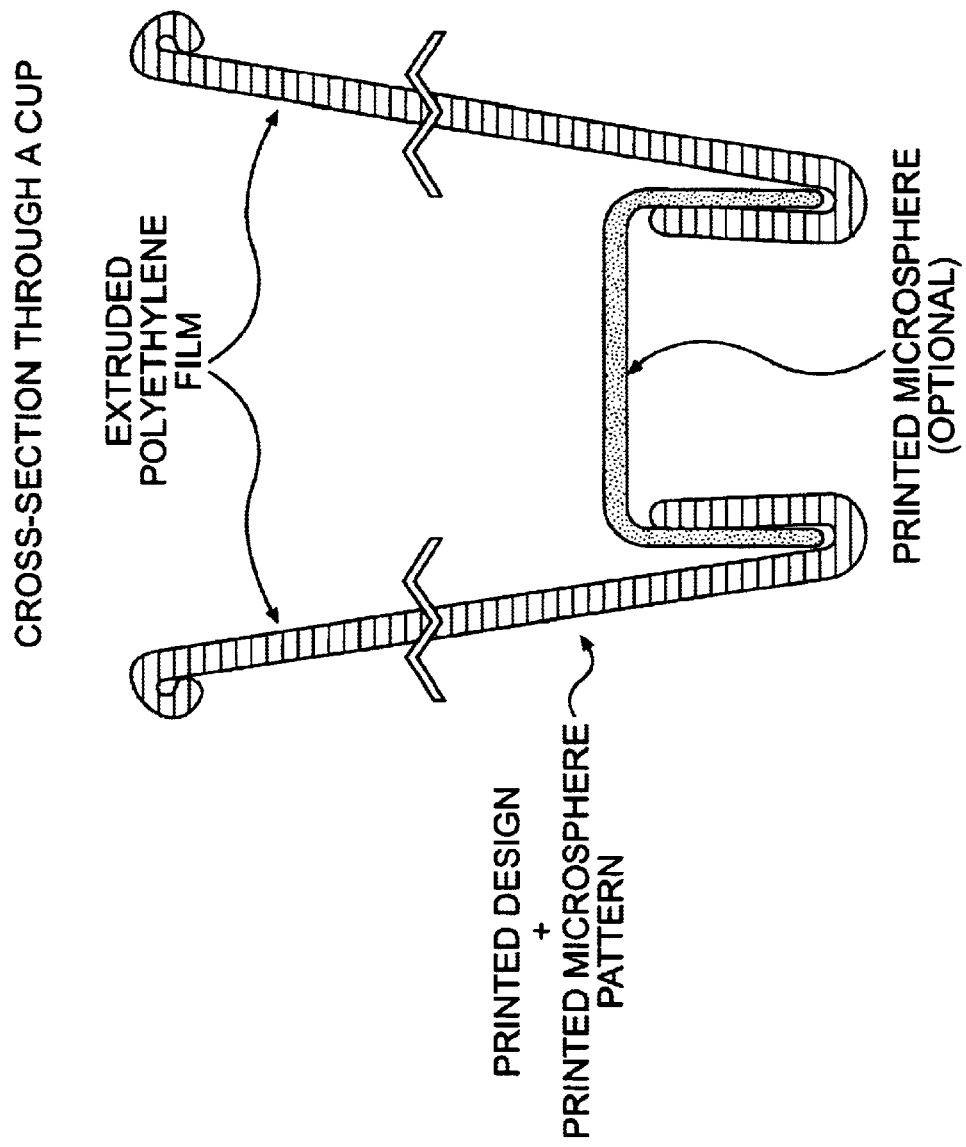
FIG. 16 is a drawing of a cross section of a cup showing the textured microsphere coating.
Figure 22:
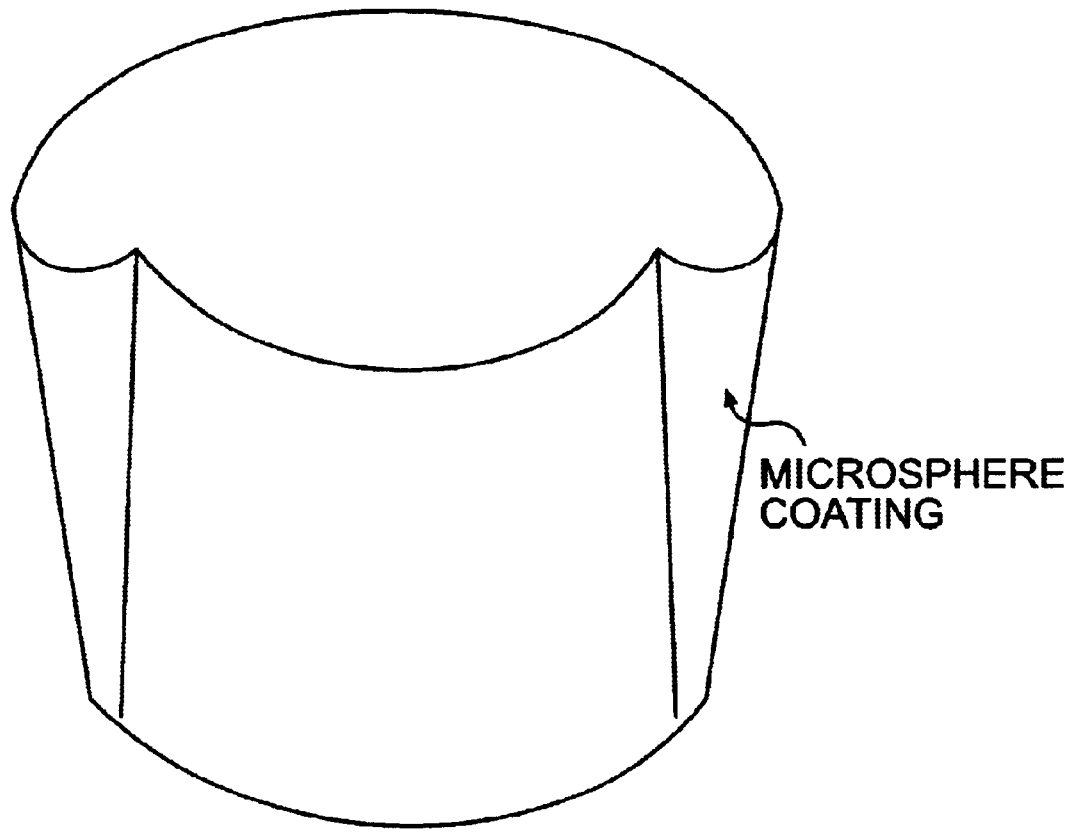
FIG. 22 is a drawing of a French fry sleeve with its outer surface texture coated.
Figure 29:
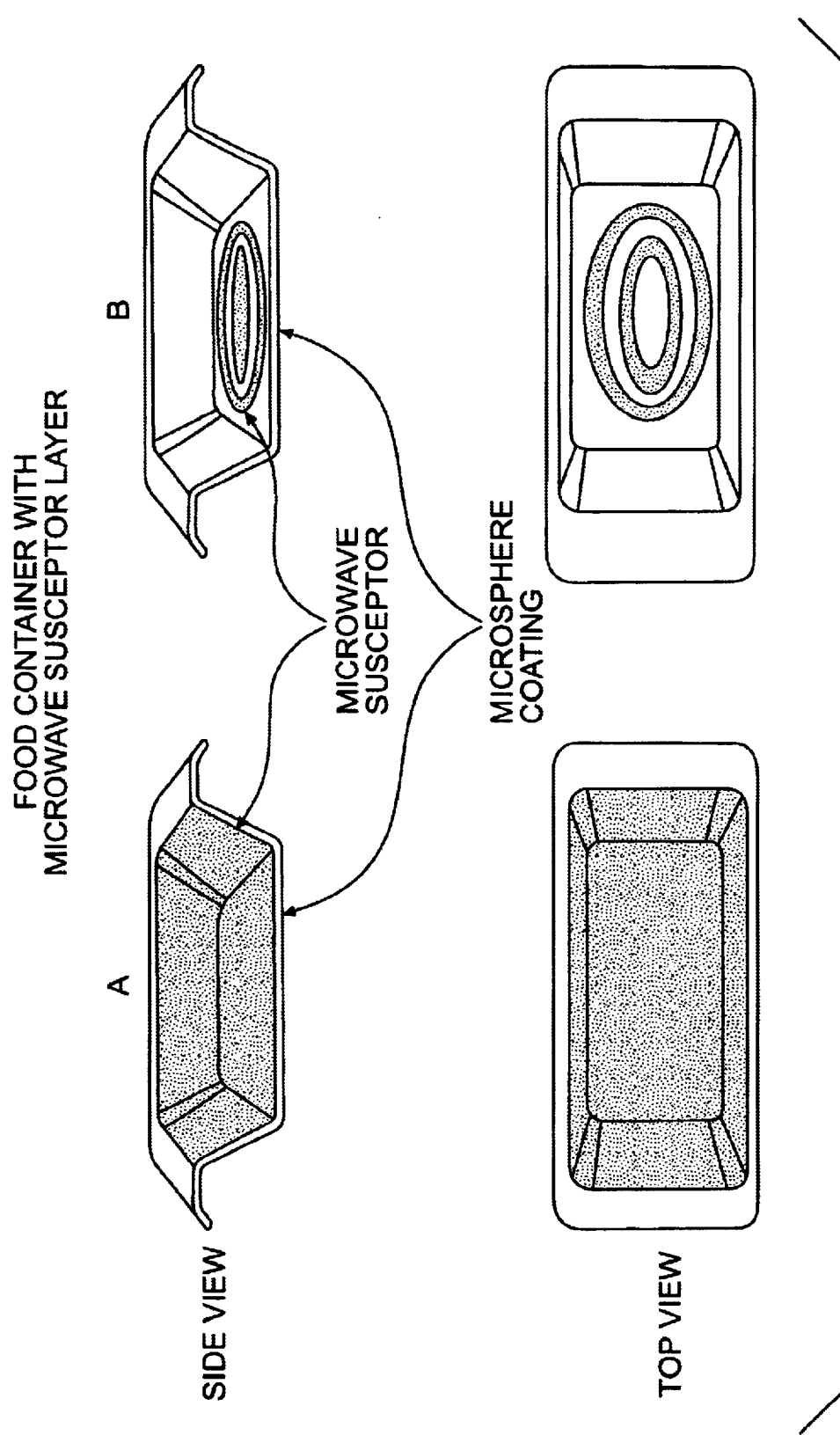
FIG. 29 is a drawing of a texture coated food container with microwave susceptors.
Figure 30:
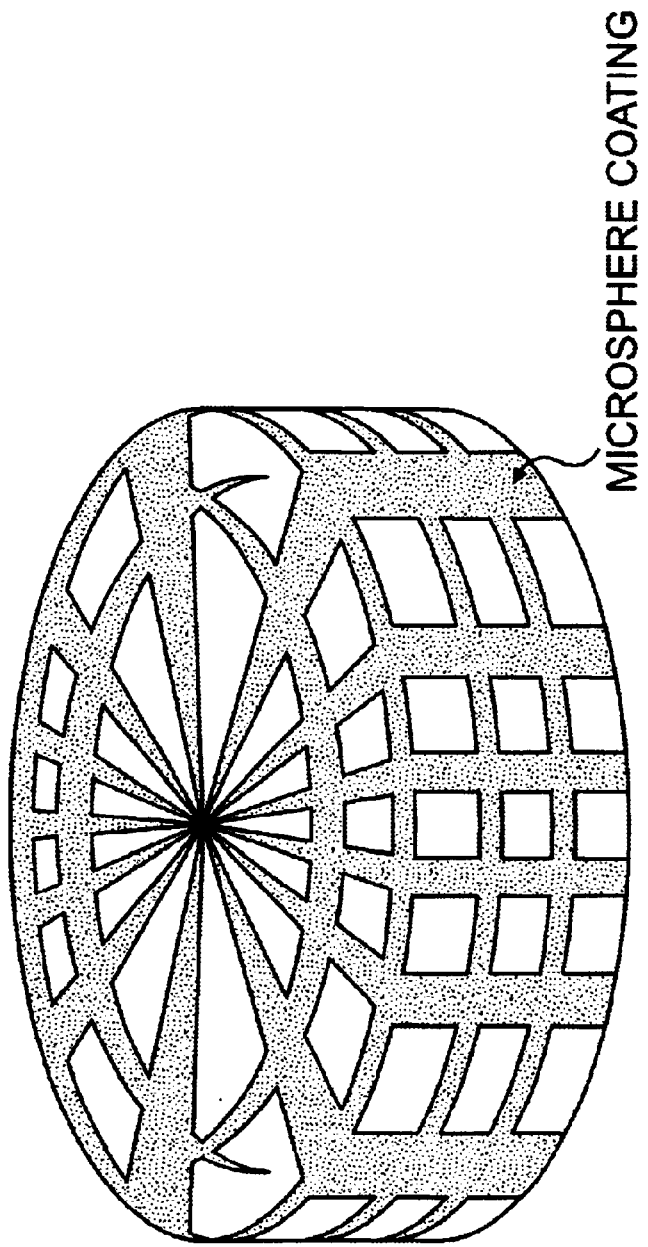
FIG. 30 is a drawing of a hamburger wrap with printed microsphere patterns.
Figure 31:
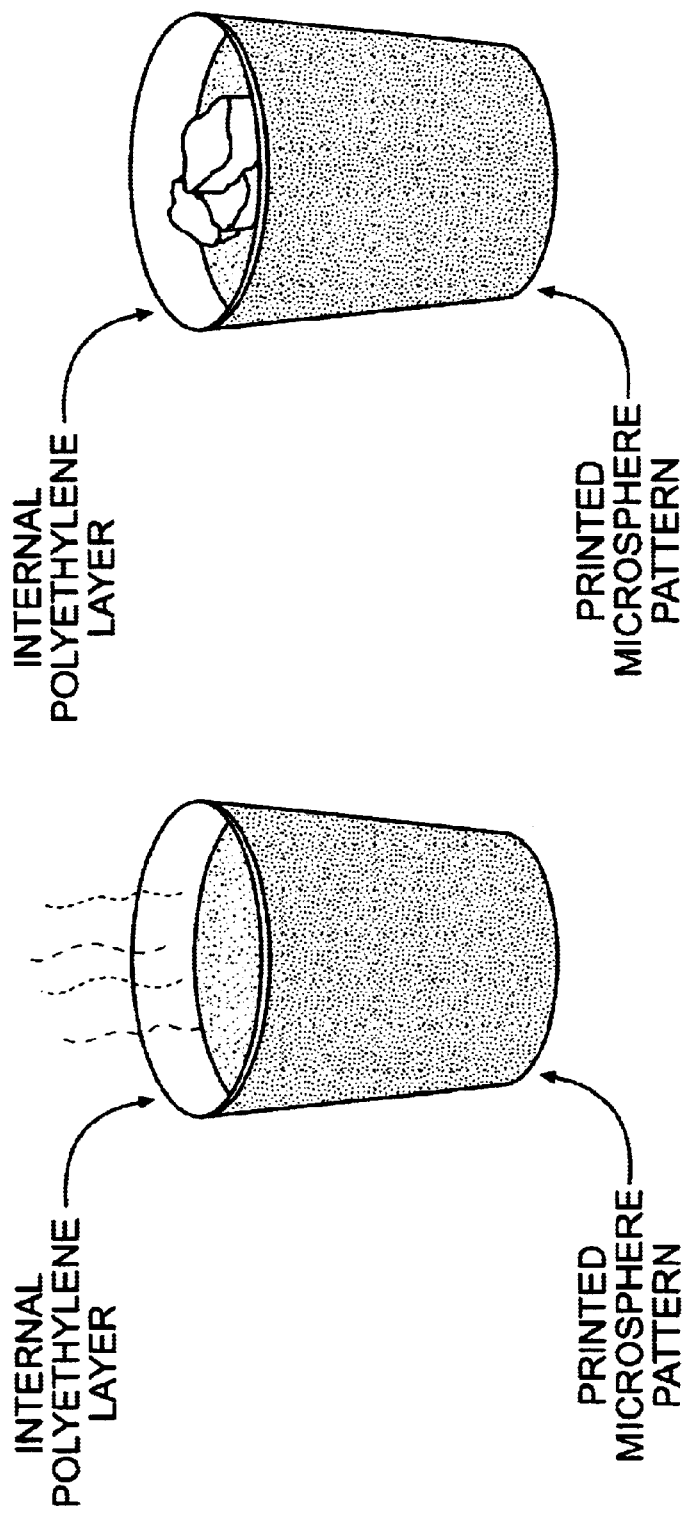
FIG. 31 is a drawing of a hot and cold cup showing textured outer coating and a polyethylene inner coating.

E. FIGS. 12, 13, and 14 represent the coating's ability to decrease heat transfer z-directionally through a platestock sample coated with the two formulations described earlier, utilizing the various patterns.

The heat transfer is measured by the Garns Heat Transfer Test which comprises plotting temperature versus time as shown in the FIGS. 12 through 14. In this test the sample to be tested is placed on top of a heated block held at a constant 190° F. A thermo couple mounted in a rigid medium is placed on the sample. The thermo couple measures the temperature increase with time. A rigid insulating material is placed on top of the thermo couple containing medium. A weight of approximately 500 grams is placed on top of the insulating material. The better insulated containers show a lower temperature increase over time as is demonstrated by FIGS. 12 through 14.

EXAMPLE 2

Coated Material Formation

Below is a description of the process for applying textured coating using a Neenah Technical Center Faustel coater rotogravure deck and subsequent product formation. A commercially available coating sold by Industrial Adhesive Corporation of Chicago, Ill., under designation DB-333-DS was used. This coating comprises an acrylic binder to which have been charged a blend of adhesives and 16–30% microspheres. The coating delivers a textured coating with a height of approximately 0.001"–0.010". Applied coating can't be removed from the paper substrate without a focused and concentrated effort. The coating is applied using the design illustrated in FIG. 4c with a coverage area of 55%. Three pounds of the coating were applied to a 3000 square foot ream of paperboard.

The roll was chemically etched by Gravure, Inc., of Lymon, S.C., using an 85-line screen with a 10–12 pitch wall, 80–85 microns in depth. A 12-inch wide pattern was etched continuously around the roll face. Coating was applied to (Naheola Specification 1213) a 200-pound/ream paperboard at 300 fpm with both gas fired dryers set at 450° F. Sheet temperature exiting the oven section ranged from 180° F.–220° F. These temperatures were not sufficient to expand the microspheres but were sufficient to dry the coating. The board was moistened to approximately 7–9% using a 75 Quad roll and a polyolefin wax solution.

Superstrong® 9-inch plates were formed on the Peerless 28 press using P070 dies at 300° F. Machine speed was set at 50–60 strokes per minute. Microspheres in the coating were expanded as the plate was formed at 300–1500 psi pressure.

EXAMPLE 3

Preparation of Texture Coated Hamburger and Sandwich Wrap

Hamburger and sandwich wrap specimens of 14 mil and 19 mil depth were screen-printed with a textured coating comprising 30% Expancel 820 microspheres, 50% Acronal S504 latex binder, and 20% clay pigment. Thickener (Alcogum L-29) was added to facilitate screen-printing. A coating weight of thirteen pounds per 3000 square foot ream was applied generating 8 mils of coating caliper. FIG. 4e design was used for the pattern for the screen-printed hamburger or sandwich wrap textured pattern. The coated wrap had a significantly greater thermal insulation for the hand touching the surface, and the wrap had also much improved friction resistance. The thermal and friction resistance is comparable to that obtained when textured plates or cups are produced.

EXAMPLE 4

Sample of Texture Coated Hamburger Wrap
Hamburger wrap specimens of 14 mil and 19 mil depth were screen printed as disclosed in Example 3. The solids formulation were as follows:

TABLE 4

Expancel Coating for Hamburger Graphic on Quilt Wrap

| % Dry Solids | Compound | Compound Solids | Addition order |
|---|---|---|---|
| 29.0 | Expancel 820 microspheres | 45% | 2 |
| 48.0 | BASF Acronal 504 latex | 50% | 1 |
| 19.0 | Hydrafine Clay | 70% | 3 |
| As desired | Alcogum L-29 Thickener | 30% | 7 |
| 4 | Glycerin | 100% | 5 |

TABLE 4-continued

Expancel Coating for Hamburger Graphic on Quilt Wrap

| % Dry Solids | Compound | Compound Solids | Addition order |
|---|---|---|---|
| <1 | Drewplus L407 Antifoam | 28% | 4 |
| As desired | Notox Ink | 100% | 6 |

Figure 37:
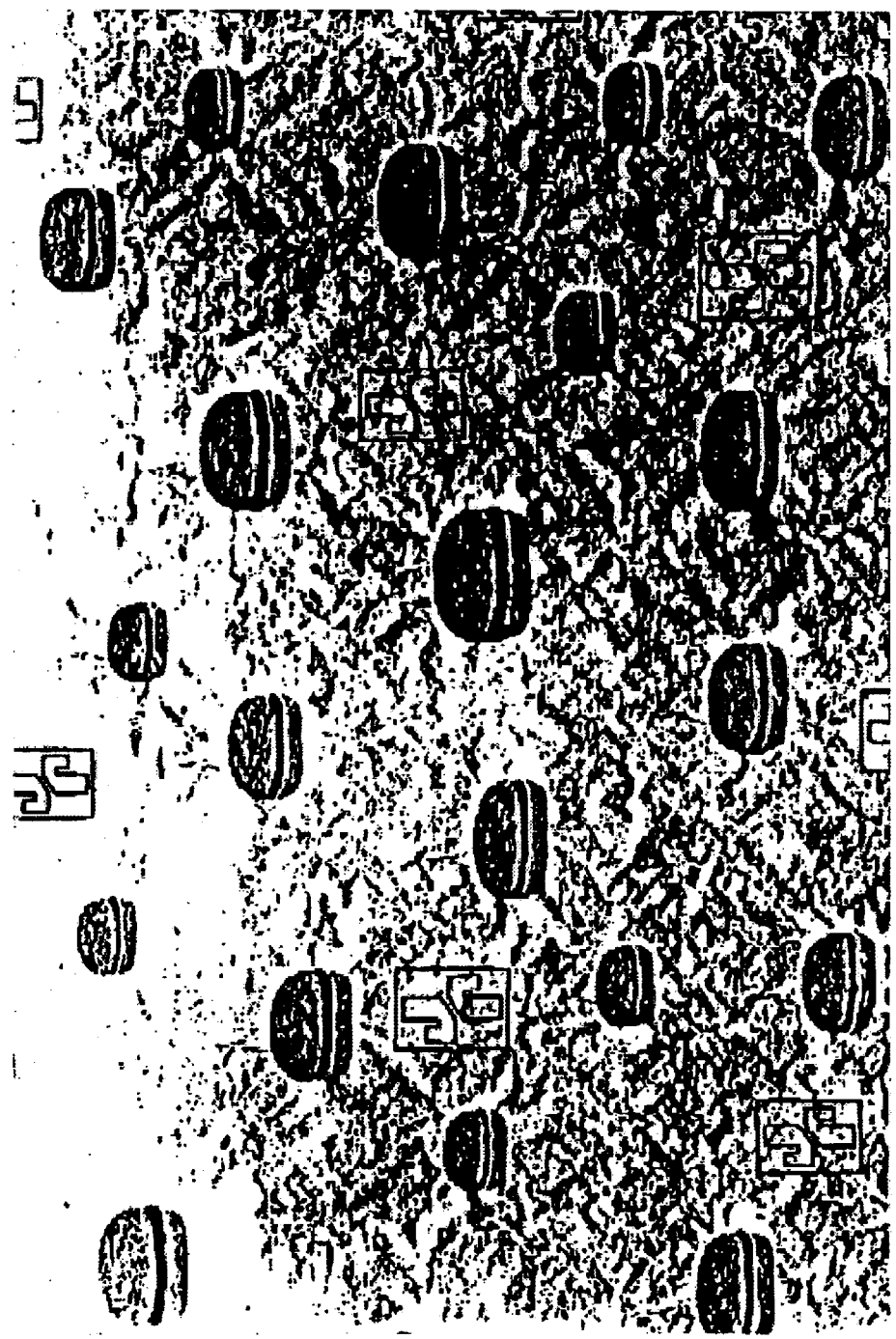
FIG. 37 is a photograph of a section of the texturized hamburger wrap.

The resulting texture coated hamburger wrap is shown in FIG. 37 which is a photograph of a section of the hamburger wrap.

EXAMPLE 5

Insulation Properties Texture Coated Hot Drink Cup

The following data on the insulating properties of textured coating for hot drink cups was obtained from hold time panel tests measuring how long hot drink cups could be held when filled with 190° F. hot water. The textured coating was screen-printed on the outer surface of the cups using a commercial screen press. The cups were 16-ounce cups made from both the Fort James commercial sidestock and from bulk-enhanced board sidestock prepared as shown in the Examples of Ser. No. 08/716,511 filed on Sep. 20, 1996, and the Examples of U.S. Ser. No. 08/896,239 filed on Jul. 17, 1997. The commercial sidestock had a fiber weight of 126 pounds per 3000 square foot ream and a thickness of 0.0126 inches. Also the commercial sidestock was size press impregnated with 13 pounds per 3000 square foot ream of clay pigmented oxidized starch. The bulk-enhanced board sidestock had a fiber weight of 105 pounds per 3000 square foot ream and a thickness of 0.017 inches. This board was impregnated with 18 pounds per 3000 square foot ream of clay pigmented oxidized starch. In both cases clay and starch were at a one to one ratio.

Figure 32:
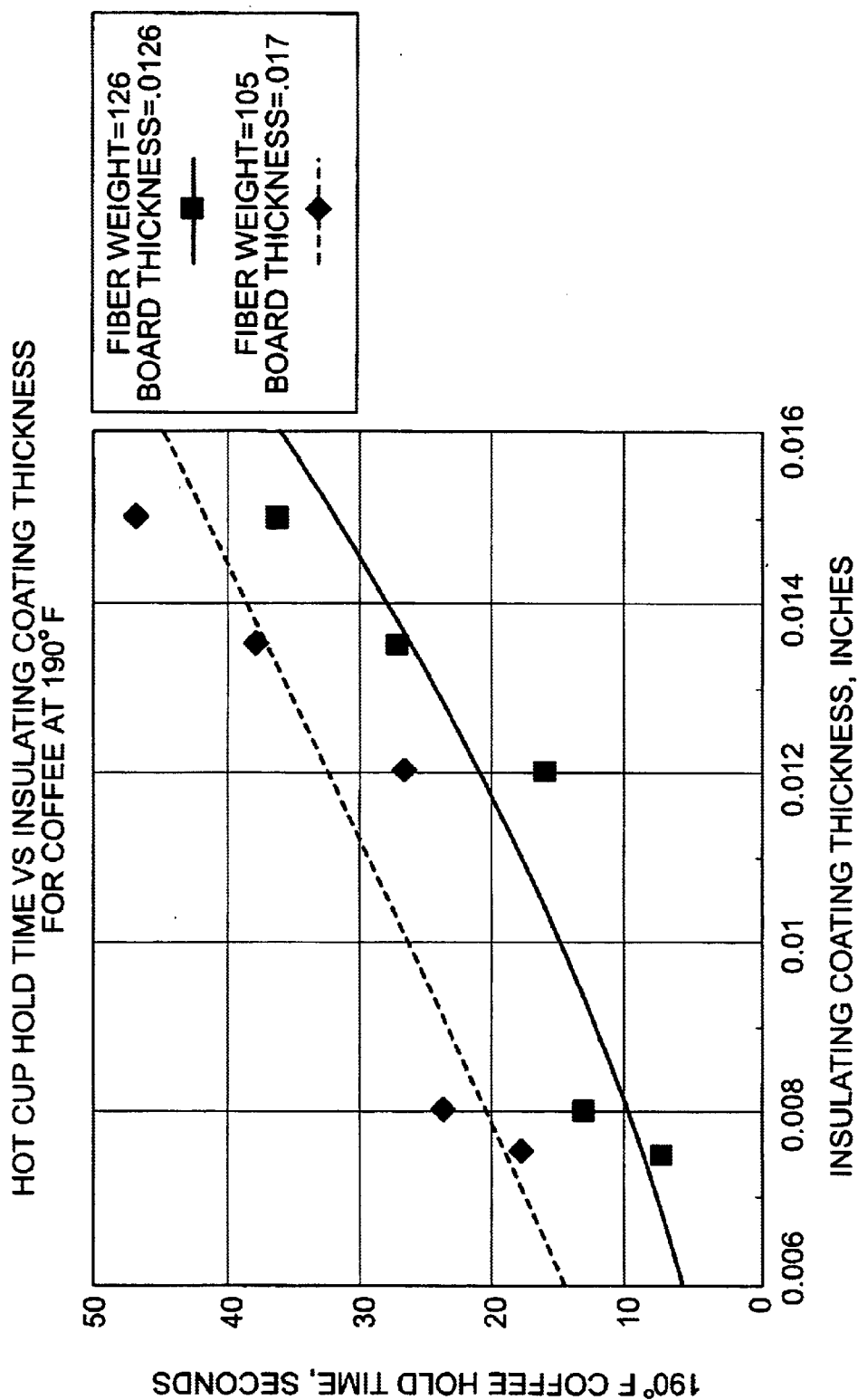
FIGS. 32 and 33 are graphs illustrating the hold time versus fiber mat density.
Figure 33:
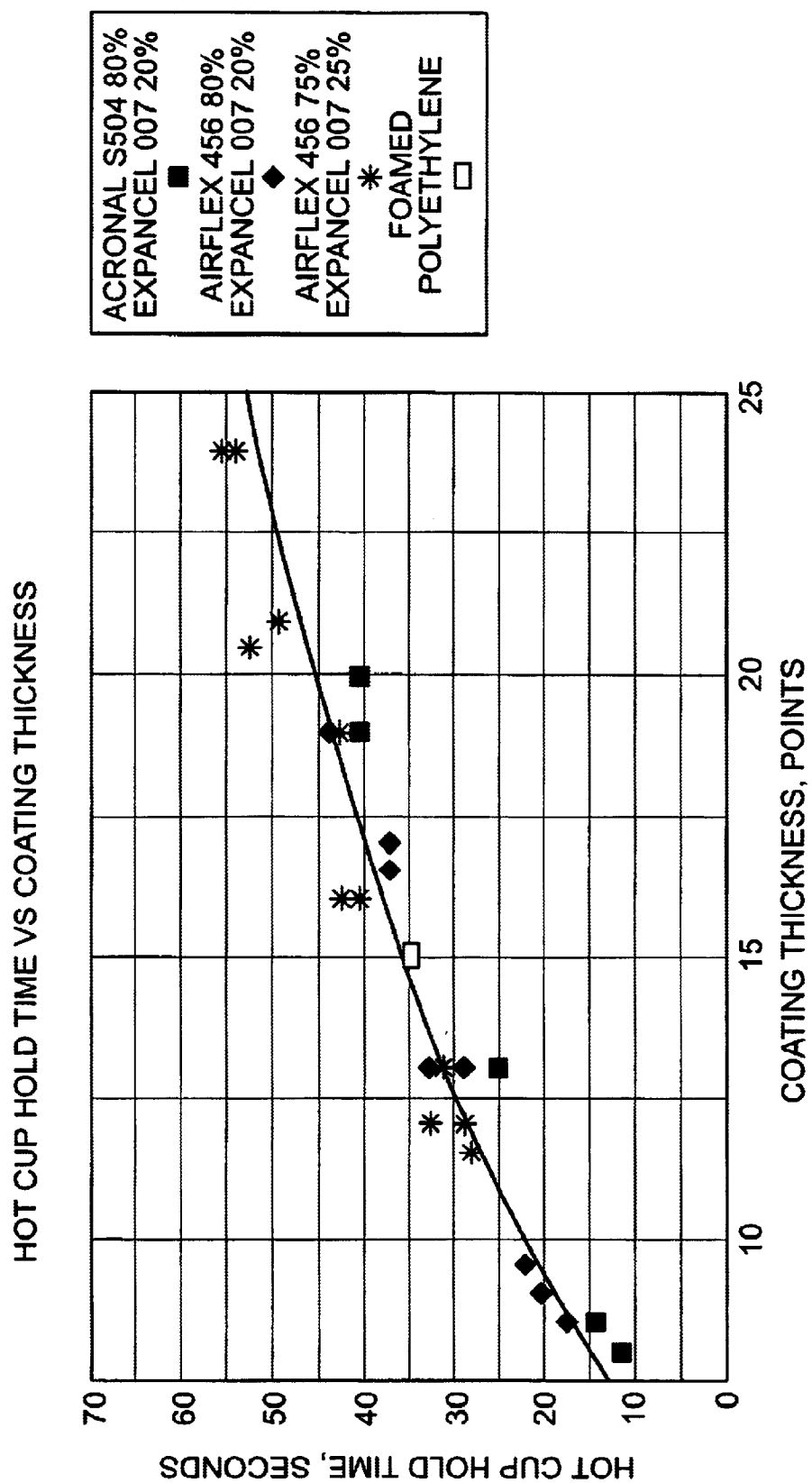
Figure 34:
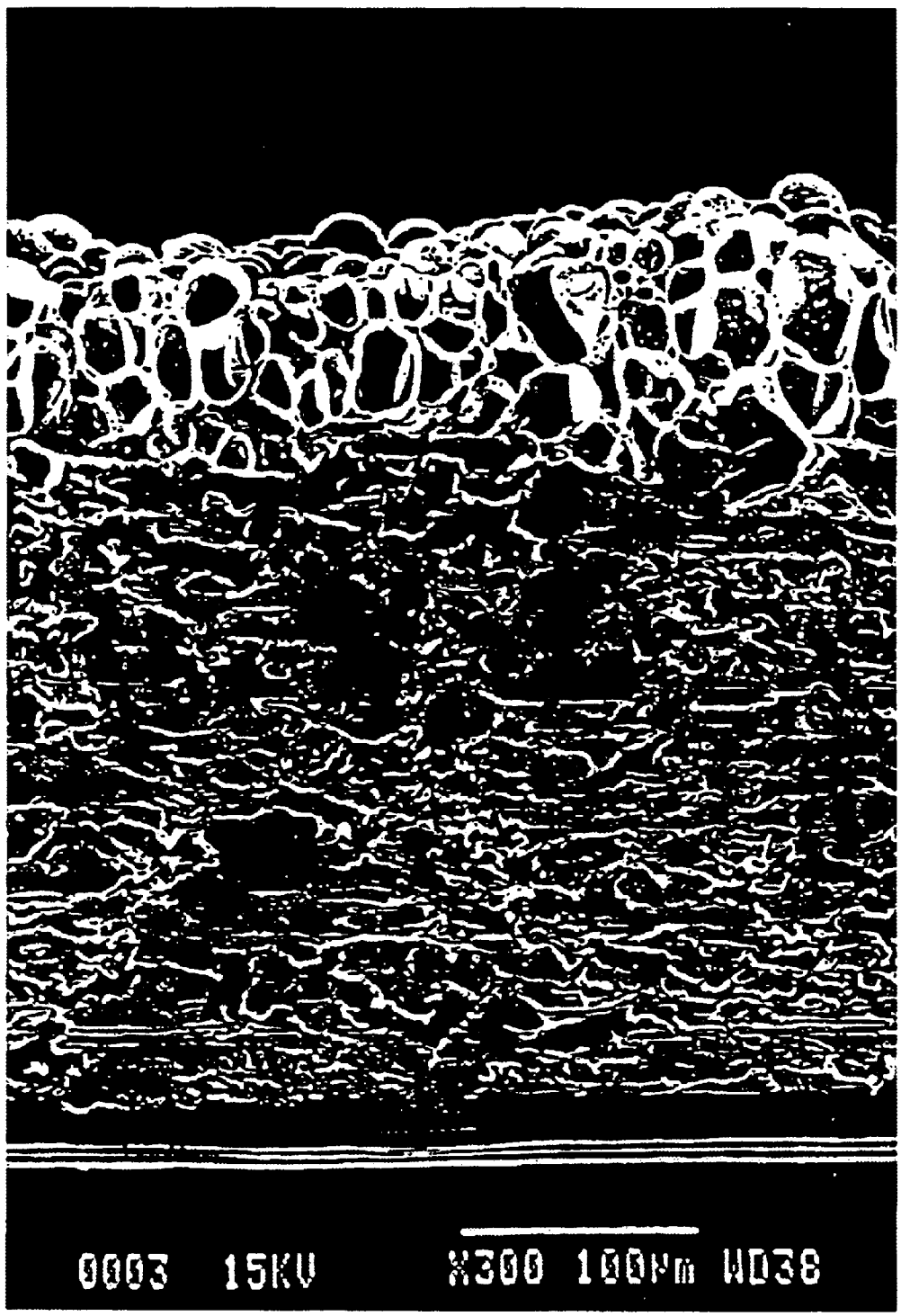
FIG. 34 is a photomicrogram of a 300× magnification of a section through a container prepared in accordance with the present invention showing bulk enhanced paperboard and microsphere textured coating.

Shown in FIGS. 32 and 33 is the number of seconds cups could be held with 190° F. hot water versus the thickness of textured coating and the seconds of hold time just due to the insulating coating. Foamed polyethylene at a thickness of 0.015 inches is also shown along with textured coating. The thermal conductivity of textured coating and foamed polyethylene are similar and therefore they fall on the same coating thickness versus hold time curve. This data shows that texture coating applied at the same thickness as foamed polyethylene will generate similar results and if applied at greater thickness will produce superior results.

Figure 39:
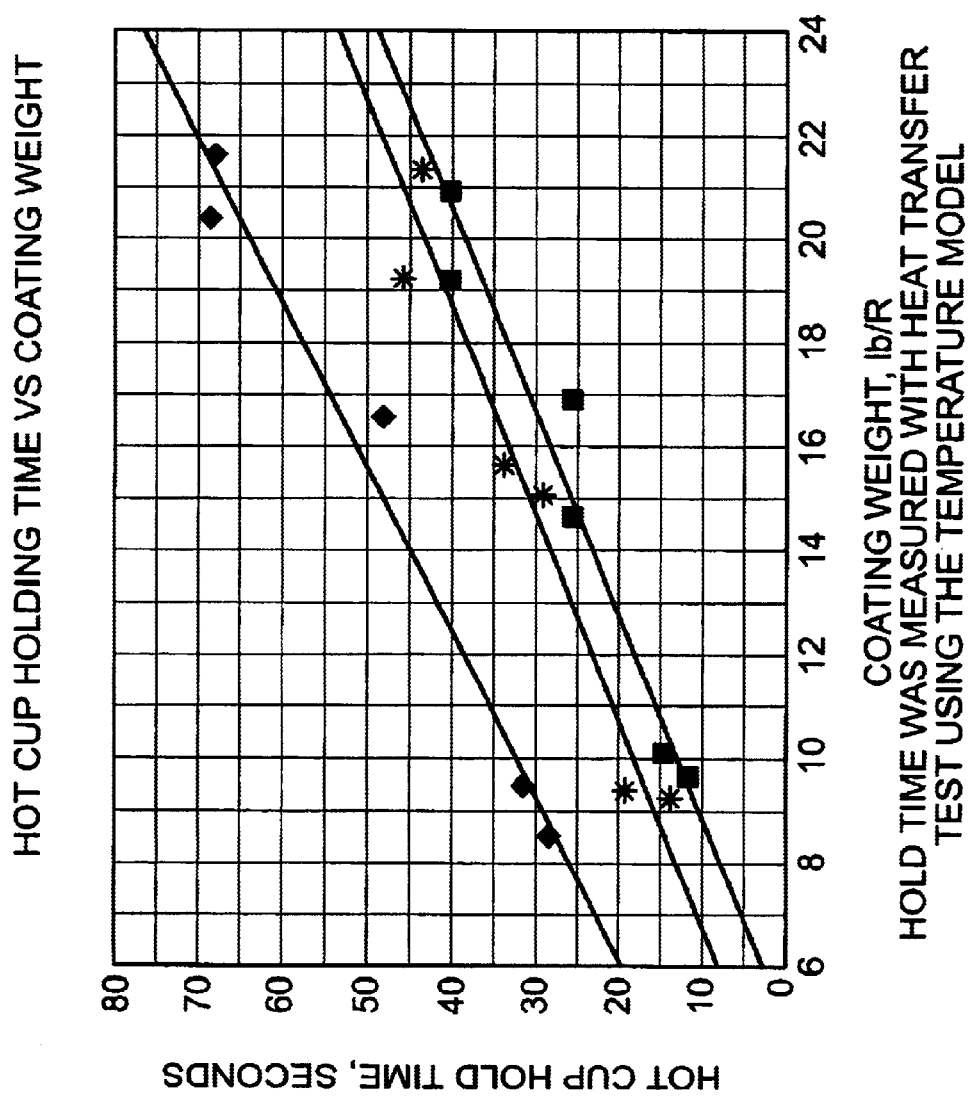
FIG. 39 is a graph comparing the hot cup hold time in seconds versus coating weight in pounds per 3000 square foot ream completely coated.

In FIG. 39 data are given for hot cup hold time versus coating weight in pounds per fully coated 3000 square foot ream. The data compares 5% glass and 20% Expancel 007 with 20% and 30% Expancel 007 coatings.

FIG. 32 illustrates the combined impact of insulating textured coating and bulk enhanced board upon hot cup hold time as a function of textured coating thickness. The bulk enhanced board in this case had a fiber mat density of 6.17 pounds per 3000 square feet per 0.001 inch fiberboard thickness as contrasted to Fort James Corporation's sidestock which had a fiber mat density of 10 pounds per 3000 square feet per 0.001 inch fiberboard thickness. The bulk enhanced board increased hold time 17 seconds while commercial sidestock increased hold time 7 seconds. Bulk enhanced board reduced the thickness of textured coating required for our hold time target of 35 seconds by 3 points (0.003 inches) over that required with commercial sidestock.

Figure 41:
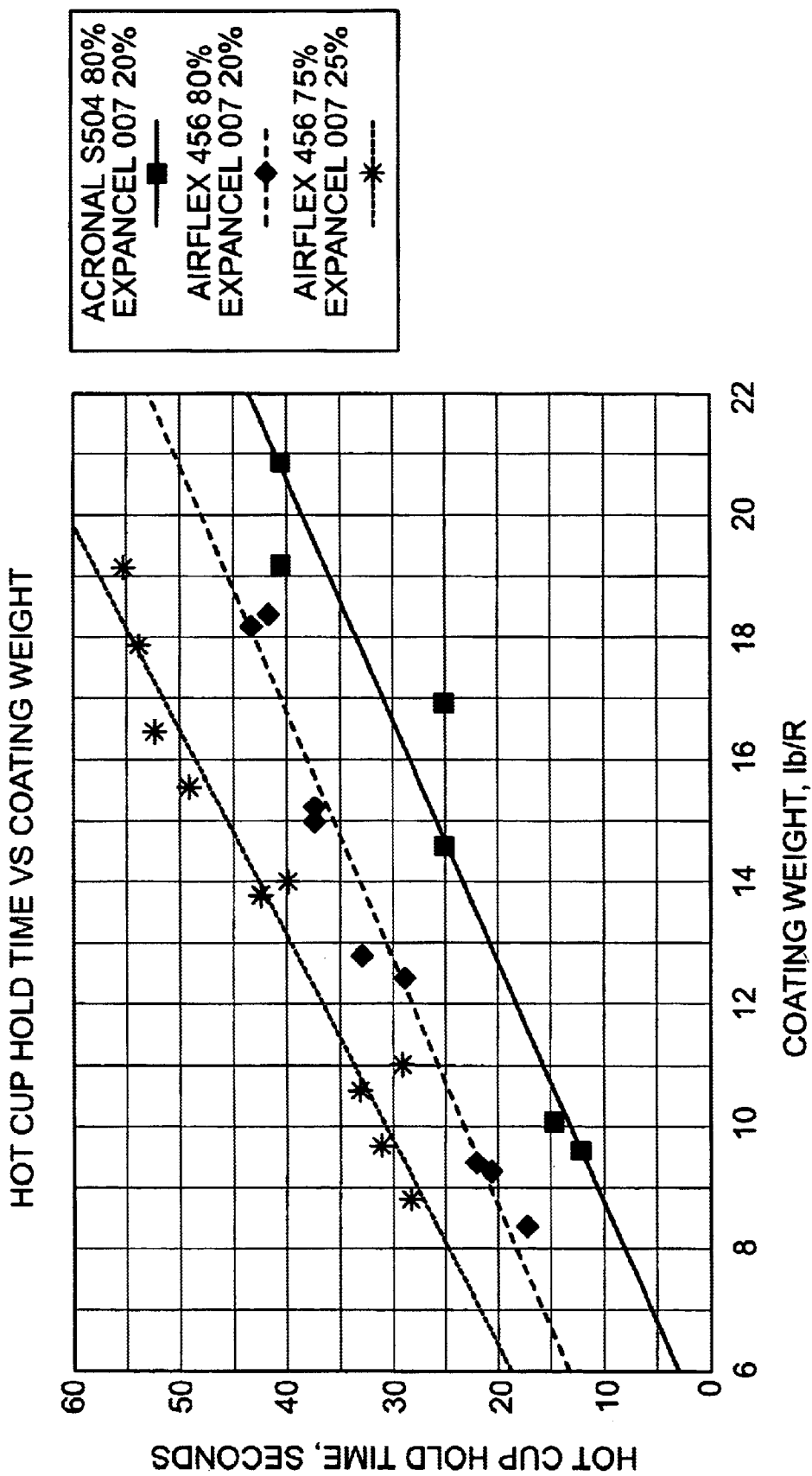
FIG. 41 is a graph showing hot cup hold time versus coating weight for different latexes.

FIG. 33 illustrates the effect of textured coating thickness upon hold time for a variety of textured coating formulations. The coatings of this invention are compared to Perfectouch® technology (foamed polyethylene). The dominant insulating coating variable controlling hot cup hold time is coating thickness. This is true with all the coating formulations shown and foamed polyethylene. This data suggests the thermal conductivity of all these coatings is similar in spite of variation in insulating gas content since the coatings do not have similar densities. The textured coating data in this figure come from the same experiment shown in FIG. 41 where hot cup hold time is shown as a function of coating weight instead of coating thickness. The difference in performance of the three formulations shown in FIG. 41 is due to differences in coating thickness at the same coating weight. Increases in coating thickness at the same; coating weight and same microsphere level was accomplished by changing latex from the acrylic dispersion Acronal S504 to the ethylene vinyl chloride Airflex 456. The Airflex latex allowed greater expansion of Expancel 0.007 due to its lower glass transition temperature. The Acronal latex had a glass transition temperature of 4° C. while the Airflex latex had a glass transition temperature of 0–3° C. Since Airflex was a softer latex, it offered less constraint to the expansion of the microspheres during the drying process.

FIG. 39 illustrates the insulating properties of various insulating agents of this invention. Glass microspheres (Scotchlite S15) were blended with Expancel 007 improving hot cup hold time. Five percent glass microspheres were blended with twenty percent organic microspheres (Expancel 007). The addition of the glass microspheres improved hot cup hold time over the Expancel blown coating alone. The glass microspheres are hollow and filled with air thus serve as superior insulation agents.

Figure 40:
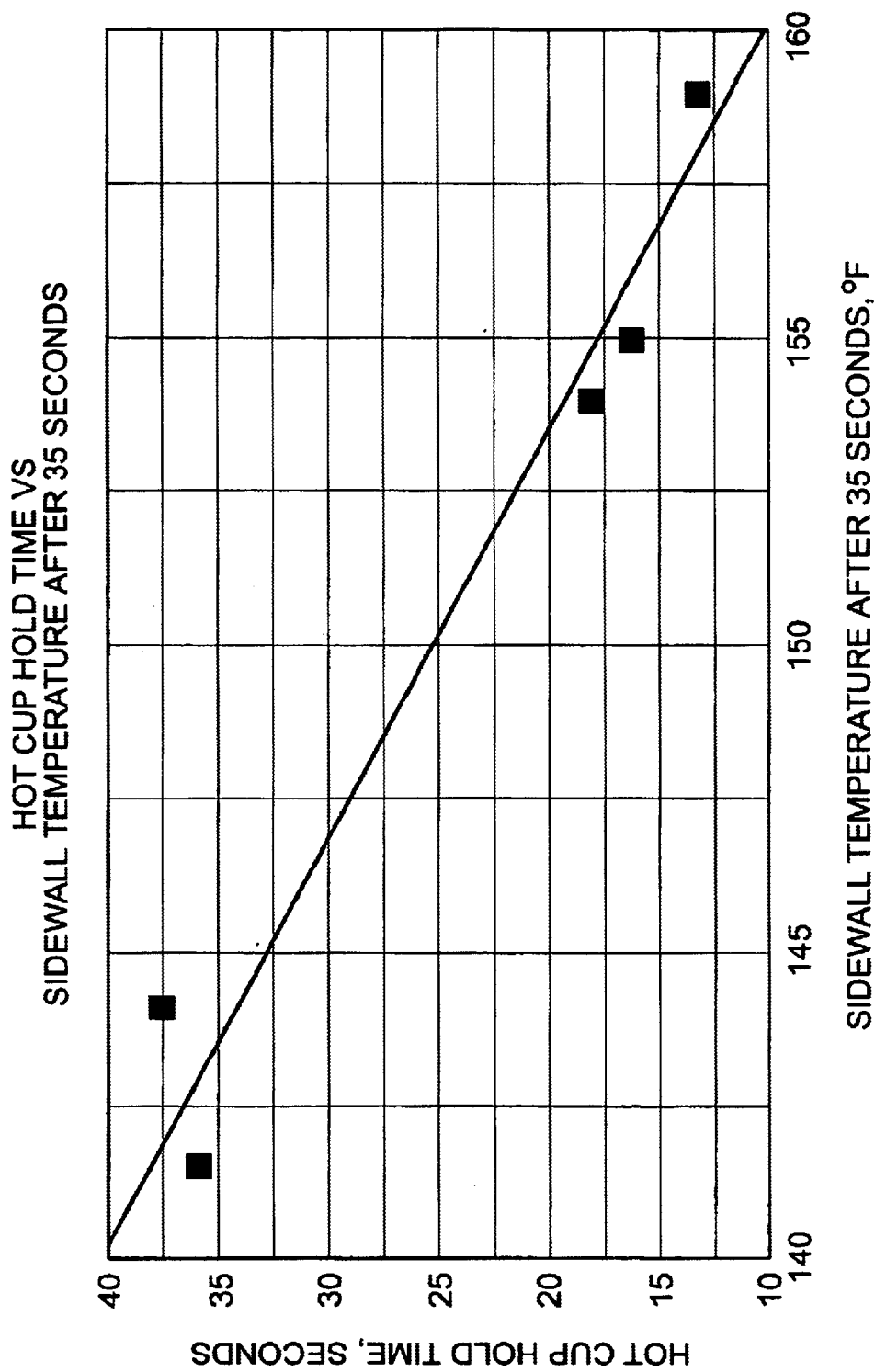
FIG. 40 is a graph showing hot cup hold time versus sidewall temperature.

FIG. 40 shows the sidewall surface temperature after 35 second's hold time. Plotted is hold time versus side wall temperature for cups that were at and below the hold time target of 35 seconds. The side wall temperature for cups at the target hold time of 35 seconds was 143° F. The human body's ability to cool the fingers when holding the side wall reduced actual skin temperatures below this level preventing any potential injuries.

Suitable latex binders have a glass transition temperature of about −30° C. to +30° C., preferably −10° C. to +10° C. Representative latexes are set forth in Table 5.

TABLE 5

| LATEX | TYPE | SOLIDS % | Tg ° C. |
| --- | --- | --- | --- |
| Acronal S504 | Acrylic Dispersions | 50 | +4 |
| Acronal S728 | Acrylic Dispersions | 50 | +25 |
| Henkel 2a-5393-2 | Acrylic Dispersions | 50 | — |
| Henkel 2b-5393-2 | Acrylic Dispersions | 42 | — |
| Styronal BN 4204 | Styrene-Butadiene | 51 | −28 |
| Styronal ND 430 | Styrene-Butadiene | 50 | −7 |
| Styronal NX 4515X | Styrene-Butadiene | 50 | −4 |
| Styronal BN 4606X | Styrene-Butadiene | 50 | +6 |
| GenCorp 576 | Styrene-Butadiene | 50 | +2 |
| GenCorp5084 | Styrene-Butadiene | 50 | +20 |
| GenCorp5092 | Styrene-Butadiene | 50 | −0 |
| GenCorp5098 | Styrene-Butadiene | 48 | −22 |
| Airflex 100HS | Vinyl Acetate Ethylene | 55 | +7 |
| Airflex 199 | Vinyl Acetate Ethylene | 50 | +24 |
| Airflex 456 | Ethylene Vinyl Chloride | 52 | 0 |
| Airflex 4500 | Ethylene Vinyl Chloride | 50 | +3 |
| Airflex 4514 | Ethylene Vinyl Chloride | 50 | +12 |
| Airflex 4530 | Ethylene Vinyl Chloride | 50 | +29 |

Figure 42:
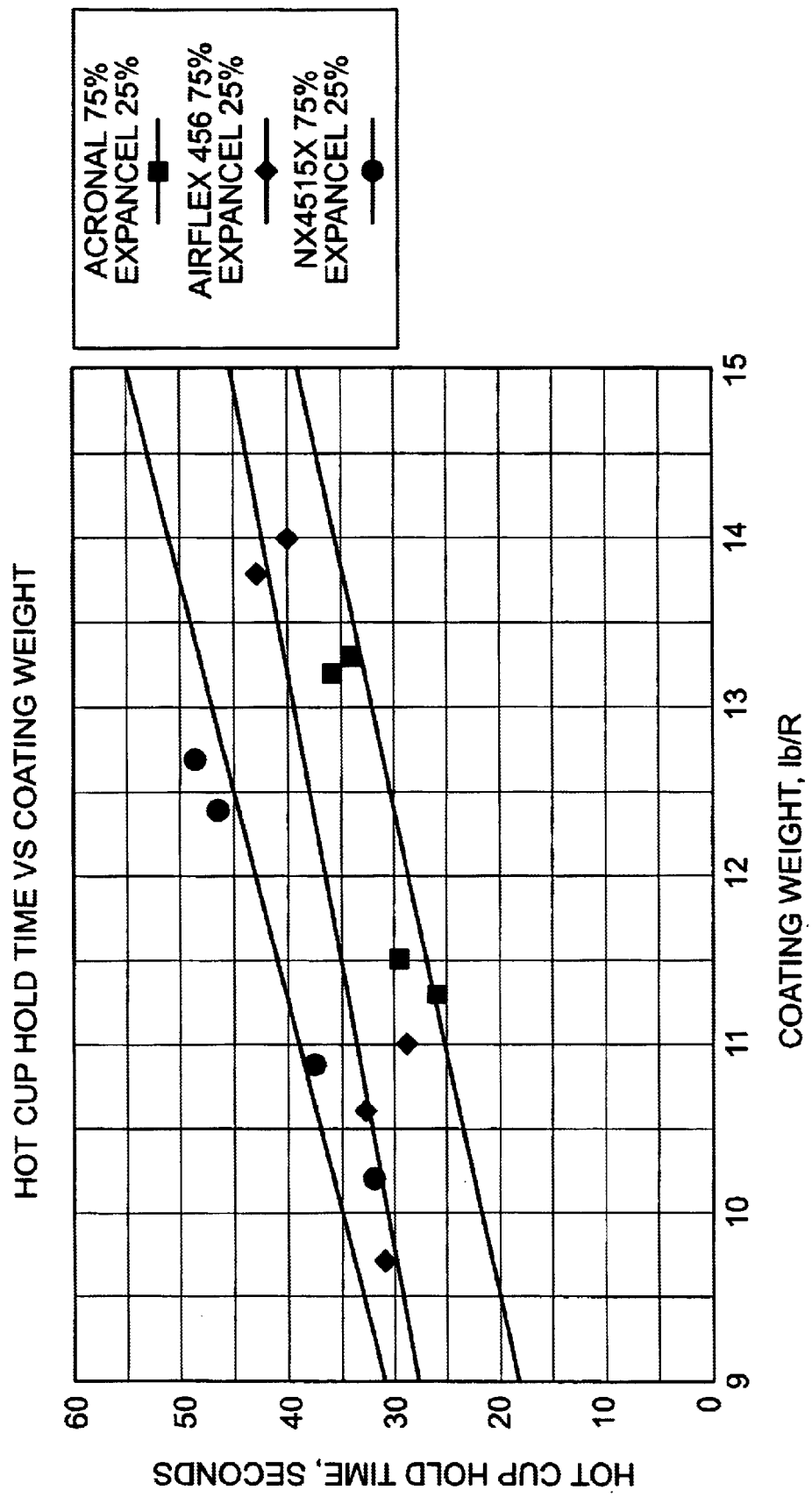
FIG. 42 is a graph showing hot cup hold time versus coating weight for different latexes.

FIG. 42 illustrates the excellent insulation properties of Styronal NX4515X, a styrene-butadiene latex, Acronal S504, an acrylic, latex, and Airflex 455, an ethylene vinyl chloride latex. These results show that insulation is improved if the glass transition temperature of the pigment is slightly reduced. The change in Tg affects the rheology of the binder and allows the insulation agent to expand further thus providing higher insulation values.

The advantages of textured or insulated coated cups of this invention over foamed polyethylene cups are as follows:

1. The textured and/or insulation coating can be printed on only those areas required for insulated handling while foamed polyethylene requires total coverage of one side of the cup or container.
2. The textured and/or insulation coating can be printed on in a pattern with open area further reducing the amount of coating required for insulated handling.
3. The textured and/or insulation coating improves grippability due to a much higher static and kinetic coefficient of friction reducing hot fluid spills. The static and kinetic coefficient of friction as shown in FIG. 9 for containers of this invention is 4 to 5 times greater than the kinetic and static coefficient of friction of prior art paper plates, plastic plates or foamed plates.
4. The textured coating can be incorporated into print designs and logos. The hold time for these cups is given in FIG. 40.

EXAMPLE 6

Screen Printing

The following method and equipment was suitably utilized to screen-print on one side of the textured and/or insulated paperboard and containers of this invention. The screens used were stretched with Saatilene gold monofilament polyester mesh from Majestech Corporation. The mesh count used was 110 threads per inch at a tension level of 17 Newtons/cm. The theoretical ink deposit is 3.47 cu. in./sq. yd.

The screens were coated with Ulano 925WR, a direct water resistant photo emulsion. They were scoop-coated with two coats on each side (wet on wet). After the screens were dried, they were exposed with a Nuarc 2000 watt Metal Halide exposing unit.

The samples were screen printed using a Saturn 25"×38" model "clam shell" printer manufactured by M & R Printing Equipment, Inc. The squeegee and flood speeds were set at 6. Other settings were: Off-contact at ⅛th", peel adjustment at ½", and the print/flood option on. The squeegee used had a sharp edge with a shore hardness of 70 durometers.

The stock was then run through a Tex-Air 410-48 forced air electric dryer manufactured by American Screen Printing Company. The forced air temperature was approximately 256° F., and the infra red panels at approximately 800° F. The belt speed was set at 3. The gold monofilament polyester mesh was manufactured by Majestech Corporation, Somers, N.Y. The photo emulsion was manufactured by Ulano, Brooklyn, N.Y. The metal halide exposing unit was manufactured by Nuarc Company, Inc., Chicago, Ill. The Saturn "clam shell" printer was manufactured by M & R Printing Equipment, Inc., Glen Ellyn, Ill. The forced air electric dryer was manufactured by American Screen Printing Equipment Co., Chicago, Ill.

The screen printing process mainly involves forcing ink thorough a porous screen stencil to a substrate beneath. A squeegee made of wood or rubber is used to push the ink. The basic equipment includes a table, rigid frame, finely meshed screen, semi-rigid squeegee, stencil materials, and heavy, viscous ink.

The cloth screen is tightly stretched over the frame, and a photo emulsion is applied to it. Film with a positive image is put into vacuum contact with the screen's dry emulsion and exposed to white light. After exposure, the image is washed out with a water spray. The unexposed areas are insoluble and wash out cleanly; exposed areas are painted with a blockout solution that prevents ink from bleeding through the screen. The screen is attached to a table on one side by clamps or hinges or installed in an automatic press location. The screen becomes the image carrier.

The substrate is positioned under the screen and frame. Register tabs are located on the table, or press guides are set in place on the feed table of the press to register each sheet for printing. The screen is lowered and ink is deposited at one end. Then, the squeegee is pressed down and across the length of the screen, forcing the ink through and printing the image.

The ink-film thickness on the substrate is equal to the thickness of the screen's fabric filaments. For fine-line process color work, fine threads or filaments are used, and multiple colors can be removed with solvent sprays after use and the screens reused.

Durable, fine stainless-steel mesh screens capable of reproducing remarkably readable six-point type, along with intricate designs can suitably be utilized.

Both single and multicolor presses can suitably be used. Many are hand fed, with the operator inserting and removing sheets by hand. Some have automatic squeegee impression cycles. The fully automatic machines feed the sheets, register colors, lower the screen and squeegee the print. The sheets are removed to a dryer and then stacked at the other end of the press.

Some presses use round brass screens and print dyes on fabrics from a roll. In-line presses print from one station to-another for up to eight or more colors. The process is simple and lends itself to many specialty applications.

Through the use of specially built jigs and printing frames with flexible screens, the process is widely used for printing rounded and irregular surfaces such as containers and tubes. The chief advantage of screen printing is its versatility on many different surfaces, irregular or flat. Screen printing also lays down a smooth, heavy ink-film thickness. Many items are screen printed because they can's be printed any other way.

EXAMPLE 7

Preparation of Bulk Enhanced Paper

In some applications, bulk-enhanced paperboard is suitable. The bulk-enhanced paperboards give greater insulation than conventional boards and also are less expensive than conventional boards since less fiber is used. The manufacture of these boards is disclosed in U.S. Ser. No. 08/716,511 filed on Sep. 20, 1996, and U.S. Ser. No. 08/896,239 filed on Jul. 17, 1997, and both patent applications are incorporated herein in their entirety by reference. For bulk-enhanced paperboards, retention aids are used to retain the bulk-enhancing additives in the paperboard.

Suitable retention aids function through coagulation, flocculation, or entrapment of the bulk additive. Coagulation comprises a precipitation of initially dispersed colloidal particles. This precipitation is suitably accomplished by charge neutralization or formation of high charge density patches on the particle surfaces. Since natural particles such as fines, fibers, clays, etc., are anionic, coagulation is advantageously accomplished by adding cationic materials to the overall system. Such selected cationic materials suitably have a high charge to mass ratio. Suitable coagulants include inorganic salts such as alum or aluminum chloride and their polymerization products (e.g. PAC or poly aluminum chloride or synthetic polymers); poly (diallyldimethyl ammonium chloride) (i.e., DADMAC); poly (dimethylamine)-co-epichlorohydrin; polyethylenimine; poly (3-butenyltrimethyl ammoniumchloride); poly (4-ethenylbenzyltrimethylammonium chloride); poly (2,3-epoxypropyltrimethylammonium chloride); poly (5-isoprenyltrimethylammonium chloride); and poly (acryloyloxyethyltrimethylammonium chloride). Other suitable cationic compounds having a high charge to mass ratio include all polysulfonium compounds, such as, for example the polymer made from the adduct of 2-chloromethyl; 1,3-butadiene and a dialkylsulfide, all polyamines made by the reaction of amines such as, for example, ethylenediamine, diethylenetriamine, triethylenetetraamine or various dialkylamines, with bis-halo, bis-epoxy, or chlorohydrin compounds such as, for example, 1–2 dichloroethane, 1,5-diepoxyhexane, or epichlorohydrin, all polymers of guanidine such as, for example, the product of guanidine and formaldehyde with or without polyamines. The preferred coagulant is poly(diallyidimethyl ammonium chloride) (i.e., DADMAC) having a molecular weight of about ninety thousand to two hundred thousand and polyethylenimene having a molecular weight of about forty thousand to five hundred thousand.

Another advantageous retention system suitable for the manufacture of bulk enhanced paperboards is flocculation. This is basically the bridging or networking of particles through oppositely charged high molecular weight macromolecules. Alternatively, the bridging is accomplished by employing dual polymer systems. Macromolecules useful for the single additive approach are cationic starches (both amylase and amylopectin), cationic polyacrylamide such as for example, poly (acrylamide)-co-diallyldimethyl ammonium chloride; poly(acrylamide)-co-acryloyloxyethyl trimethylammonium chloride, cationic gums, chitosan, and cationic polyacrylates. Natural macromolecules such as, for example, starches and gums, are rendered cationic usually by treating them with 2,3-epoxypropyltrimethylammonium chloride, but other compounds can be used such as, for example, 2-chloroethyl-dialkylamine, acryloyloxyethyidialkyl ammonium chloride, acrylamidoethyltrialkylammonium chloride, etc. Dual additives useful for the dual polymer approach are any of those compounds which function as coagulants plus a high molecular weight anionic macromolecule such as, for example, anionic starches, CMC (carboxymethylcellulose), anionic gums, anionic polyacrylamides (e.g., poly(acrylamide)-co-acrylic acid), or a finely dispersed colloidal particle (e.g., colloidal silica, colloidal alumina, bentonite clay, or polymer micro particles marketed by Cite Industries as Polyflex). Natural macromolecules such as, for example, cellulose, starch and gums are typically rendered anionic by treating them with chloroacetic acid, but other methods such as phosphorylation can be employed. Suitable flocculation agents are nitrogen containing organic polymers having a molecular weight of about one hundred thousand to thirty million. The preferred polymers have a molecular weight of about ten to twenty million. The most preferred have a molecular weight of about twelve to eighteen million. Suitable high molecular weight polymers are polyacrylamides, anionic acrylamide-acrylate polymers, cationic acrylamide copolymers having a molecular weight of about five hundred thousand to thirty million and polyethylenimenes having molecular weights in the range of about five hundred thousand to two million.

The third method for retaining the bulk additive in the bulk enhanced fiberboard is entrapment. This is the mechanical entrapment of particles in the fiber network. Entrapment is suitably achieved by maximizing network formation such as by forming the networks in the presence of high molecular weight anionic polyacrylamides, or high molecular weight polyethyleneoxides (PEO). Alternatively, molecular nets are formed in the network by the reaction of dual additives such as, for example, PEO and a phenolic resin.

EXAMPLE 8

Internal Sizing in the Manufacture of Paperboard

The paperboard useful for the manufacture of textured containers can advantageously be produced under acid, alkaline or neutral sizing conditions. Suitable internal sizing agents include rosin and alum, waxes, fatty acid derivatives, hydrocarbon resins, alkyl ketene dimers, and alkenyl succinic anhydrides. Alkenyl succinic anhydrides are organic chemicals comprising an unsaturated hydrocarbon chain containing a pendant succinic anhydride moiety. Monocarboxylic fatty acids having a chain length of $C_8$ to $C_{22}$ are also suitable internal sizing agents. The rosin sizing agents include gum rosin, wood rosin, and tall oil rosin. Suitable $C_8$ to $C_{22}$ fatty acids useful as internal sizing agents include coprylic, capric, lauric, myristic, palmitic, stearic, arachidic, betenic, palmitoleic, oleic, ricinoleic, petroselinic, vaccenic, linoleic, linolenic, eleostearic, licenic, paranirac, gadoleic, arachidonic, cetoleic, and erycic.

EXAMPLE 9

Suitable Aluminum Salts

Alum or aluminum salts used to prepare suitable paperboards are water-soluble, and they may be aluminum sulfate, aluminum chloride, aluminum nitrate, or acid aluminum hydrophosphates in which P:Al=1.1:1–3:1.

When aluminum salts or their mixtures are used, a base is added to form aluminum hydroxide having anionic surface charges. The base used is suitably sodium or potassium hydroxide, sodium or potassium carbonate, sodium or potassium metasilicate, sodium or potassium watergasses, sodium or potassium phosphate or borate, or sodium or potassium aluminate, or mixtures of these.

Aluminate compounds such as sodium aluminate or potassium aluminate are also used as the water-soluble aluminum salts. In this case, acid is added in order to form, within the pH range 7–9, an aluminum hydroxide having anionic surface charges. The acid used is a mineral acid such as sulfuric acid, hydrochloric acid, nitric acid or phosphoric acid, or organic acids such as oxalic acid, citric acid or tartaric acid. Suitably the acids used may also be acid aluminum salts such as aluminum sulfate, aluminum chloride, aluminum nitrate, or various water-soluble aluminum hydrophosphates.

Suitably water-soluble polymeric aluminum salts, i.e., polyaluminum salts, so-called basic aluminum salts, which are also called polyaluminum hydroxy salts or aluminum hydroxy salts are also used. In addition, the following salts are utilized: polyaluminum sulfate, polyaluminum chloride and polyaluminum chloride sulfate. The polyaluminum salt does suitably, in addition to the chloride and/or sulfate ion, also contain other anions, e.g., phosphate, polyphosphate, silicate, citrate, oxalate; or several of these.

Commercially available polymeric aluminum salts of this type include PAC (polyaluminum chloride), PAS (polyaluminum sulfate), UPAX 6 (silicate-containing polyaluminum chloride), and PASS (polyaluminum sulfate silicate).

The net formula of the water-soluble polyaluminum salt may be, for example:

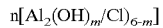

$$n[Al_2(OH)_m/Cl)_{6-m}]$$

and its alkalinity may vary so that the m-value ranges from 1 to 5 (alkalinity is respectively 16–83% according to the formula (m:6)×100). In this case the ratio Al/OH is 2:1–1:2.5. n is 2 or higher.

When a polyaluminum compound is used, it may be desirable to add a base in order to optimize the Al/OH ratio, even if all of the polyaluminum compounds in accordance with the invention do work as such.

The base or acid which forms in situ an aluminum hydroxide with the aluminum salt may be added to the fiber suspension, or just before the aluminum salt, or after it, or simultaneously with it.

The aluminum hydroxide may also be formed before the moment of adding, for example in the adding tube, or in advance in sol form.

The amount of the aluminum salt, calculated as $Al_2O_3$, is preferably approximately 0.01–1.0% of the dry weight of the pulp.

Definitions

GM tensile stiffness and GM Taber stiffness are measured according to the following procedures. Tensile stiffness is defined by the following equation:

$$\text{TENSILE STIFFNESS} = \text{YOUNG'S MODULUS} \times \text{CALIPER}$$

where $$\text{YOUNG'S MODULUS} = \Delta\sigma/\Delta\epsilon$$

Young's Modulus is defined as the change in specimen stress per unit change in strain expressed in pounds per square inch. The stress-strain relationship is expressed as the slope of the initial linear portion of the curve where stress is the y-axis and strain is the x-axis. Caliper is the thickness of a single sheet of the paperboard, expressed in inches, and is measured using TAPPI Test Method T411 om 89.

As the economic value for paperboard in many applications in commerce depends on its GM Taber stiffness or flexural rigidity, this is an important property. Taber stiffness values are determined as set forth in TAPPI method T 489 om 92. The Taber-type stiffness test procedure is used to measure the stiffness of paperboard by determining the bending moment, in gram centimeters, necessary to deflect the free end of a 38 mm wide vertically clamped specimen 150 from its center line when the load is applied 50 mm away from the clamp.

Related methods: International Organization for Standardization ISO2493; Technical Association of the Australian and New Zealand Pulp and Paper Industry APPITA P431; British Standard Institution BS13748; Scandinavian Pulp Paper and Board Testing Committee SCAN P-29. Precision of the GM Taber Stiffness Test TAPPI 52(6): 1136 (1969).

The terms GM Taber stiffness, GM tensile stiffness, Canadian Standard Freeness and Bendtsen Smoothness are defined as follows: GM Taber stiffness is defined as $\sqrt{T_{MD} \times T_{CD}}$ where $T_{MD}$ is the Taber stiffness value in the machine direction (MD) and $T_{CD}$ is the Taber stiffness value in the cross machine direction (CD); GM tensile stiffness is defined as $\sqrt{t_{MD} \times t_{CD}}$ where $t_{MD}$ is the tensile stiffness value in the machine direction (MD) and $t_{CD}$ is the tensile stiffness value in the cross machine direction (CD); Canadian Standard Freeness measurements were carried out according to TAPPI test method T227 om 94; Bendtsen Smoothness means the smoothness of the paperboard is determined by measuring the volume of air leakage across the narrow contacting ring of a smoothness head resting on the paperboard with a Bendtsen-type tester according to the TAPPI procedure UM 535. Related method: SCAN-P21.

Fiber mat density of the paperboard is expressed in pounds for each 3000 square foot ream at a fiberboard thickness of 0.001 inch. In the paper art each 0.001 inch board thickness is referred to as a point.

While the present invention is described above in connection with preferred or illustrative embodiments, these embodiments are not intended to be exhaustive or limiting of the invention. Rather, the invention is intended to cover all alternatives, modifications, and equivalents included within its spirit and scope, as defined by the appended claims.

We claim:

1. A coated paperboard characterized by having grease, oil and cut resistance, varnish gloss and smoothness, and improved bulk insulation, and tactile properties useful as a base stock for forming substantially rigid food containers having on a coated side a coefficient of kinetic friction of in excess of about 0.2 and a static coefficient of friction in excess of about 0.2 comprising:
    a) a paperboard blank having a basis weight suitable for a selected type of food container;
    b) optionally a base coat coating layer applied to one surface of the paperboard blank, the base coat coating layer comprising a base coat polymer binder and optionally a pigment;
    c) optionally a top coat coating layer applied to the base coat coating layer, the top coat coating layer comprising at least one organic polymer binder and optionally a pigment; and
    d) a liquid organic polymeric binder mixture layer including texturizing and insulating agents selected from the group consisting of microspheres, gases, glass beads, and mixtures of these applied to the other surface of the blank in a pattern having covered areas and open areas which surface has been heated to expand and cure the liquid texturizing and insulating agent polymeric binder mixture.

2. The coated paperboard of claim 1 wherein on the coated side, both the coefficient of kinetic friction and the coefficient of static friction are about 0.2 to about 2.0.

3. The coated paperboard of claim 2 wherein on the coated side the coefficient of kinetic friction is in the range of about 0.2 to about 1.0 and the coefficient of static friction is in the range of about 0.2 to about 1.5.

4. The coated paperboard of claim 2 or claim 3, comprising both a base coat coating layer and a top coat coating layer and wherein the base coat coating layer and the top coat coating layer each comprise a mixture of a latex polymer binder and optionally a pigment.

5. The coated paperboard of claim 4 wherein the texturizing and insulating agent are gases and the gases are chosen from at least one of air, nitrogen, helium, and $C_1$ to $C_7$ aliphatic hydrocarbons.

6. The coated paperboard of claim 4 formed flat paperboard blanks having two surfaces by printing on one surface of the paperboard with a textured coating covering at least ten percent of such surface wherein the textured coating comprises a liquid polymeric binder mixed with a texturizing agent chosen from at least one of microspheres, gases, and glass beads, and the paperboard on the texturizing side exhibiting a static coefficient of friction of about 0.2 to about 2.0 or greater and a kinetic coefficient of friction of about 0.22 to about 1.0.

7. The paperboard of claim 1 wherein the polymeric binder of the liquid texturizing/insulating agent/polymeric binder mixture is chosen from at least one of copolymers of ethylenically unsaturated monomers such as copolymers of ethylene and propylene, ethylene and styrene, and polyvinyl acetate, styrene and maleic anhydride, styrene and methyl methacrylate, styrene and ethyl acrylate, styrene and acrylonitrile, methyl methacrylate and ethyl acrylate, methyl methacrylate and acrylonitrile.

8. The paperboard of claim 1 wherein, prior to the printing of the texturizing and insulating agent and the binder, the paperboard has been coated with a binder and optionally an inorganic or organic pigment.

9. A textured article of manufacture formed from the textured paperboard of claim 1.

10. The textured article of manufacture of claim 9 in the form of a textured container having the static coefficient of friction of about 0.2 or greater and a kinetic coefficient of friction of about 0.2 or greater.

11. The textured article of manufacture of claim 9 in the form of a textured plate having a static coefficient of friction of about 0.2 or greater and a kinetic coefficient of friction of about 0.2 to about 1.8.

12. The textured plate of claim 9 in the form of a textured, compartmented plate having a static coefficient of friction of about 0.2 to about 2.0 and a kinetic coefficient of friction of about 0.2 to about 1.5.

13. The textured article of manufacture of claim 9 in the form of a textured bowl having a static coefficient of friction of about 0.2 or greater and a kinetic coefficient friction of about 0.2 to about 1.5.

14. The textured article of manufacture of claim 9 in the form of a textured canister having a static coefficient of friction of about 0.2 to about 2.0 and a kinetic coefficient of friction of about 0.2 to about 1.5.

15. The textured article of manufacture of claim 9 in the form of a textured rectangular take out container having a static coefficient of friction of about 0.2 to about 2.0 and a kinetic coefficient of friction of about 0.2 to about 1.5.

16. The textured article of manufacture of claim 9 in the form of a textured hamburger clam shell having static coefficient of friction of about 0.2 to about 2.0 and a kinetic coefficient of friction of about 0.2 to about 1.5.

17. The textured article of manufacture of claim 9 in the form of a textured French Fry sleeve having a static coefficient of friction of about 0.2 to about 2.0 and a kinetic coefficient of friction of about 0.2 to about 1.5.

18. The textured article of manufacture of claim 9 in the form of a textured food bucket having a static coefficient of friction of about 0.2 to about 2.0 and a kinetic coefficient of friction of about 0.2 to about 1.5.

19. The paperboard of claim 1, further comprising at least one of a base coat coating layer and a top coat coating layer and wherein the polymeric binder of the base coat or the top coat has a glass transition temperature of about −30° C. to about +30° C.

20. The paperboard of claim 19 wherein the polymeric binder of the base coat or the top coat has a glass transition temperature of about −10° C. to about +10° C.

21. The paperboard of claim 20 wherein the polymeric binder of the base coat or the top coat is chosen from at least one of styrene acrylic polymers, and a terpolymer emulsion of vinyl chloride, ethylene, and vinyl acetate having a glass transition temperature of about 0° C. to about 3° C.

22. The paperboard of claim 19 wherein the polymeric binder of the base coat or the top coat is chosen from at least one of styrene acrylic latex, ethylene vinyl chloride latex, and styrene-butadiene latex.

23. A texture-coated container comprising a paperboard blank prepared from the paperboard of claim 1 which has been shaped into the form of a container in which the other surface of the container has a screen printed patterned coating of expanded microspheres in a cured polymeric binder, the patterned coating covering from about 10 to about 90% of the other surface of the container.

24. The texture coated container of claim 23 in which the patterned coating covers about 30 to about 50% of the other surface of the container.

25. The coated paperboard of claim 1, wherein prior to printing the liquid polymeric binder mixture on the paperboard surface the paperboard comprises:
   a) predominantly cellulosic fibers;
   b) bulk and porosity enhancing additive interspersed with said cellulosic fibers in a controlled distribution throughout the thickness of said paperboard web; and
   c) size press applied binder coating, optionally including a pigment adjacent both surfaces of the paperboard and penetrating into the board to a controlled extent; the overall fiber weight "w" of the web being at least about 40 lbs./3000 square foot ream;
      (i) the distribution of the bulk and porosity enhancing additive throughout the thickness of the paperboard; and
      (ii) the penetration of the size press applied pigment coating into the board; both being controlled to simultaneously produce at a fiber mat density of 3, 4.5, 6.5, 7, 8.3, and 9 pounds per 3000 square foot ream at a 0.001 inch thickness respectively:
         (A) a GM Taber stiffness of at least about 0.00501 $w^{2.63}$ grams-centimeter/fiber mat density$^{1.63}$; and
      (B) at a fiber mat density of about 3 to about 9 pounds per 3000 square foot ream at a fiberboard thickness of 0.001 inches, a GM tensile stiffness of at least 1323+24.2 w pounds per inch.

26. The paperboard of claim 25 wherein at a fiber mat density of 3, 4.5, 6.5, 7, 8.3, and 9 pounds per 3000 square foot ream at a 0.001 inch thickness respectively, the GM Taber stiffness is at least 0.00716 $w^{2.63}$ grams-centimeter/fiber mat density$^{1.63}$, and the GM tensile stiffness is at least 1890+24.2 w pounds per inch.

27. The paperboard of claim 25 wherein at a fiber mat density of 3, 4.5, 6.5, 7, and 8.3 pounds per 3000 square foot ream at a 0.001 inch thickness respectively, the GM Taber stiffness is at least 0.00084 $w^{2.63}$ grams-centimeter, at least 0.00043 $w^{2.63}$ grams-centimeter, at least 0.00024 $w^{2.63}$ grams-centimeter, at least 0.00021 $w^{2.63}$ grams-centimeter, and at least 0.0006 $w^{2.63}$ grams-centimeters, respectively, and the GM tensile stiffness is at least 1323+24.2 w pounds per inch.

28. The paperboard of claim 27 wherein at a fiber mat density of 3, 4.5, 6.5, and 7 pounds per 3000 square foot ream at a 0.001 inch thickness respectively, the GM Taber stiffness is at least 0.00084 $w^{2.63}$ grams-centimeter, at least 0.00043 $w^{2.63}$ grams-centimeter, at least 0.00024 $w^{2.63}$ grams-centimeter, and at least 0.00021 $w^{2.63}$ grams-centimeters, and the GM tensile stiffness is at least 1323+24.2 w pounds per inch.

29. The paperboard of claim 25 wherein a size press binder applied, optionally including a pigment, is at least one pound for each 3000 square foot ream.

30. The paperboard of claim 29 wherein the amount of size press binder applied, optionally including a pigment, is at least six pounds for each 3000 square foot ream.

31. The paperboard of claim 30 wherein the amount of size press binder applied, optionally including a pigment, is about 15 to about 30 pounds for each 3000 square foot ream.

32. The paperboard of claim 25 wherein the percentage by weight of the pigment of the binder is about 0 to about 80.

33. The paperboard of claim 32 wherein the binder is chosen from at least one of aliphatic acrylate acrylonitrile styrene copolymers, n-butyl acrylate acrylonitrile styrene copolymer, n-amyl acrylate acrylonitrile styrene copolymer, n-proply acrylate acrylonitrile styrene copolymer, n-ethyl acrylate acrylonitrile styrene copolymer, aliphatic acrylate styrene copolymers, n-butyl acrylate styrene, copolymer, n-amyl acrylate styrene copolymer, n-proplyl acrylate styrene copolymer, n-ethyl acrylate styrene copolymer, cationic starch, anionic starch, amphoteric starch, starch latex copolymers, animal glue, gelatin, methyl cellulose, carboxymethylcellulose, polyvinyl alcohol, ethylene-vinyl acetate copolymer, vinyl acetate-acrylic copolymer, styrene-butadiene copolymer, ethylene-vinyl chloride copolymer, vinyl acetate polymer, vinyl acetate-ethylene copolymer, acrylic copolymer, styrene-acrylic copolymer, stearylated melamine, and hydrophilic epoxy esters.

34. The paperboard of claim 32 wherein the pigment is chosen from at least one of clay, chalk, barite, silica, talc, bentonite, glass powder, alumina, titanium dioxide, graphite, carbon black, zinc sulfide, alumina silica, and calcium carbonate.

35. The paperboard of claim 34 wherein the pigment is kaolin clay.

36. The paperboard of claim 25 wherein the bulk and porosity enhancing additive is chosen from at least one of expanded or unexpanded uncoated microspheres, expanded or unexpanded coated microspheres, and expanded or unexpanded microspheres coated discontinuously.

37. The paperboard of claim 36 wherein the microspheres are attached to the fiber prior to the formation of an embryonic web.

38. The paperboard of claim 29 wherein the cellulose fiber is replaced in whole or in part with a synthetic fiber.

39. The paperboard of claim 38 wherein the synthetic fiber is chosen from at least one of polyolefins, polyethylenes, polypropylenes, and polyesters.

40. The paperboard of claim 25 wherein a retention aid is utilized.

41. The paperboard of claim 40 wherein the retention aid is chosen from at least one of coagulation agents, flocculation agents, and entrapment agents.

42. The paperboard of claim 41 wherein the coagulation agents are chosen from at least one of inorganic salts, alum, aluminum chloride, poly aluminum chloride and synthetic or inorganic polymers, poly (diallyldimethylammonium chloride), poly (dimethylamine)-co-epichlorohydrin, polyethylenimine, poly (3-butenyltrimethyl ammonium chloride), poly (4-ethenylbenzyltrimethylammonium chloride), poly (2,3-epoxypropyltrimethylammonium chloride), poly (5-isoprenyltrimethylammonium chloride), poly (acryloyloxethyltrimethylammonium chloride), polysulfonium compounds, and polymers prepared from the adduct of 2-chloromethyl-1,3-butadiene and a dialkylsulfide.

43. The paperboard of claim 41 wherein the coagulation agents are chosen from at least one polyamine which is the reaction product of the following amines: ethylenediamine, diethylenetriamine, triethylenetetraamine, dialkylamines, with bis-halo, bis-epoxy, or chlorohydrin compounds and mixtures of these.

44. The paperboard of claim 41 wherein the coagulation agent is the reaction product of ethylenediamine, diethylenetriamine, triethylenetetraamine, dialkylamines with 1–2 dichloroethane, 1,5-diepoxyhexane, or epichlorohydrin, and mixtures of these.

45. The paperboard of claim 41 wherein the coagulation agents are polymers comprising the guanidine moiety.

46. The paperboard of claim 45 wherein the coagulation agent is the polymeric reaction product of guanidine and formaldehyde or polyamines.

47. The paperboard of claim 41 wherein the coagulation agent is poly (diallyldimethylammoniumchloride) having a molecular weight in excess of ninety thousand.

48. The paperboard of claim 42 wherein the coagulation agent is a polyethylenimine having a molecular weight of about forty thousand to about five hundred thousand.

49. The paperboard of claim 42 wherein the flocculation agent comprises a dual polymer chosen from at least one of anionic starches, carboxymethylcellulose, anionic gums, poly (acrylamide)-co-acrylic acid, colloidal silica, and bentonite clay.

50. The paperboard of claim 42 wherein the flocculation agent is polyethylenimine having a molecular weight of about five hundred thousand to about two million.

51. The paperboard of claim 42 wherein the flocculation agent is chosen from at least one of cationic starches, cationic polyacrylamides, poly (acrylamide)-co-diallyldimethylammoniumchloride, poly (acrylamide)-co-acryloyloxyethyl, trimethylammonium chloride, cationic gums, and chitosan.

52. The paperboard of claim 42 wherein the flocculation agent is a nitrogen containing organic polymer having a molecular weight in excess of one hundred thousand.

53. The paperboard of claim 52 wherein the nitrogen containing organic polymer is chosen from at least one of polyacrylamides, acrylamide-acrylate polymers, cationic acrylamide copolymers, and polyethylenimine.

54. The paperboard of claim 53 wherein the organic polymer has a molecular weight of about ten to about twenty million.

55. The paperboard of claim 41 wherein the entrapment agent is chosen from at least one of high molecular weight anionic polyacrylamides, high molecular weight polyethyleneoxides, and reaction products of polyethyleneoxides and phenolic resins.

56. The paperboard of claim 40 wherein the retention aid is a micro particle colloid which combines the microspheres and the cellulosic fibers prior to web formation.

57. The paperboard of claim 56 wherein the micro particle colloid is chosen from at least one of silica, bentonite clay, alumina, talc, calcium carbonate, zinc sulfide, titanium dioxide, and an organic pigment.

58. The paperboard of claim 36 wherein the expanded or unexpanded microspheres are coated with an inorganic pigment or a retention aid chosen from at least one of coagulation agents, flocculation agents, and entrapment agents.

59. The paperboard of claim 58 wherein the microspheres are coated with an inorganic pigment chosen from at least one of bentonite clay, kaolin clay, clay, talc, barium sulfate, alumina, silica, titanium dioxide, zinc oxide cotton, cellulosic fiber, graphite, carbon black, and colloidal silica.

60. The paperboard of claim 58 wherein the microspheres are coated with at least one of polyacrylamides, poly (acrylamide)-co-acrylic acid, poly (acrylamide)-co-diallyldimethyl ammonium chloride, poly (acrylamide)-co-acryloxyloxyethyl trimethylammonium chloride, starch, cationized starch, anionic starch, carboxymethylcellulose, anionic gums, polyethylenimine, poly (diallyldimethylammonium chloride) acrylamide acrylate polymers, cationic acrylamide copolymers, and mixtures of these.

61. The paperboard of claim 25 comprising a plurality of microspheres selected from the group of expanded and unexpanded microspheres and mixtures of these in a proportion of between about 10 lbs. to about 400 lbs. per ton of fiber and a retention aid in an amount sufficient to retain a sufficient portion of the microspheres in all layers within the paperboard.

62. The paperboard of claim 61 wherein the microspheres have a mean diameter ranging between about 0.5 to about 60 microns in the unexpanded state and have a maximum expansion of between about 4 and about 9 times the mean diameters.

63. The paperboard of claim 61 wherein the retention aid is chosen from at least one of an anionic polymer, an acrylamide/acrylate polymer in a hydrocarbon solvent and water, a cationic polyacrylamide, a bentonite clay, and a poly dadmac resin.

64. The paperboard of claim 61 wherein the retention aid is diallyidimethyl ammonium chloride polymer having a molecular weight in excess of ninety thousand.

65. The paperboard of claim 61 wherein the retention aid is polyethylenimine having a molecular weight of about forty thousand to about two million.

66. The paperboard of claim 65 wherein the polyethylenimine has a molecular weight of about five hundred thousand to about two million.

67. The paperboard of claim 61 wherein the retention aid is chosen from at least one of polyacrylamides, acrylamide-acrylate polymers, and cationic acrylamide copolymers.

68. The paperboard of claim 67 wherein the retention aid has a molecular weight of about ten to about twenty million.

69. The paperboard of claim 25 wherein, prior to the printing of the liquid polymeric binder mixture, the paperboard has been coated with an organic polymer binder and optionally an inorganic or organic pigment.

70. A textured, insulated article of manufacture formed from the textured paperboard of claim 25.

71. The textured, insulated article of manufacture of claim 70 in the form of a textured, insulated container.

72. The textured, insulated article of manufacture of claim 70 in the form of a textured, insulated plate.

73. The textured, insulated plate of claim 72 in the form of a textured, insulated compartmented plate.

74. The textured, insulated article of manufacture of claim 70 in the form of a textured, insulated bowl.

75. The textured, insulated article of manufacture of claim 70 in the form of a textured, insulated canister.

76. The textured, insulated article of manufacture of claim 70 in the form of a textured, insulated, rectangular take out container.

77. The textured, insulated article of manufacture of claim 70 in the form of a textured, insulated hamburger clam shell.

78. The textured, insulated article of manufacture of claim 70 in the form of a textured, insulated French fry sleeve.

79. The textured, insulated article of manufacture of claim 70 in the form of a textured, insulated food bucket.

80. The article of manufacture of claim 70 in the form of an insulated cup.

81. The insulated cup of claim 80 having an inner and an outer surface which when filled with a liquid at about 190°

F. exhibits thermal insulative properties such that at about room temperature and about one atmosphere pressure the textured part of the outer surface does not reach a temperature of about 145° F. in less than about forty seconds.

82. The paperboard of claim 22, wherein said styrene acrylic latex includes styrene, butyl acrylate, acrylonitrile, and acrylic acid.

83. The paperboard of claim 53, wherein the nitrogen containing organic polymer has a molecular weight in the range of about five hundred thousand to about thirty million.

84. The paperboard of claim 67, wherein the retention aid has a molecular weight from about one hundred thousand to about thirty million.

85. A textured, coated article characterized by having grease, oil, and cut resistance, varnish gloss and smoothness, and improved bulk insulation, and tactile properties useful as a base stock for forming substantially rigid food containers having on a coated side a coefficient of kinetic friction of in excess of about 0.2 and a static coefficient of friction in excess of about 0.2 comprising:
  a) a paperboard blank having a basis weight suitable for a selected type of food container;
  b) optionally a base coat coating layer applied to one surface of the paperboard blank, the base coat coating layer comprising a base coat polymer binder and optionally a pigment;
  c) optionally a top coat coating layer applied to the base coat coating layer, the top coat coating layer comprising at least one organic polymer binder and optionally a pigment; and
  d) a liquid organic polymeric binder mixture layer including texturizing and insulating agents selected from the group consisting of microspheres, gases, glass beads, hollow glass beads, and mixtures of these applied to the outer other surface of the blank in a pattern having covered areas and open areas which surface has been heated to expand and cure the liquid texturizing and insulating agent polymeric binder mixture, wherein the textured, coated article is a beverage container.

86. The textured, coated article according to claim 85 wherein the beverage container is a cup.

87. The coated paperboard according to claim 1 wherein the liquid organic polymeric binder mixture comprises an adhesive.

88. The textured, coated article according to claim 85 wherein the liquid organic polymeric binder mixture comprises an adhesive.

89. The coated paperboard of claim 1 wherein the glass beads are chosen from at least one of solid glass beads and hollow glass beads.

90. The textured, coated article according to claim 85 wherein the glass beads are chosen from at least one of solid glass beads and hollow glass beads.

* * * * *

UNITED STATES PATENT AND TRADEMARK OFFICE
CERTIFICATE OF CORRECTION

PATENT NO. : 6,740,373 B1
DATED : May 25, 2004
INVENTOR(S) : Dean P. Swoboda et al.

It is certified that error appears in the above-identified patent and that said Letters Patent is hereby corrected as shown below:

<u>Title page,</u>
Item [57], ABSTRACT,
Line 3, "and or" should read -- and/or --.

<u>Column 33,</u>
Line 66, "formed flat" should read -- formed from flat --.

<u>Column 35,</u>
Line 57, "0.0006 $w^{2.63}$" should read -- 0.00016$w^{2.63}$ --.
Line 63, "0.00084 $w^{2.63}$" should read -- 0.00084$w^{2.63}$ --.

<u>Column 36,</u>
Line 17, "styrene; copolymer" should read -- styrene copolymer, --.
Line 18, "n-proplyl" should read -- n-propyl --.
Line 43, "claim 29" should read -- claim 25 --.
Line 62, "poly (acryloyloxethyltrimethylammonium chloride)," should read
-- poly (acryloyloxyethyltrimethylammonium chloride), --.

<u>Column 38,</u>
Line 26, "diallyidimethyl" should read -- diallyldimethyl --.

<u>Column 40,</u>
Line 6, delete "hollow glass beads,".
Line 7, delete "outer".

Signed and Sealed this

Third Day of August, 2004

JON W. DUDAS
*Acting Director of the United States Patent and Trademark Office*